US011714509B2

(12) United States Patent
Eriksson et al.

(10) Patent No.: US 11,714,509 B2
(45) Date of Patent: Aug. 1, 2023

(54) MULTI-PLANE REFLECTIVE SENSOR

(71) Applicant: Neonode Inc., San Jose, CA (US)

(72) Inventors: Thomas Eriksson, Tynningö (SE); Alexander Jubner, Spånga (SE); Rozita Teymourzadeh, Santa Clara, CA (US); Stefan Holmgren, Sollentuna (SE); Lars Sparf, Vällingby (SE); Bengt Henry Hjalmar Edlund, Segeltorp (SE); Richard Berglind, Älvsjö (SE)

(73) Assignee: NEONODE INC., San Jose, CA (US)

( * ) Notice: Subject to any disclaimer, the term of this patent is extended or adjusted under 35 U.S.C. 154(b) by 259 days.

(21) Appl. No.: 17/198,273

(22) Filed: Mar. 11, 2021

(65) Prior Publication Data
US 2021/0223906 A1 Jul. 22, 2021

Related U.S. Application Data

(60) Continuation of application No. 16/365,662, filed on Mar. 26, 2019, now Pat. No. 10,949,027, which is a
(Continued)

(51) Int. Cl.
G06F 3/042 (2006.01)
G06F 3/041 (2006.01)
G06F 3/01 (2006.01)

(52) U.S. Cl.
CPC .......... G06F 3/0421 (2013.01); G06F 3/017 (2013.01); G06F 3/041 (2013.01); G06F 3/0412 (2013.01);
(Continued)

(58) Field of Classification Search
CPC ........ G06F 3/041; G06F 3/042; G06F 3/0488; G06F 3/0421; G06F 3/017; G06F 3/0416;
(Continued)

(56) References Cited

U.S. PATENT DOCUMENTS 4,243,879 A 1/1981 Carroll et al.
4,267,443 A 5/1981 Carroll et al.
(Continued)

FOREIGN PATENT DOCUMENTS

EP 0601651 A1 6/1994
EP 1906632 A2 4/2008
(Continued)

OTHER PUBLICATIONS

Hodges, S., Izadi, S., Butler, A., Rrustemi A., Buxton, B., "ThinSight: Versatile Multitouch Sensing for Thin Form-Factor Displays." UIST'07, Oct. 7-10, 2007. <http://www.hci.iastate.edu/REU09/pub/main/telerobotics_team_papers/thinsight_versatile_multitouch_sensing_for_thin_formfactor_displays.pdf>.
(Continued)

Primary Examiner — David L Lewis
Assistant Examiner — Shauna-Kay Hall
(74) Attorney, Agent, or Firm — Soquel Group LLC

(57) ABSTRACT

An optical assembly including a reflectance-based sensor emitting light into a detection plane and detecting reflections of the emitted light, reflected by an object located in the detection plane, a light redirector positioned away from the sensor redirecting light emitted by the sensor into one or more spatial planes parallel to the detection plane and, when the object is located in the one or more spatial planes, redirecting light reflected by the object into the detection plane, and a processor controlling light emitted by the sensor and receiving outputs from the sensor, and configured such that when an object passes through one or more of the spatial planes, the processor identifies both the spatial planes through which the object passes, and the location of the object within the spatial planes through which it passes, based on the received outputs and the position of the light redirector relative to the sensor.

12 Claims, 77 Drawing Sheets

Related U.S. Application Data continuation of application No. 15/588,646, filed on May 7, 2017, now Pat. No. 10,282,034, which is a continuation-in-part of application No. 15/000,815, filed on Jan. 19, 2016, now Pat. No. 9,921,661, and a continuation-in-part of application No. 14/960,369, filed on Dec. 5, 2015, now Pat. No. 9,645,679, and a continuation-in-part of application No. 14/880,231, filed on Oct. 11, 2015, now Pat. No. 10,004,985, said application No. 15/000,815 is a continuation-in-part of application No. 14/791,414, filed on Jul. 4, 2015, now Pat. No. 10,324,565, and a continuation-in-part of application No. 14/726,533, filed on May 31, 2015, now Pat. No. 9,678,601, and a continuation-in-part of application No. 14/630,737, filed on Feb. 25, 2015, now abandoned, said application No. 14/960,369 is a continuation of application No. 14/588,462, filed on Jan. 2, 2015, now Pat. No. 9,207,800, said application No. 15/000,815 is a continuation-in-part of application No. 14/555,731, filed on Nov. 28, 2014, now Pat. No. 9,741,184, said application No. 14/880,231 is a division of application No. 14/312,787, filed on Jun. 24, 2014, now Pat. No. 9,164,625, said application No. 14/726,533 is a continuation of application No. 14/311,366, filed on Jun. 23, 2014, now Pat. No. 9,063,614, which is a continuation of application No. PCT/US2014/040579, filed on Jun. 3, 2014, said application No. 14/312,787 is a continuation of application No. PCT/US2014/040112, filed on May 30, 2014, said application No. 14/630,737 is a continuation of application No. 14/140,635, filed on Dec. 26, 2013, now Pat. No. 9,001,087, said application No. 14/312,787 is a continuation-in-part of application No. 13/775,269, filed on Feb. 25, 2013, now Pat. No. 8,917,239, said application No. 14/140,635 is a continuation of application No. 13/732,456, filed on Jan. 2, 2013, now Pat. No. 8,643,628.

(60) Provisional application No. 62/462,034, filed on Feb. 22, 2017, provisional application No. 62/425,087, filed on Nov. 22, 2016, provisional application No. 62/266,011, filed on Dec. 11, 2015, provisional application No. 62/197,813, filed on Jul. 28, 2015, provisional application No. 62/107,536, filed on Jan. 26, 2015, provisional application No. 62/054,353, filed on Sep. 23, 2014, provisional application No. 61/986,341, filed on Apr. 30, 2014, provisional application No. 61/972,435, filed on Mar. 31, 2014, provisional application No. 61/929,992, filed on Jan. 22, 2014, provisional application No. 61/846,089, filed on Jul. 15, 2013, provisional application No. 61/838,296, filed on Jun. 23, 2013, provisional application No. 61/828,713, filed on May 30, 2013, provisional application No. 61/713,546, filed on Oct. 14, 2012.

(52) U.S. Cl.
CPC .. *G06F 3/0416* (2013.01); *G06F 2203/04102* (2013.01); *G06F 2203/04103* (2013.01); *G06F 2203/04104* (2013.01); *G09G 2380/02* (2013.01)

(58) Field of Classification Search
CPC  G06F 2203/04103; G06F 2203/04104; G09G 2380/02
See application file for complete search history.

(56) References Cited

U.S. PATENT DOCUMENTS

| | | |
|---|---|---|
| 4,301,447 A | 11/1981 | Funk et al. |
| 4,542,291 A | 9/1985 | Zimmerman |
| 4,588,258 A | 5/1986 | Hoopman |
| 4,641,426 A | 2/1987 | Hallinan et al. |
| 4,672,364 A | 6/1987 | Lucas |
| 4,703,316 A | 10/1987 | Sherbeck |
| 4,761,637 A | 8/1988 | Lucas et al. |
| 4,928,094 A | 5/1990 | Smith |
| 4,988,981 A | 1/1991 | Zimmerman et al. |
| 5,036,187 A | 7/1991 | Yoshida et al. |
| 5,070,411 A | 12/1991 | Suzuki |
| 5,103,085 A | 4/1992 | Zimmerman |
| 5,162,783 A | 11/1992 | Moreno |
| 5,194,863 A | 3/1993 | Barker et al. |
| 5,220,409 A | 6/1993 | Bures |
| 5,414,413 A | 5/1995 | Tamaru et al. |
| 5,463,725 A | 10/1995 | Henckel et al. |
| 5,559,727 A | 9/1996 | Deley et al. |
| 5,577,733 A | 11/1996 | Downing |
| 5,603,053 A | 2/1997 | Gough et al. |
| 5,729,250 A | 3/1998 | Bishop et al. |
| 5,748,185 A | 5/1998 | Stephan et al. |
| 5,825,352 A | 10/1998 | Bisset et al. |
| 5,880,462 A | 3/1999 | Hsia |
| 5,889,236 A | 3/1999 | Gillespie et al. |
| 5,900,863 A | 5/1999 | Numazaki |
| 5,914,709 A | 6/1999 | Graham et al. |
| 5,936,615 A | 8/1999 | Waters |
| 5,943,044 A | 8/1999 | Martinelli et al. |
| 5,946,134 A | 8/1999 | Benson et al. |
| 5,977,888 A | 11/1999 | Fujita et al. |
| 5,988,645 A | 11/1999 | Downing |
| 6,010,061 A | 1/2000 | Howell |
| 6,035,180 A | 3/2000 | Kubes et al. |
| 6,091,405 A | 7/2000 | Lowe et al. |
| 6,161,005 A | 12/2000 | Pinzon |
| 6,333,735 B1 | 12/2001 | Anvekar |
| 6,340,979 B1 | 1/2002 | Beaton et al. |
| 6,362,468 B1 | 3/2002 | Murakami et al. |
| 6,377,238 B1 | 4/2002 | McPheters |
| 6,421,042 B1 | 7/2002 | Omura et al. |
| 6,429,857 B1 | 8/2002 | Masters et al. |
| 6,492,978 B1 | 12/2002 | Selig et al. |
| 6,646,633 B1 | 11/2003 | Nicolas |
| 6,690,365 B2 | 2/2004 | Hinckley et al. |
| 6,690,387 B2 | 2/2004 | Zimmerman et al. |
| 6,707,449 B2 | 3/2004 | Hinckley et al. |
| 6,757,002 B1 | 6/2004 | Oross et al. |
| 6,762,077 B2 | 7/2004 | Schuurmans et al. |
| 6,788,292 B1 | 9/2004 | Nako et al. |
| 6,803,906 B1 | 10/2004 | Morrison et al. |
| 6,836,367 B2 | 12/2004 | Seino et al. |
| 6,864,882 B2 | 3/2005 | Newton |
| 6,874,683 B2 | 4/2005 | Keronen et al. |
| 6,875,977 B2 | 4/2005 | Wolter et al. |
| 6,947,032 B2 | 9/2005 | Morrison et al. |
| 6,954,197 B2 | 10/2005 | Morrison et al. |
| 6,972,401 B2 | 12/2005 | Akitt et al. |
| 6,972,834 B1 | 12/2005 | Oka et al. |
| 6,985,137 B2 | 1/2006 | Kaikuranta |
| 7,030,861 B1 | 4/2006 | Westerman et al. |
| 7,046,232 B2 | 5/2006 | Inagaki et al. |
| 7,054,045 B2 | 5/2006 | McPheters et al. |
| 7,133,032 B2 | 11/2006 | Cok |
| 7,162,124 B1 | 1/2007 | Gunn, III et al. |
| 7,170,590 B2 | 1/2007 | Kishida |
| 7,176,905 B2 | 2/2007 | Baharav et al. |
| 7,184,030 B2 | 2/2007 | McCharles et al. |
| 7,221,462 B2 | 5/2007 | Cavallucci |
| 7,225,408 B2 | 5/2007 | ORourke |
| 7,232,986 B2 | 6/2007 | Worthington et al. |
| 7,339,580 B2 | 3/2008 | Westerman et al. |
| 7,352,940 B2 | 4/2008 | Charters et al. |
| 7,369,724 B2 | 5/2008 | Deane |
| 7,372,456 B2 | 5/2008 | McLintock |

(56) References Cited

U.S. PATENT DOCUMENTS

| | | |
|---|---|---|
| 7,429,706 B2 | 9/2008 | Ho |
| 7,518,738 B2 | 4/2009 | Cavallucci et al. |
| 7,619,617 B2 | 11/2009 | Morrison et al. |
| 7,659,887 B2 | 2/2010 | Larsen et al. |
| 7,855,716 B2 | 12/2010 | McCreary et al. |
| 7,924,264 B2 | 4/2011 | Ohta |
| 8,022,941 B2 | 9/2011 | Smoot |
| 8,091,280 B2 | 1/2012 | Hanzel et al. |
| 8,115,745 B2 | 2/2012 | Gray |
| 8,120,625 B2 | 2/2012 | Hinckley |
| 8,139,045 B2 | 3/2012 | Jang et al. |
| 8,169,404 B1 | 5/2012 | Boillot |
| 8,193,498 B2 | 6/2012 | Cavallucci et al. |
| 8,243,047 B2 | 8/2012 | Chiang et al. |
| 8,269,740 B2 | 9/2012 | Sohn et al. |
| 8,289,299 B2 | 10/2012 | Newton |
| 8,316,324 B2 | 11/2012 | Boillot |
| 8,350,831 B2 | 1/2013 | Drumm |
| 8,426,799 B2 | 4/2013 | Drumm |
| 8,471,814 B2 | 6/2013 | LaFave et al. |
| 8,482,547 B2 | 7/2013 | Christiansson et al. |
| 8,508,505 B2 | 8/2013 | Shin et al. |
| 8,558,815 B2 | 10/2013 | Van Genechten et al. |
| 8,581,884 B2 | 11/2013 | Fahraeus et al. |
| 8,648,677 B2 | 2/2014 | Su et al. |
| 8,922,340 B2 | 12/2014 | Salter et al. |
| 8,933,876 B2 | 1/2015 | Galor et al. |
| 9,050,943 B2 | 6/2015 | Muller |
| 9,207,800 B1 | 12/2015 | Eriksson et al. |
| 9,223,431 B2 | 12/2015 | Pemberton-Pigott |
| 2001/0002694 A1 | 6/2001 | Nakazawa et al. |
| 2001/0022579 A1 | 9/2001 | Hirabayashi |
| 2001/0026268 A1 | 10/2001 | Ito |
| 2001/0028344 A1 | 10/2001 | Iwamoto et al. |
| 2001/0043189 A1 | 11/2001 | Brisebois et al. |
| 2001/0055006 A1 | 12/2001 | Sano et al. |
| 2002/0067348 A1 | 6/2002 | Masters et al. |
| 2002/0109843 A1 | 8/2002 | Ehsani et al. |
| 2002/0152010 A1 | 10/2002 | Colmenarez et al. |
| 2002/0175900 A1 | 11/2002 | Armstrong |
| 2003/0034439 A1 | 2/2003 | Reime et al. |
| 2003/0174125 A1 | 9/2003 | Torunoglu et al. |
| 2003/0231308 A1 | 12/2003 | Granger |
| 2003/0234346 A1 | 12/2003 | Kao |
| 2004/0046960 A1 | 3/2004 | Wagner et al. |
| 2004/0056199 A1 | 3/2004 | OConnor et al. |
| 2004/0090428 A1 | 5/2004 | Crandall, Jr. et al. |
| 2004/0140961 A1 | 7/2004 | Cok |
| 2004/0198490 A1 | 10/2004 | Bansemer et al. |
| 2004/0201579 A1 | 10/2004 | Graham |
| 2005/0024623 A1 | 2/2005 | Xie et al. |
| 2005/0073508 A1 | 4/2005 | Pittel et al. |
| 2005/0093846 A1 | 5/2005 | Marcus et al. |
| 2005/0104860 A1 | 5/2005 | McCreary et al. |
| 2005/0122308 A1 | 6/2005 | Bell et al. |
| 2005/0133702 A1 | 6/2005 | Meyer |
| 2005/0174473 A1 | 8/2005 | Morgan et al. |
| 2005/0271319 A1 | 12/2005 | Graham |
| 2006/0001654 A1 | 1/2006 | Smits |
| 2006/0018586 A1 | 1/2006 | Kishida |
| 2006/0028455 A1 | 2/2006 | Hinckley et al. |
| 2006/0077186 A1 | 4/2006 | Park et al. |
| 2006/0132454 A1 | 6/2006 | Chen et al. |
| 2006/0161870 A1 | 7/2006 | Hotelling et al. |
| 2006/0161871 A1 | 7/2006 | Hotelling et al. |
| 2006/0229509 A1 | 10/2006 | Al-Ali et al. |
| 2006/0236262 A1 | 10/2006 | Bathiche et al. |
| 2006/0238517 A1 | 10/2006 | King et al. |
| 2006/0244733 A1 | 11/2006 | Geaghan |
| 2007/0024598 A1 | 2/2007 | Miller et al. |
| 2007/0052693 A1 | 3/2007 | Watar |
| 2007/0077541 A1 | 4/2007 | Champagne et al. |
| 2007/0084989 A1 | 4/2007 | Lange et al. |
| 2007/0103436 A1 | 5/2007 | Kong |
| 2007/0146318 A1 | 6/2007 | Juh et al. |
| 2007/0152984 A1 | 7/2007 | Ording et al. |
| 2007/0176908 A1 | 8/2007 | Lipman et al. |
| 2008/0008472 A1 | 1/2008 | Dress et al. |
| 2008/0012835 A1 | 1/2008 | Rimon et al. |
| 2008/0012850 A1 | 1/2008 | Keating, III |
| 2008/0013913 A1 | 1/2008 | Lieberman et al. |
| 2008/0016511 A1 | 1/2008 | Hyder et al. |
| 2008/0055273 A1 | 3/2008 | Forstall |
| 2008/0056068 A1 | 3/2008 | Yeh et al. |
| 2008/0068353 A1 | 3/2008 | Lieberman et al. |
| 2008/0080811 A1 | 4/2008 | Deane |
| 2008/0089587 A1 | 4/2008 | Kim et al. |
| 2008/0093542 A1 | 4/2008 | Lieberman et al. |
| 2008/0096620 A1 | 4/2008 | Lee et al. |
| 2008/0100572 A1 | 5/2008 | Boillot |
| 2008/0100593 A1 | 5/2008 | Skillman et al. |
| 2008/0117183 A1 | 5/2008 | Yu et al. |
| 2008/0122792 A1 | 5/2008 | Izadi et al. |
| 2008/0122796 A1 | 5/2008 | Jobs et al. |
| 2008/0122803 A1 | 5/2008 | Izadi et al. |
| 2008/0134102 A1 | 6/2008 | Movold et al. |
| 2008/0158172 A1 | 7/2008 | Hotelling et al. |
| 2008/0158174 A1 | 7/2008 | Land et al. |
| 2008/0211779 A1 | 9/2008 | Pryor |
| 2008/0221711 A1 | 9/2008 | Trainer |
| 2008/0224836 A1 | 9/2008 | Pickering |
| 2008/0259053 A1 | 10/2008 | Newton |
| 2008/0273019 A1 | 11/2008 | Deane |
| 2008/0278460 A1 | 11/2008 | Arnett et al. |
| 2008/0297487 A1 | 12/2008 | Hotelling et al. |
| 2009/0009944 A1 | 1/2009 | Yukawa et al. |
| 2009/0027357 A1 | 1/2009 | Morrison |
| 2009/0058833 A1 | 3/2009 | Newton |
| 2009/0066673 A1 | 3/2009 | Molne et al. |
| 2009/0096994 A1 | 4/2009 | Smits |
| 2009/0102815 A1 | 4/2009 | Juni |
| 2009/0122027 A1 | 5/2009 | Newton |
| 2009/0135162 A1 | 5/2009 | Van De Wijdeven et al. |
| 2009/0139778 A1 | 6/2009 | Butler et al. |
| 2009/0153519 A1 | 6/2009 | Suarez Rovere |
| 2009/0166098 A1 | 7/2009 | Sunder |
| 2009/0167724 A1 | 7/2009 | Xuan et al. |
| 2009/0189857 A1 | 7/2009 | Benko et al. |
| 2009/0195402 A1 | 8/2009 | Izadi et al. |
| 2009/0198359 A1 | 8/2009 | Chaudhri |
| 2009/0280905 A1 | 11/2009 | Weisman et al. |
| 2009/0322673 A1 | 12/2009 | Cherradi El Fadili |
| 2010/0002291 A1 | 1/2010 | Fukuyama |
| 2010/0013763 A1 | 1/2010 | Futter et al. |
| 2010/0023895 A1 | 1/2010 | Benko et al. |
| 2010/0031203 A1 | 2/2010 | Morris et al. |
| 2010/0079407 A1 | 4/2010 | Suggs |
| 2010/0079409 A1 | 4/2010 | Sirotich et al. |
| 2010/0079412 A1 | 4/2010 | Chiang et al. |
| 2010/0095234 A1 | 4/2010 | Lane et al. |
| 2010/0134424 A1 | 6/2010 | Brisebois et al. |
| 2010/0149073 A1 | 6/2010 | Chaum et al. |
| 2010/0185341 A1 | 7/2010 | Wilson et al. |
| 2010/0238138 A1 | 9/2010 | Goertz et al. |
| 2010/0238139 A1 | 9/2010 | Goertz et al. |
| 2010/0245289 A1* | 9/2010 | Svajda ............... G06F 3/0421 |
| | | 345/175 |
| 2010/0289755 A1 | 11/2010 | Zhu et al. |
| 2010/0295821 A1 | 11/2010 | Chang et al. |
| 2010/0299642 A1 | 11/2010 | Merrell et al. |
| 2010/0302185 A1 | 12/2010 | Han et al. |
| 2010/0321289 A1 | 12/2010 | Kim et al. |
| 2011/0005367 A1 | 1/2011 | Hwang et al. |
| 2011/0043325 A1 | 2/2011 | Newman et al. |
| 2011/0043826 A1 | 2/2011 | Kiyose |
| 2011/0044579 A1 | 2/2011 | Travis et al. |
| 2011/0050639 A1 | 3/2011 | Challener et al. |
| 2011/0050650 A1 | 3/2011 | McGibney et al. |
| 2011/0057906 A1 | 3/2011 | Raynor et al. |
| 2011/0063214 A1 | 3/2011 | Knapp |
| 2011/0074734 A1 | 3/2011 | Wassvik et al. |
| 2011/0074736 A1 | 3/2011 | Takakura |
| 2011/0075418 A1 | 3/2011 | Mallory et al. |
| 2011/0087963 A1 | 4/2011 | Brisebois et al. |

(56) References Cited

U.S. PATENT DOCUMENTS

| | | |
|---|---|---|
| 2011/0090176 A1 | 4/2011 | Christiansson et al. |
| 2011/0116104 A1 | 5/2011 | Kao et al. |
| 2011/0122560 A1 | 5/2011 | Andre et al. |
| 2011/0128234 A1 | 6/2011 | Lipman et al. |
| 2011/0128729 A1 | 6/2011 | Ng |
| 2011/0148820 A1 | 6/2011 | Song |
| 2011/0157097 A1 | 6/2011 | Hamada et al. |
| 2011/0163956 A1 | 7/2011 | Zdralek |
| 2011/0163996 A1 | 7/2011 | Wassvik et al. |
| 2011/0169773 A1 | 7/2011 | Luo |
| 2011/0169780 A1 | 7/2011 | Goertz et al. |
| 2011/0169781 A1 | 7/2011 | Goertz et al. |
| 2011/0175533 A1 | 7/2011 | Holman et al. |
| 2011/0175852 A1 | 7/2011 | Goertz et al. |
| 2011/0179368 A1 | 7/2011 | King et al. |
| 2011/0179381 A1 | 7/2011 | King |
| 2011/0205175 A1 | 8/2011 | Chen |
| 2011/0205186 A1 | 8/2011 | Newton et al. |
| 2011/0221706 A1 | 9/2011 | McGibney et al. |
| 2011/0227487 A1 | 9/2011 | Nichol et al. |
| 2011/0227874 A1 | 9/2011 | Fahraeus et al. |
| 2011/0242056 A1 | 10/2011 | Lee et al. |
| 2011/0248151 A1 | 10/2011 | Holcombe et al. |
| 2011/0249309 A1 | 10/2011 | McPheters et al. |
| 2011/0310005 A1 | 12/2011 | Chen et al. |
| 2012/0050226 A1 | 3/2012 | Kato |
| 2012/0056821 A1 | 3/2012 | Goh |
| 2012/0068971 A1 | 3/2012 | Pemberton-Pigott |
| 2012/0068973 A1 | 3/2012 | Christiansson et al. |
| 2012/0071994 A1 | 3/2012 | Lengeling |
| 2012/0086672 A1 | 4/2012 | Tseng et al. |
| 2012/0098753 A1 | 4/2012 | Lu |
| 2012/0098794 A1 | 4/2012 | Kleinert et al. |
| 2012/0116548 A1 | 5/2012 | Goree et al. |
| 2012/0131186 A1 | 5/2012 | Klos et al. |
| 2012/0162078 A1 | 6/2012 | Ferren et al. |
| 2012/0176343 A1 | 7/2012 | Holmgren et al. |
| 2012/0188203 A1 | 7/2012 | Yao et al. |
| 2012/0188205 A1 | 7/2012 | Jansson et al. |
| 2012/0212457 A1 | 8/2012 | Drumm |
| 2012/0212458 A1 | 8/2012 | Drumm |
| 2012/0218229 A1 | 8/2012 | Drumm |
| 2012/0262408 A1* | 10/2012 | Pasquero ............. G06F 3/0421 345/174 |
| 2012/0306793 A1 | 12/2012 | Liu et al. |
| 2013/0044071 A1 | 2/2013 | Hu et al. |
| 2013/0127788 A1 | 5/2013 | Drumm |
| 2013/0127790 A1 | 5/2013 | Wassvik |
| 2013/0135259 A1 | 5/2013 | King et al. |
| 2013/0141395 A1 | 6/2013 | Holmgren et al. |
| 2013/0215034 A1 | 8/2013 | Oh et al. |
| 2013/0234171 A1 | 9/2013 | Heikkinen et al. |
| 2014/0049516 A1 | 2/2014 | Heikkinen et al. |
| 2014/0104160 A1 | 4/2014 | Eriksson et al. |
| 2014/0104240 A1 | 4/2014 | Eriksson et al. |
| 2015/0153777 A1 | 6/2015 | Liu et al. |
| 2015/0185945 A1* | 7/2015 | Lauber ................. G06F 1/1601 345/174 |
| 2015/0227213 A1 | 8/2015 | Cho |
| 2016/0154475 A1 | 6/2016 | Eriksson et al. |
| 2016/0154533 A1* | 6/2016 | Eriksson ................ G06F 3/041 345/175 |
| 2017/0185160 A1 | 6/2017 | Cho et al. |
| 2018/0267216 A1 | 9/2018 | Otsubo |
| 2020/0001556 A1 | 1/2020 | Otsubo |

FOREIGN PATENT DOCUMENTS

| | | |
|---|---|---|
| JP | 10-148640 A | 6/1998 |
| JP | 11-232024 A | 8/1999 |
| JP | 3240941 B2 | 12/2001 |
| JP | 2003-029906 A | 1/2003 |
| KR | 1020120120097 A | 11/2012 |
| KR | 1012682090000 B1 | 5/2013 |
| KR | 1020130053363 A | 5/2013 |
| KR | 1020130053364 A | 5/2013 |
| KR | 1020130053367 A | 5/2013 |
| KR | 1020130053377 A | 5/2013 |
| KR | 1020130054135 A | 5/2013 |
| KR | 1020130054150 A | 5/2013 |
| KR | 1020130133117 A | 12/2013 |
| WO | 8600446 A1 | 1/1986 |
| WO | 8600447 A1 | 1/1986 |
| WO | 2008004103 A2 | 1/2008 |
| WO | 2008133941 A2 | 11/2008 |
| WO | 2010011929 A1 | 1/2010 |
| WO | 2010015408 A1 | 2/2010 |
| WO | 2010134865 A1 | 11/2010 |
| WO | 2012017183 A1 | 2/2012 |
| WO | 2012089957 A1 | 7/2012 |
| WO | 2012089958 A1 | 7/2012 |
| WO | 2014041245 A1 | 3/2014 |
| WO | 2014194151 A2 | 12/2014 |
| WO | 2015161070 A2 | 10/2015 |
| WO | 2016048590 A1 | 3/2016 |
| WO | 2016122927 A1 | 8/2016 |

OTHER PUBLICATIONS

Moeller, J. et al., ZeroTouch: An Optical Multi-Touch and Free-Air Interaction Architecture, Proc. CHI 2012 Proceedings of the 2012 annual conference extended abstracts on Human factors in computing systems, May 5, 2012, pp. 2165-2174. ACM New York, NY, USA.

Moeller, J. et al., ZeroTouch: A Zero-Thickness Optical Multi-Touch Force Field, CHI EA '11 Proceedings of the 2011 annual conference extended abstracts on Human factors in computing systems, May 2011, pp. 1165-1170. ACM New York, NY, USA.

Moeller, J. et al., IntangibleCanvas: Free-Air Finger Painting on a Projected Canvas, CHI EA '11 Proceedings of the 2011 annual conference extended abstracts on Human factors in computing systems, May 2011, pp. 1615-1620. ACM New York, NY, USA.

Moeller, J. et al., Scanning FTIR: Unobtrusive Optoelectronic Multi-Touch Sensing through Waveguide Transmissivity Imaging, TEI '10 Proceedings of the fourth international conference on Tangible, embedded, and embodied interaction, Jan. 2010, pp. 73-76. ACM New York, NY, USA.

Plaisant, C., Wallace, D. (1992): Touchscreen Toggle Design. In: Bauersfeld, Penny, Bennett, John, Lynch, Gene (eds.) Proceedings of the ACM CHI 92 Human Factors in Computing Systems Conference Jun. 3-7, 1992, Monterey, California, pp. 667-668.

Van Loenen, Evert, et al., Entertable: A Solution for Social Gaming Experiences, Tangible Play Workshop, Jan. 28, 2007, pp. 16-19, Tangible Play Research and Design for Tangible and Tabletop Games, Workshop at the 2007 Intelligent User Interfaces Conference, Workshop Proceedings.

Butler et al., "SideSight: Multi-touch Interaction Around Smart Devices." UIST'08, Oct. 2008. http://131.107.65.14/en-us/um/people/shahrami/papers/sidesight.pdf.

Johnson, M., "Enhanced Optical Touch Input Panel", IBM Technical Disclosure Bulletin vol. 28, No. 4, Sep. 1985 pp. 1760-1762.

Rakkolainen, I., Höllerer, T., Diverdi, S. et al., Mid-air display experiments to create novel user interfaces, Multimed. Tools Appl. (2009) 44: 389, doi:10.1007/s11042-009-0280-1.

Hasegawa, K. et al., SIGGRAPH '15, ACM, SIGGRAPH 2015 Emerging Technologies, Article 18, Jul. 31, 2015, ACM, New York, NY, USA, ISBN: 978-1-4503-3635-2, doi: 10 1145/2782782. 2785589.

* cited by examiner

MULTI-PLANE REFLECTIVE SENSOR

CROSS REFERENCES TO RELATED APPLICATIONS

This application claims priority benefit of U.S. Provisional patent Application No. 62/425,087, entitled OPTICAL PROXIMITY SENSOR AND ASSOCIATED USER INTERFACE, filed on Nov. 22, 2016 by inventors Thomas Eriksson, Alexander Jubner, Rozita Teymourzadeh, Stefan Holmgren, Lars Sparf and Bengt Henry Hjalmar Edlund.

This application claims priority benefit of U.S. Provisional patent Application No. 62/462,034, entitled 3D IMAGING WITH OPTICAL PROXIMITY SENSOR, filed on Feb. 22, 2017 by inventors Thomas Eriksson, Alexander Jubner, Rozita Teymourzadeh, Stefan Holmgren, Lars Sparf, Bengt Henry Hjalmar Edlund.

This application is a continuation-in-part of U.S. patent application Ser. No. 14/960,369, entitled INTEGRATED LIGHT GUIDE AND TOUCH SCREEN FRAME AND MULTI-TOUCH DETERMINATION METHOD, filed on Dec. 5, 2015 by inventors Thomas Eriksson, Alexander Jubner, John Karlsson, Lars Sparf, Saska Lindfors and Robert Pettersson.

U.S. patent application Ser. No. 14/960,369 is a continuation of U.S. patent application Ser. No. 14/588,462, now U.S. Pat. No. 9,207,800, entitled INTEGRATED LIGHT GUIDE AND TOUCH SCREEN FRAME AND MULTI-TOUCH DETERMINATION METHOD, filed on Jan. 2, 2015 by inventors Thomas Eriksson, Alexander Jubner, John Karlsson, Lars Sparf, Saska Lindfors and Robert Pettersson.

U.S. patent application Ser. No. 14/588,462 claims priority benefit of U.S. Provisional Patent Application No. 62/054,353, entitled INTEGRATED LIGHT GUIDE AND TOUCH SCREEN FRAME AND MULTI-TOUCH DETERMINATION METHOD, filed on Sep. 23, 2014 by inventors Saska Lindfors, Robert Pettersson, John Karlsson and Thomas Eriksson.

This application is a continuation-in-part of U.S. patent application Ser. No. 15/000,815, entitled OPTICAL PROXIMITY SENSOR AND ASSOCIATED USER INTERFACE, filed on Jan. 19, 2016 by inventors Thomas Eriksson, Alexander Jubner, Rozita Teymourzadeh, håkan Sven Erik Andersson, Per Rosengren, Xiatao Wang, Stefan Holmgren, Gunnar Martin Fröjdh, Simon Fellin, Jan Tomas Hartman, Oscar Sverud, Sangtaek Kim, Rasmus Dahl-Örn, Richard Berglind, Karl Erik Patrik Nordstrom, Lars Sparf, Erik Rosengren, John Karlsson, Remo Behdasht, Robin Kjell Åman, Joseph Shain, Oskar Hagberg and Joel Rozada.

U.S. patent application Ser. No. 15/000,815 claims priority benefit from:

U.S. Provisional Application No. 62/107,536 entitled OPTICAL PROXIMITY SENSORS and filed on Jan. 26, 2015 by inventors Stefan Holmgren, Oscar Sverud, Sairam Iyer, Richard Berglind, Karl Erik Patrik Nordstrom, Lars Sparf, Per Rosengren, Erik Rosengren, John Karlsson, Thomas Eriksson, Alexander Jubner, Remo Behdasht, Simon Fellin, Robin Kjell Åman and Joseph Shain;

U.S. Provisional Application No. 62/197,813 entitled OPTICAL PROXIMITY SENSOR and filed on Jul. 28, 2015 by inventors Rozita Teymourzadeh, Håkan Sven Erik Andersson, Per Rosengren, Xiatao Wang, Stefan Holmgren, Gunnar Martin Fröjdh and Simon Fellin; and U.S. Provisional Application No. 62/266,011 entitled OPTICAL PROXIMITY SENSOR and filed on Dec. 11, 2015 by inventors Thomas Eriksson, Alexander Jubner, Rozita Teymourzadeh, Håkan Sven Erik Andersson, Per Rosengren, Xiatao Wang, Stefan Holmgren, Gunnar Martin Fröjdh, Simon Fellin and Jan Tomas Hartman.

U.S. patent application Ser. No. 15/000,815 is a continuation-in-part of U.S. patent application Ser. No. 14/630,737, entitled LIGHT-BASED PROXIMITY DETECTION SYSTEM AND USER INTERFACE and filed on Feb. 25, 2015 by inventors Thomas Eriksson and Stefan Holmgren.

U.S. patent application Ser. No. 14/630,737 is a continuation of U.S. patent application Ser. No. 14/140,635, now U.S. Pat. No. 9,001,087, entitled LIGHT-BASED PROXIMITY DETECTION SYSTEM AND USER INTERFACE and filed on Dec. 26, 2013 by inventors Thomas Eriksson and Stefan Holmgren.

U.S. patent application Ser. No. 14/140,635 is a continuation of U.S. patent application Ser. No. 13/732,456, now U.S. Pat. No. 8,643,628, entitled LIGHT-BASED PROXIMITY DETECTION SYSTEM AND USER INTERFACE and filed on Jan. 2, 2013 by inventors Thomas Eriksson and Stefan Holmgren.

U.S. patent application Ser. No. 13/732,456 claims priority benefit of U.S. Provisional Patent Application Ser. No. 61/713,546, entitled LIGHT-BASED PROXIMITY DETECTION SYSTEM AND USER INTERFACE and filed on Oct. 14, 2012 by inventor Stefan Holmgren.

U.S. patent application Ser. No. 15/000,815 is a continuation-in-part of U.S. patent application Ser. No. 14/726,533, entitled OPTICAL TOUCH SCREENS and filed on May 31, 2015 by inventors Robert Pettersson, Per Rosengren, Erik Rosengren, Stefan Holmgren, Lars Sparf, Richard Berglind, Thomas Eriksson, Karl Erik Patrik Nordstrom, Gunnar Martin Fröjdh, Xiatao Wang and Remo Behdasht.

U.S. patent application Ser. No. 14/726,533 is a continuation of U.S. patent application Ser. No. 14/311,366, now U.S. Pat. No. 9,063,614, entitled OPTICAL TOUCH SCREENS and filed on Jun. 23, 2014 by inventors Robert Pettersson, Per Rosengren, Erik Rosengren, Stefan Holmgren, Lars Sparf, Richard Berglind, Thomas Eriksson, Karl Erik Patrik Nordstrom, Gunnar Martin Fröjdh, Xiatao Wang and Remo Behdasht.

U.S. patent application Ser. No. 14/311,366 is a continuation of PCT Patent Application No. PCT/US14/40579, entitled OPTICAL TOUCH SCREENS and filed on Jun. 3, 2014 by inventors Robert Pettersson, Per Rosengren, Erik Rosengren, Stefan Holmgren, Lars Sparf, Richard Berglind, Thomas Eriksson, Karl Erik Patrik Nordstrom, Gunnar Martin Fröjdh, Xiatao Wang and Remo Behdasht.

This application is a continuation-in-part of U.S. patent application Ser. No. 14/880,231, entitled GAMING DEVICE and filed on Oct. 11, 2015 by inventors Stefan Holmgren, Sairam Iyer, Richard Berglind, Karl Erik Patrik Nordstrom, Lars Sparf, Per Rosengren, Erik Rosengren, John Karlsson, Thomas Eriksson, Alexander Jubner, Remo Behdasht, Simon Fellin, Robin Åman and Joseph Shain.

U.S. patent application Ser. No. 14/880,231 is a divisional of U.S. patent application Ser. No. 14/312,787, now U.S. Pat. No. 9,164,625, entitled OPTICAL PROXIMITY SENSORS and filed on Jun. 24, 2014 by inventors Stefan Holmgren, Sairam Iyer, Richard Berglind, Karl Erik Patrik Nordström, Lars Sparf, Per Rosengren, Erik Rosengren, John Karlsson, Thomas Eriksson, Alexander Jubner, Remo Behdasht, Simon Fellin, Robin Åman and Joseph Shain.

U.S. patent application Ser. No. 15/000,815 is a continuation-in-part of U.S. patent application Ser. No. 14/555,731, entitled DOOR HANDLE WITH OPTICAL PROXIMITY SENSORS and filed on Nov. 28, 2014 by inventors Sairam Iyer, Stefan Holmgren and Per Rosengren.

U.S. patent application Ser. No. 15/000,815 is a continuation-in-part of U.S. patent application Ser. No. 14/791,414, entitled OPTICAL PROXIMITY SENSOR FOR TOUCH SCREEN AND ASSOCIATED CALIBRATION TOOL and filed on Jul. 4, 2015 by inventors Per Rosengren, Xiatao Wang and Stefan Holmgren.

U.S. patent application Ser. No. 14/312,787 is a continuation-in-part of U.S. patent application Ser. No. 13/775,269, now U.S. Pat. No. 8,917,239, entitled REMOVABLE PROTECTIVE COVER WITH EMBEDDED PROXIMITY SENSORS and filed on Feb. 25, 2013 by inventors Thomas Eriksson, Stefan Holmgren, John Karlsson, Remo Behdasht, Erik Rosengren and Lars Sparf.

U.S. patent application Ser. No. 14/312,787 is also a continuation of PCT Application No. PCT/US14/40112, entitled OPTICAL PROXIMITY SENSORS and filed on May 30, 2014 by inventors Stefan Holmgren, Sairam Iyer, Richard Berglind, Karl Erik Patrik Nordstrom, Lars Sparf, Per Rosengren, Erik Rosengren, John Karlsson, Thomas Eriksson, Alexander Jubner, Remo Behdasht, Simon Fellin, Robin Åman and Joseph Shain.

PCT Application No. PCT/US14/40112 claims priority benefit from:
- U.S. Provisional Patent Application No. 61/846,089, entitled PROXIMITY SENSOR FOR LAPTOP COMPUTER AND ASSOCIATED USER INTERFACE and filed on Jul. 15, 2013 by inventors Richard Berglind, Thomas Eriksson, Simon Fellin, Per Rosengren, Lars Sparf, Erik Rosengren, Joseph Shain, Stefan Holmgren, John Karlsson and Remo Behdasht;
- U.S. Provisional Patent Application No. 61/838,296, entitled OPTICAL GAME ACCESSORIES USING REFLECTED LIGHT and filed on Jun. 23, 2013 by inventors Per Rosengren, Lars Sparf, Erik Rosengren, Thomas Eriksson, Joseph Shain, Stefan Holmgren, John Karlsson and Remo Behdasht; and
- U.S. Provisional Patent Application No. 61/828,713, entitled OPTICAL TOUCH SCREEN SYSTEMS USING REFLECTED LIGHT and filed on May 30, 2013 by inventors Per Rosengren, Lars Sparf, Erik Rosengren and Thomas Eriksson.

The contents of these applications are hereby incorporated by reference in their entireties.

FIELD OF THE INVENTION

The field of the present invention is curved and flexible touch surface systems using optical touch sensors.

BACKGROUND OF THE INVENTION

Large curved displays reduce outer edge distortions and provide a panoramic view. Curved display screens are also used in certain mobile phones. One of the issues in the use of curved screens in commercial electronics is how accurately it can work with a touch sensor.

A flexible display is an electronic visual display which is flexible in nature; as opposed to the more prevalent traditional flat screen displays used in most electronics devices. In recent years there has been a growing interest from numerous consumer electronics manufacturers to apply this display technology in e-readers, mobile phones and other consumer electronics (—Wikipedia, "Flexible display"). The flexible nature of the display prevents manufacturers from adding conventional touch sensors to flexible displays.

The Wi-Fi Alliance launched the Miracast certification program at the end of 2012. WI-FI ALLIANCE and MIRACAST are registered trademarks of WI-FI Alliance Corporation California. Devices that are Miracast-certified can communicate with each other, regardless of manufacturer. Adapters are available that plug into High-Definition Multimedia Interface (HDMI) or Universal Serial Bus (USB) ports, allowing devices without built-in Miracast support to connect via Miracast. Miracast employs the peer-to-peer Wi-Fi Direct standard to send video and audio. WI-FI DIRECT is a registered trademark of WI-FI Alliance Corporation California. IPv4 is used on the Internet layer. On the transport layer, TCP or UDP are used. On the application layer, the stream is initiated and controlled via RTSP, RTP for the data transfer.

The present invention enables touch and gesture input on a Miracast-connected TV, monitor or projector to be detected and communicated back to the server, laptop, tablet or smartphone that originally sent the displayed image.

SUMMARY

There is thus provided in accordance with an embodiment of the present invention touch system having a curved touch surface, including a housing, a curved surface near the housing, light emitters mounted in the housing projecting light beams out of the housing over and across the curved surface, such that at least some of the light beams are incident upon and reflected by the curved surface when crossing over the curved surface, light detectors mounted in the housing detecting reflections, by a reflective object touching the curved surface, of the light beams projected by the light emitters, lenses mounted and oriented in the housing relative to the light emitters and to the light detectors such that (i) there is a particular angle of entry at which each light detector receives a maximal light intensity when light beams enter a lens corresponding to the light detector at the particular angle of entry, and (ii) there are target positions, associated with emitter-detector pairs, on the curved surface, whereby for each emitter-detector pair, when the object is located at the target position associated with the emitter-detector pair, then light beams emitted by the light emitter of that pair are reflected by the object into the lens corresponding to the light detector of that pair at the particular angle of entry, and a processor connected to the light emitters and to the light detectors, synchronously co-activating emitter-detector pairs, and calculating a location of the object touching the curved surface by determining an emitter-detector pair among the co-activated emitter-detector pairs, for which the light detector of the pair detects a maximal amount of light, and by identifying the target position associated with the pair.

In certain embodiments of the invention, the curved surface is a retractable surface.

In certain embodiments of the invention, the curved surface includes a first portion that is flat and a second portion that is curved, the second portion being further from the housing than the first portion, and when the object touches the second portion of the curved surface, some of the light reflected by the object is incident upon and reflected by the curved surface while crossing the curved surface toward the light detectors.

In certain embodiments of the invention, the processor is configured to calculate the location of the object by additionally determining positions associated with co-activated emitter-detector pairs that neighbor the thus-identified position, and calculating a weighted average of the thus-identified position and the thus-determined neighboring positions, wherein each position's weight in the average corresponds to a degree of detection of the reflected light beam for the emitter-detector pair to which that position is associated.

There is additionally provided in accordance with an embodiment of the present invention a touch system having a flexible touch surface, including a housing, a flexible surface near the housing, light emitters mounted in the housing projecting light beams out of the housing over and across the flexible surface such that, when the flexible surface is concavely flexed, at least some of the light beams are incident upon and reflected by the flexible surface as they cross over the flexible surface, light detectors mounted in the housing detecting reflections, by a reflective object touching the flexible surface, of the light beams projected by the emitters, lenses mounted and oriented in the housing relative to the light emitters and to the light detectors such that (i) there is a particular angle of entry at which each light detector receives a maximal light intensity when light beams enter a lens corresponding to the light detector at the particular angle of entry, and (ii) there are target positions, associated with emitter-detector pairs, on the flexible surface, whereby for each emitter-detector pair, when the object is located at the target position associated with the emitter-detector pair, then light beams emitted by the light emitter of that pair are reflected by the object into the lens corresponding to the light detector of that pair at the particular angle of entry, and a processor connected to the light emitters and to the light detectors, synchronously co-activating emitter-detector pairs, and calculating a location of the object touching the flexible surface by determining an emitter-detector pair among the co-activated emitter-detector pairs, for which the light detector of the pair detects a maximal amount of light, and by identifying the target position associated with the pair.

In certain embodiments of the invention, the flexible surface is retractable into the housing.

In certain embodiments of the invention, when the flexible display screen is concavely curved, and the object is touching a curved portion of the flexible surface, some of the light reflected by the object is incident upon and reflected by the flexible surface while crossing the flexible surface toward the light detectors.

In certain embodiments of the invention, the processor is configured to calculate a location of the object by additionally determining positions associated with co-activated emitter-detector pairs that neighbor the thus-identified position, and calculating a weighted average of the thus-identified position and the thus-determined neighboring positions, wherein each position's weight in the average corresponds to a degree of detection of the reflected light beam for the emitter-detector pair to which that position is associated.

There is further provided in accordance with an embodiment of the present invention a method of generating a three-dimensional image of an object using an optical proximity sensor in the shape of a bar, the sensor including a linear array of interleaved individually activatable light emitters and photodiode detectors mounted in the bar, a plurality of lenses through which light emitted by the emitters is projected into a planar airspace outside the bar, and through which light reflected by an object in the planar airspace is projected onto the photodiode detectors, wherein each lens is paired with: (i) a respective one of the emitters, to maximize outgoing light emission in a specific direction at an angle, designated θ, relative to the bar, the angle θ being the same for each lens-emitter pair, and (ii) respective first and second ones of the photodiode detectors, to maximize incoming reflected light detection at respective first and second specific directions at respective angles, designated $\varphi_1$ and $\varphi_2$, relative to the bar, the angle $\varphi_1$ being the same for each first detector-lens pair, and the angle $\varphi_2$ being the same for each second detector-lens pair, the method including repeatedly moving the proximity sensor, such that light emitted by the emitters is projected into a different planar airspace after each move, repeatedly selectively activating the emitters and the photodiode detectors, repeatedly identifying locations on the object in the planar airspace, based on outputs of the photodiode detectors and the known angles θ, $\varphi_1$ and $\varphi_2$, and combining the identified locations to generate a three-dimensional image of the object, based on the orientations of the different planar airspaces.

In certain embodiments of the invention, the method further includes repeatedly identifying a shape of the object in the planar airspace, based on the identified locations, and combining the identified shapes to generate a three-dimensional image of the object, based on the orientations of the different planar airspaces.

In certain embodiments of the invention, the combining of the identified locations creates a point cloud of the object.

In certain embodiments of the invention, the method further includes repeatedly identifying a size of the object in the planar airspace, based on outputs of the photodiode detectors and the known angles θ, $\varphi_1$ and $\varphi_2$, and combining the identified sizes in the different planar airspaces to derive a three-dimensional volume that contains the object, based on orientations of the planar airspaces.

In certain embodiments of the invention, the method further includes repeatedly identifying a distance between the object and the bar in the planar airspace, based on outputs of the photodiode detectors and the known angles θ, $\varphi_1$ and $\varphi_2$, and combining the identified distances in the different planar airspaces to derive a location of the object, based on orientations of the planar airspaces.

In certain embodiments of the invention, the light emitters are laser diodes.

In certain embodiments of the invention, the sensor bar further includes at least one inertial measurement unit (IMU), the method further including repeatedly identifying the orientation of the planar airspace based on outputs of the at least one IMU.

There is yet further provided in accordance with an embodiment of the present invention a handheld 3D scanner including a housing that can be lifted and moved by a human hand, a linear array of interleaved individually activatable light emitters and photodiode detectors mounted in the housing, a plurality of lenses, mounted in the housing, through which light emitted by the emitters is projected into a planar airspace outside the housing, and through which light reflected by the object in the planar airspace is directed onto the photodiode detectors, wherein each lens is paired with: (i) a respective one of the emitters, to maximize outgoing light emission in a specific direction at an angle, designated θ, relative to the lens, the angle θ being the same for each lens-emitter pair, and (ii) respective first and second ones of the photodiode detectors, to maximize incoming reflected light detection at respective first and second specific directions at respective angles, designated $\varphi_1$ and $\varphi_2$, relative to the lens, the angle $\varphi_1$ being the same for each first detector-lens pair, and the angle $\varphi_2$ being the same for each second detector-lens pair, at least one inertial measurement unit mounted in the housing and tracking the changing orientations of the planar airspace when the housing is lifted and moved, a processor (i) connected to the emitters and photodiode detectors repeatedly selectively activating the emitters and the photodiode detectors, repeatedly identifying a shape of the object in the planar airspace, based on outputs of the photodiode detectors and the known angles θ, $\varphi_1$ and $\varphi_2$, (ii) connected to the inertial measurement unit, and (iii) combining the identified shapes to generate a three-dimensional image of the object, based on the tracked orientations of the planar airspaces.

There is moreover provided in accordance with an embodiment of the present invention a handheld 3D scanner including a housing that can be lifted and moved by a human hand, a linear array of interleaved individually activatable light emitters and photodiode detectors mounted in the housing, a plurality of lenses, mounted in the housing, through which light emitted by the emitters is projected into a planar airspace outside the housing, and through which light reflected by the object in the planar airspace is directed onto the photodiode detectors, wherein each lens is paired with: (i) a respective one of the emitters, to maximize outgoing light emission in a specific direction at an angle, designated θ, relative to the lens, the angle θ being the same for each lens-emitter pair, and (ii) respective first and second ones of the photodiode detectors, to maximize incoming reflected light detection at respective first and second specific directions at respective angles, designated $\varphi_1$ and $\varphi_2$, relative to the lens, the angle $\varphi_1$ being the same for each first detector-lens pair, and the angle $\varphi_2$ being the same for each second detector-lens pair, at least one inertial measurement unit mounted in the housing tracking the changing orientations of the planar airspace when the housing is lifted and moved, a processor (i) connected to the emitters and photodiode detectors repeatedly selectively activating the emitters and the photodiode detectors, repeatedly identifying locations on the object in the planar airspace, based on outputs of the photodiode detectors and the known angles θ, $\varphi_1$ and $\varphi_2$, (ii) connected to the inertial measurement unit, and (iii) combining the identified locations to generate a three-dimensional point cloud of the object, based on the tracked orientations of the planar airspaces.

There is additionally provided in accordance with an embodiment of the present invention a scanning system including a rotating stand on which an object is placed, a linear array of interleaved individually activatable light emitters and photodiode detectors, a plurality of lenses through which light emitted by the emitters is projected into a planar airspace above the rotating stand and through which light reflected by the object in the planar airspace is directed onto the photodiode detectors, wherein each lens is paired with: (i) a respective one of the emitters, to maximize outgoing light emission in a specific direction at an angle, designated θ, relative to the lens, the angle θ being the same for each lens-emitter pair, and (ii) respective first and second ones of the photodiode detectors, to maximize incoming reflected light detection at respective first and second specific directions at respective angles, designated $\varphi_1$ and $\varphi_2$, relative to the lens, the angle $\varphi_1$ being the same for each first detector-lens pair, and the angle $\varphi_2$ being the same for each second detector-lens pair, a motor connected to the stand incrementally rotating the object, such that light emitted by the emitters is reflected by a different portion of the object after each move, a processor connected to the emitters and the photodiode detectors repeatedly selectively activating the emitters and the photodiode detectors, repeatedly identifying a shape of the object in the planar airspace, based on outputs of the photodiode detectors and the known angles θ, $\varphi_1$ and $\varphi_2$, and combining the identified shapes to generate a three-dimensional image of the object, based on those portions of the object that intersect the planar airspaces.

There is further provided in accordance with an embodiment of the present invention a fitting room system including the scanning system described in the previous paragraph, wherein the object is a shopper for clothes, wherein the processor extracts body measurements of the shopper from the three-dimensional image of the object, wherein the processor is communicatively coupled to a database of clothes indexed by at least one of the body measurements, and wherein the processor runs a query on the database that returns database items that match at least one of the body measurements, and a display connected to the processor displaying the database items returned by the query.

In certain embodiments of the fitting room system, the processor creates an avatar of the shopper based on the body measurements and renders an image of the avatar wearing the database items returned by the query.

There is yet further provided in accordance with an embodiment of the present invention an avatar generator including the scanning system described hereinabove wherein the processor creates an avatar of the object based on the three-dimensional image of the object.

In certain embodiments of the avatar generator, the processor is connected to a network, and the processor outputs the avatar over the network to a computer storing a user profile to which the avatar is added.

There is moreover provided in accordance with an embodiment of the present invention a touch pad for determining locations of multiple objects concurrently touching the pad, including a housing, an exposed surface mounted in the housing, two proximity sensor bars mounted in the housing along different edges of the exposed surface, each proximity sensor bar including a plurality of light pulse emitters projecting light out of the housing along a detection plane over and parallel to the exposed surface, a plurality of light detectors detecting reflections of the light projected by the emitters, by a reflective object passing through the detection plane, a plurality of lenses oriented relative to the emitters and the detectors in such a manner that each emitter-detector pair has a target position in the detection plane associated therewith, the target position being such that when the object is located at the target position, light emitted by the emitter of that pair passes through one of the lenses and is reflected by the object back through one of the lenses to the detector of that pair, wherein the target positions associated with emitter-detector pairs of each of the proximity sensor bars comprise some common positions, and a processor mounted in the housing and connected to the emitters and to the detectors of the two proximity sensor bars, the processor synchronously co-activating respective emitter-detector pairs of the two proximity sensor bars that are associated with common target positions, and determining locations of multiple objects that are concurrently passing through the detection plane.

In certain embodiments of the touch pad invention, the proximity sensor bars are mounted along adjacent edges of the exposed surface.

In certain embodiments of the touch pad invention, the proximity sensor bars are mounted along opposite edges of the exposed surface.

There is additionally provided in accordance with an embodiment of the present invention an interactive computer system including a first processor configured (i) to render a graphical user interface (GUI), and (ii) to respond to input to the GUI, a display device that renders the GUI on a surface, a first wireless transmitter and receiver transmitting the GUI from the first processor to the display device, wherein the transmitter is connected to the first processor and the receiver is connected to the display device, a proximity sensor, including a housing mounted along an edge of the surface, a plurality of light emitters mounted in the housing operable when activated to project light out of the housing over the surface, a plurality of light detectors mounted in the housing operable when activated to detect amounts of arriving light, and a second processor connected to the emitters and to the detectors, configured (i) to selectively activate the light emitters and the light detectors, and (ii) to identify the location of an object touching the surface, based on amounts of light detected by the activated detectors when the object reflects light projected by the activated light emitters back into the housing, a second wireless transmitter and receiver transmitting the identified location to the first processor as input to the GUI, wherein the transmitter is connected to the second processor and the receiver is connected to the first processor.

In certain embodiments of the computer system, the first processor, the first transmitter and the second receiver are mounted in a mobile phone, and wherein the display device is one of the group consisting of: a TV, a computer monitor and a projector.

In certain embodiments of the computer system, the first processor and the first transmitter are mounted in a mobile phone, wherein the second receiver is mounted in a dongle that is removably connected to the mobile phone and wherein the display device is one of the group consisting of: a TV, a computer monitor and a projector.

In certain embodiments of the computer system, the first processor, the first transmitter and the second receiver comprise a server, and wherein the display device is a thin client.

There is further provided in accordance with an embodiment of the present invention an interactive computer system including a display, a housing mounted along an edge of the display, a proximity sensor mounted in the housing, including a plurality of light emitters operable when activated to project light out of the housing over the display, and a plurality of light detectors operable when activated to detect amounts of arriving light, a processor mounted in the housing configured (i) to render a graphical user interface (GUI), (ii) to selectively activate the light emitters and the light detectors, and (iii) to identify one or more locations of an object touching the display, based on amounts of light detected by the activated detectors when the object reflects light projected by the activated light emitters back into the housing, and a wireless transmitter and receiver transmitting the GUI from the processor to the display, wherein the transmitter is connected to the processor and the receiver is connected to the display and wherein the processor is further configured to respond to the identified one or more locations as input to the GUI.

There is yet further provided in accordance with an embodiment of the present invention an optical assembly for detecting locations of objects in any of multiple parallel spatial planes, featuring a reflectance-based sensor that emits light into a single detection plane of the sensor and detects reflections of the emitted light, reflected by an object located in the detection plane of the sensor, a light re-director positioned away from the sensor that re-directs light emitted by the sensor into one or more spatial planes parallel to the detection plane of the sensor and, when the object is located in the one or more spatial planes, re-directs light reflected by the object into the detection plane of the sensor, and a processor connected to the sensor that controls light emitted by the sensor and, when an object passes through one or more of the spatial planes, the processor identifies both (i) the spatial planes through which the object passes, and (ii) the location of the object within the spatial planes through which it passes.

In certain embodiments of the optical assembly, the reflectance-based sensor includes an array of interleaved light emitters and photodiodes.

In certain embodiments of the optical assembly, the reflectance-based sensor includes a time-of-flight sensor.

In certain embodiments of the optical assembly, the reflectance-based sensor includes two cameras.

In certain embodiments of the optical assembly, the light re-director is a folding mirror.

In certain embodiments of the optical assembly, the light re-director is a beam splitter.

There is moreover provided in accordance with an embodiment of the present invention a method for detecting locations of objects in any of multiple parallel spatial planes, featuring: providing an optical assembly including (a) a reflectance-based sensor that emits light into a single detection plane of the sensor and detects reflections of the emitted light, reflected by an object located in the detection plane of the sensor, and (b) a light re-director positioned away from the sensor that re-directs light emitted by the sensor into one or more spatial planes parallel to the detection plane of the sensor and, when the object is located in the one or more spatial planes, re-directs light reflected by the object into the detection plane of the sensor, providing a processor connected to the sensor that controls light emitted by the sensor and processes light detected by the sensor, and when an object passes through one or more of the spatial planes, detecting, by the processor, both (i) the spatial planes through which the object passes, and (ii) the location of the object within the spatial planes through which it passes, including: detecting, by the processor, one or more virtual locations of the object within the detection plane of the sensor, based on light reflected by the object that is re-directed to the detection plane of the sensor and detected by the sensor, and transforming, by the processor, the one or more virtual locations of the object within the detection plane of the sensor to corresponding one or more real locations of the object within one or more spatial planes parallel to the detection plane of the sensor, based on the position of the light re-director relative to the sensor.

BRIEF DESCRIPTION OF THE DRAWINGS

The present invention will be more fully understood and appreciated from the following detailed description, taken in conjunction with the drawings in which.

The following table catalogs the numbered elements and lists the figures in which each numbered element appears. Similarly numbered elements represent elements of the same type, but they need not be identical elements.

Numbered Elements

Figure 1:
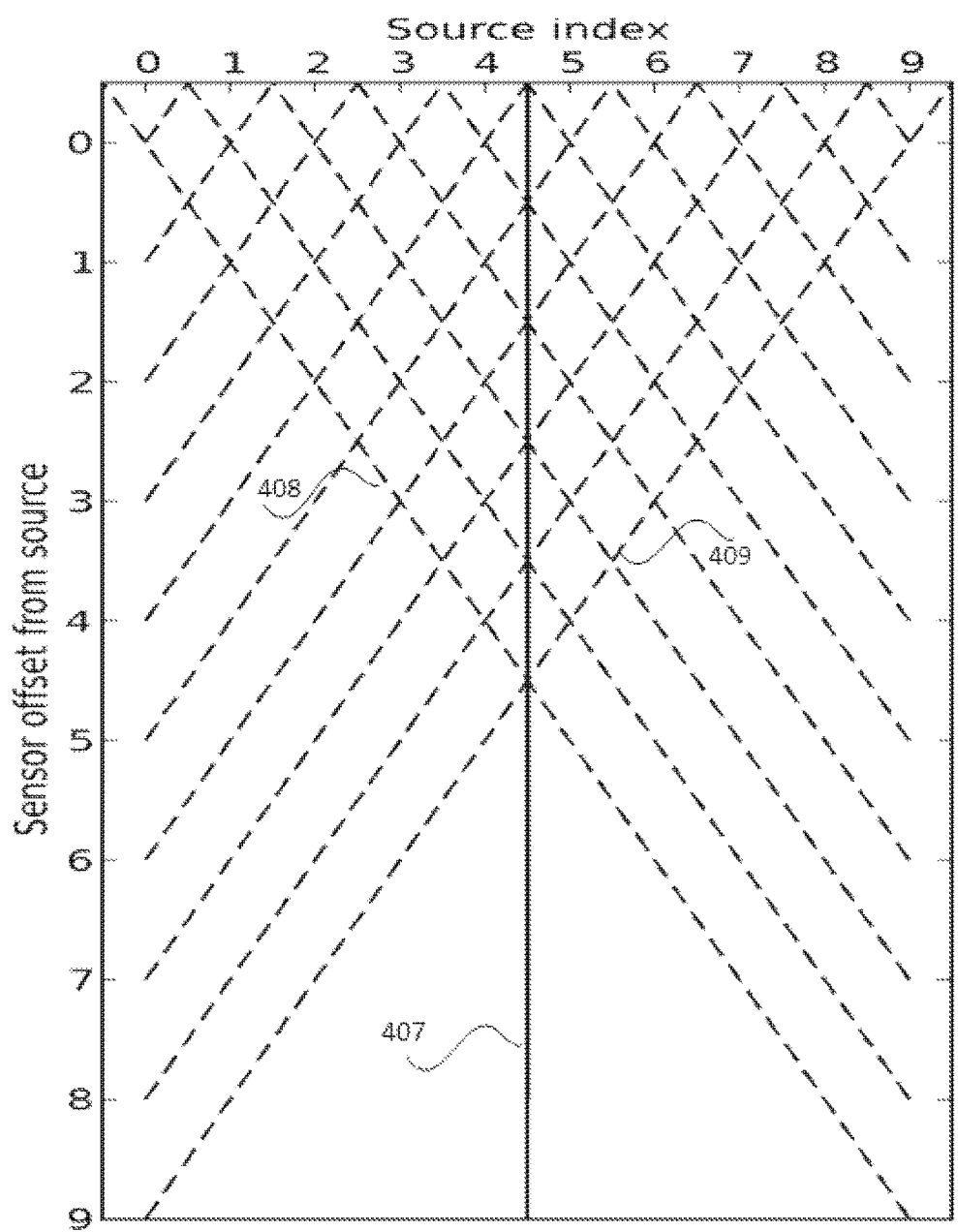
FIG. 1 is a simplified illustration of light being emitted from light sources along a solid line, and being reflected along dashed lines to light sensors, in accordance with an embodiment of the present invention.

| Element | Description | Figures |
| --- | --- | --- |
| 101-110 | emitter | 10-18, 20, 21, 23, 25, 91-95, 103 |
| 201-211 | photo-detector | 10-18, 20, 21, 23, 25, 91-95, 103 |
| 301-304 | lens | 10-15, 17, 18, 20, 21 |
| 305 | reflectors | 38 |
| 306 | lens | 39 |
| 307 | refractive surface | 39 |
| 308 | reflective surface | 39 |
| 309 | light guide | 87, 88 |
| 401, 404, 407, 421, 426-429 | emitted light beam | 1, 10-18, 20, 21, 25, 83, 84, 88, 94-98, 103-106 |
| 402, 403, 405, 406, 408, 409, 422-424, 430-435 | reflected light beam | 1, 10-12, 14-18, 20, 21, 25, 83, 84, 95, 97, 98, 103 |
| 411, 412 | proximity sensor light beams | 38, 39 |
| 420 | focus | 39 |
| 425 | extension of light beam | 82 |
| 501 | proximity sensor bar | 10-23, 82, 90-93, 96-108 |
| 510, 511 | proximity sensor bar | 27-31, 36-42, 44, 47, 49-51, 53, 83-88 |
| 512, 513 | wireless communications chip | 89, 91-93 |
| 601, 602 | arrow | 14, 15 |
| 603-623 | location | 41, 42, 44, 53 |
| 630, 631 | wireless communication channel | 90-92 |
| 701 | processor | 10-18, 20, 21, 23, 91-93 |
| 702 | applications processor | 91 |
| 703 | server | 82 |
| 801, 802 | object | 10-13, 18, 20, 21, 23 |
| 803 | motor | 14, 15 |
| 804, 805 | shaft | 14, 15 |
| 806, 807 | reflective object | 14-17 |
| 810, 811 | hand | 27-29, 32-34, 44 |
| 812 | bracelet | 32-34 |
| 813 | mirror | 35-39 |
| 814 | reflection | 37 |
| 815 | mounting bracket | 35, 36 |
| 816 | display screen | 35, 38-40, 83, 84, 86-88 |
| 817-819 | finger | 38, 39, 44, 45, 96-98 |
| 820 | projector | 40 |
| 821 | object | 41, 42, 49-51, 53 |
| 822 | cup | 43 |
| 823 | debugger | 47 |
| 824 | socket | 47 |
| 825, 826 | object | 83, 84 |
| 827-829 | folding mirror | 101, 104-106 |
| 830 | top cover | 87, 88 |
| 831 | bottom cover | 87, 88 |
| 832 | tv | 90 |
| 833 | mobile phone | 82, 90 |
| 834 | Bluetooth dongle | 90 |
| 835 | object location | 95 |
| 836 | curved display | 94, 95 |
| 837 | flexible display | 96-98 |
| 838 | retractable display | 100 |
| 839 | retractable display housing | 99, 100 |
| 840 | slot | 99, 100 |
| 841 | rotating stand | 82 |
| 842 | mirror display | 82 |
| 843 | person | 82 |
| 844 | avatar | 82 |
| 850, 851 | key | 105, 106 |
| 852, 856-861 | rods | 105, 106, 108 |
| 853 | springs | 105 |
| 854, 855 | block | 105, 106 |
| 901, 902 | GUI | 90 |
| 910-916, 916", 919, 919', 926, 926",929, 929', 930, 931, 936, 936", 939, 939', 940-942, 944, 945, 961-969 | hotspot location | 2-5, 10-13, 16-18, 20-23, 77, 78, 103 |
| 970, 971 | detection plane | 27, 33, 34, 40, 49-51, 101, 102, 104-108 |
| 972 | QR code | 30, 31 |
| 973 | display screen graphic | 31, 34, 37, 40 |
| 974 | field of view | 31, 32, 34 |
| 975 | headset | 30-32, 34 |
| 976 | semi-transparent display | 30 |
| 977 | camera | 30 |
| 978 | image processing unit | 30 |
| 979 | 2d scan information | 45 |
| 980, 981 | 3d scan information | 46, 48 |
| 982 | detection plane | 49-51 |
| 983 | 3d scan information | 43 |
| 985, 986 | object detection | 50, 51 |
| 987 | 3d model of scanned object | 72 |
| 989 | partial object circumference | 22 |
| 990 | detection image | 19, 22 |
| 991-995 | ring of six hotspot locations in a hyperboloid | 25 |

Numbered elements in the 1000's are stages in a process flow.

DETAILED DESCRIPTION

Throughout this description, the terms "source" and "emitter" are used to indicate the same light emitting elements, inter alia LEDs, VCSELs and lasers, and the terms "sensor" and "detector" are used to indicate the same light detecting elements, inter alia photo diodes.

Reference is made to FIG. 1, which is a simplified illustration of light being emitted from light sources along a solid line, and being reflected along dashed lines to light sensors, in accordance with an embodiment of the present invention. FIG. 1 shows a central beam 407, and reflection paths 408, 409 represented by the dashed lines to light sensors, in accordance with an embodiment of the present invention. All of the dashed lines in FIG. 1 represent paths of reflected light that are maximally detected as explained below. FIG. 1 shows how light is emitted in a collimated beam. Light that hits an object is reflected diffusely. Sensors detect maximum incoming light from reflections in two narrow corridors that extend from the sensor in two fixed directions, e.g., 30° for all emitter light beams on one side of the sensor and −30° for the remaining emitter light beams on the other side of the sensor.

The amount of light that travels from one source to one sensor depends on how centered the reflected object is on the source's beam, and how centered it is on the sensor's detection corridor. Such a source/sensor pair is referred to as a "hotspot". The location at which a reflective object generates the highest amount of light for a source/sensor pair is referred to as the "hotspot location" or the "target position" for that source/sensor pair. A proximity sensor according to the present invention measures the transmitted amount of light for each source/sensor pair, and each such measurement is referred to as a "hotspot signal value". The measurement normalizes all hotspot signal values to have the same range.

Since light that hits an object is reflected diffusely and reflections are maximally detected in two narrow corridors at opposite sides of the light beam, the present specification refers to a forward direction detection based on all of the narrow detection corridors in a first direction, and a backward direction detection based on all of the narrow detection corridors in the second direction. Stated differently, the forward direction includes all detections of source/sensor pairs in which the sensor of the pair has a higher location index than the source of the pair, and the backward direction includes all detections of source/sensor pairs in which the sensor of the pair has a lower location index than the source of the pair. The forward direction may be left or right, depending on device orientation. A hotspot where the sensor looks in the backward direction is referred to as a "backward hotspot", and vice versa for those looking forward.

Figure 2:
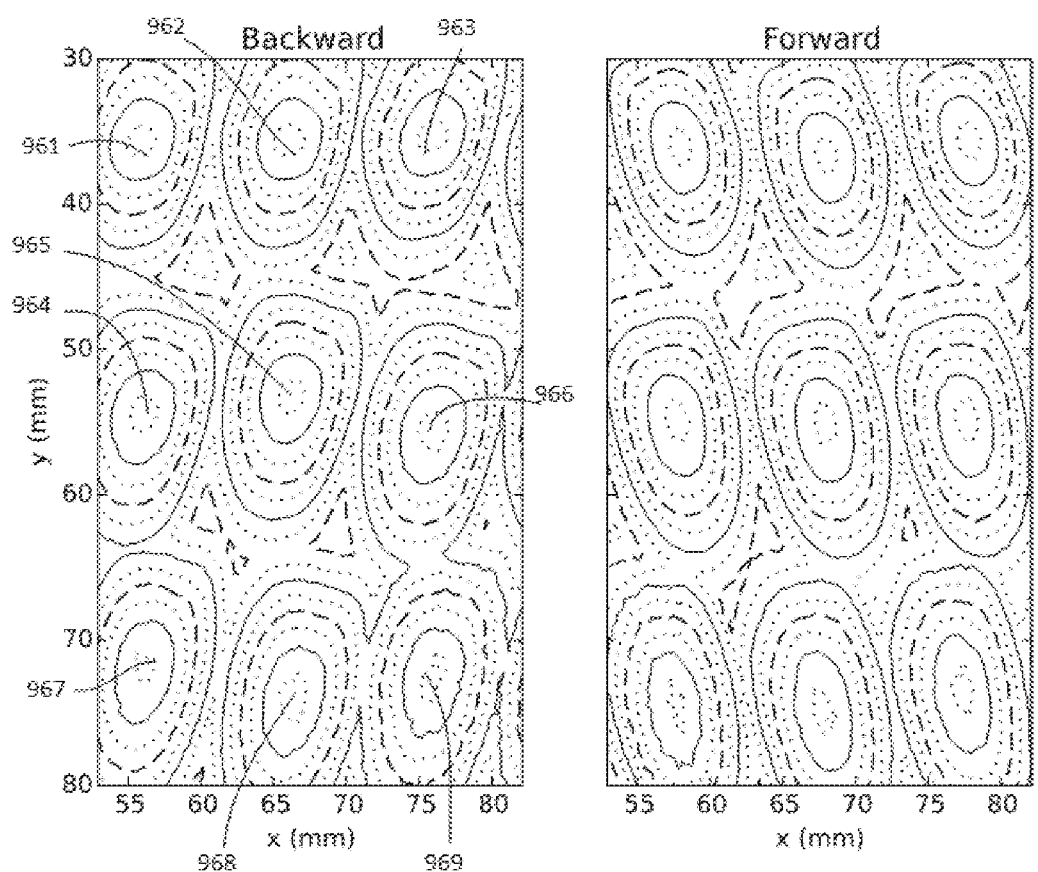
FIG. 2 is an illustration of backward and forward hotspot signal values, i.e., signal values for source/sensor pairs, in accordance with an embodiment of the present invention.

Reference is made to FIG. 2, which is an illustration of backward and forward hotspot signal values, i.e., signal values for source/sensor pairs, in accordance with an embodiment of the present invention. Hotspot signal values are sampled with an object placed at locations in a dense grid spanning all hotspot locations; i.e., all locations at which an object can be placed such that the source/sensor pairs will detect a reflection value. FIG. 2 shows the maximum of all hotspot signal values at object locations within a region that spans 3×3 hotspot locations, or target positions, separately for backward and forward hotspots. In FIGS. 2-5 hotspot locations are indicated as numbered elements 961-969 only in the illustrations of backward hotspot signal values. In FIGS. 2-5 the hotspot locations in the illustrations of forward hotspot signal values are not indicated as numbered elements in order to avoid cluttering the figures.

Figure 3:
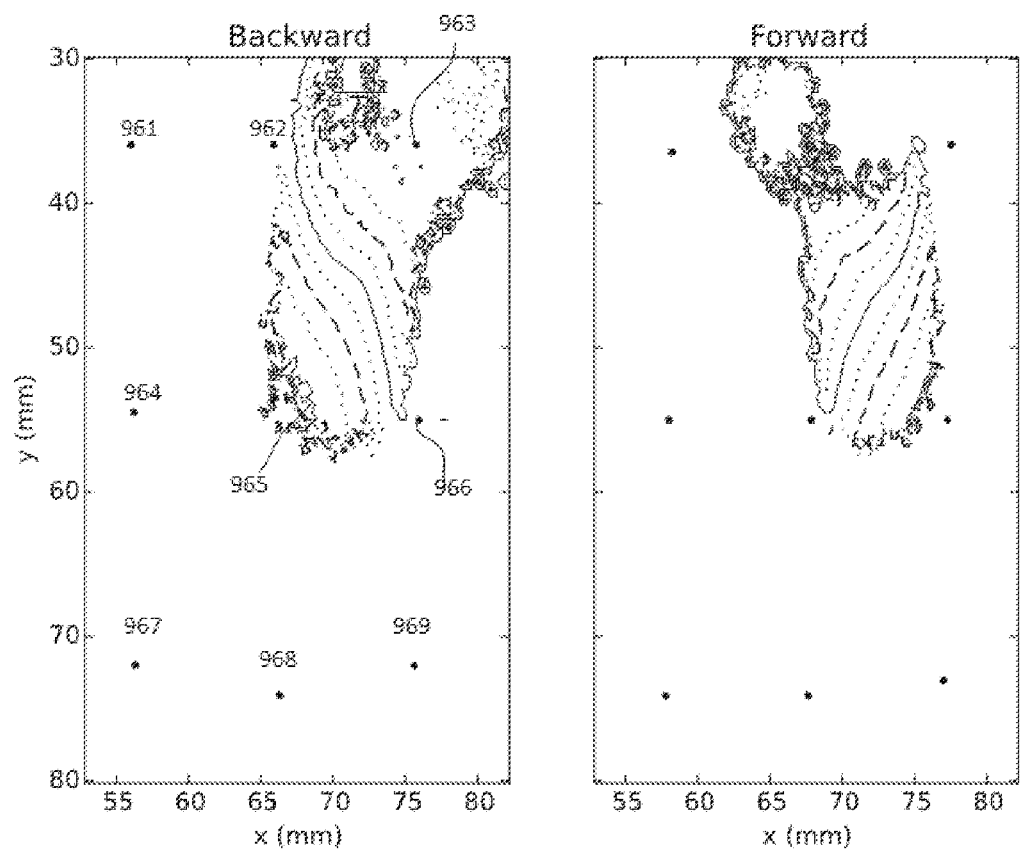
FIGS. 3-5 are illustrations showing a signal value relationship between neighboring hotspots within 3×3 grids of forward and backward hotspots, in accordance with an embodiment of the present invention
Figure 4:
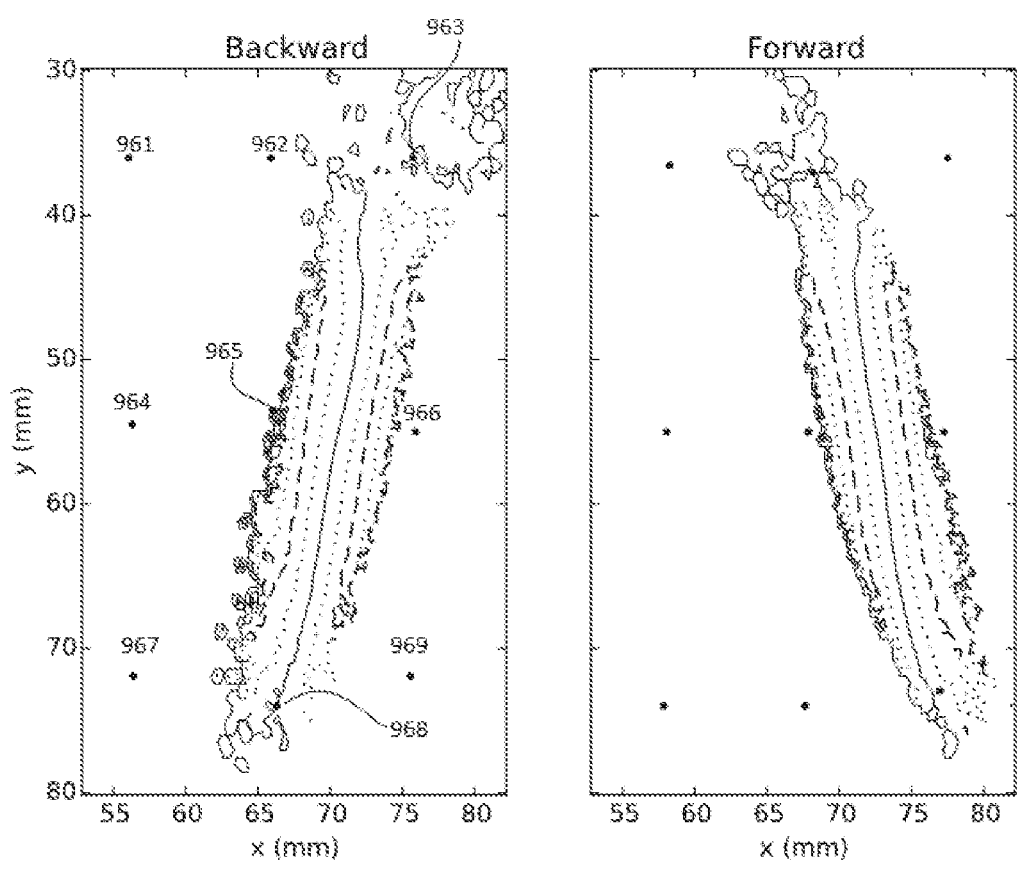
Figure 5:
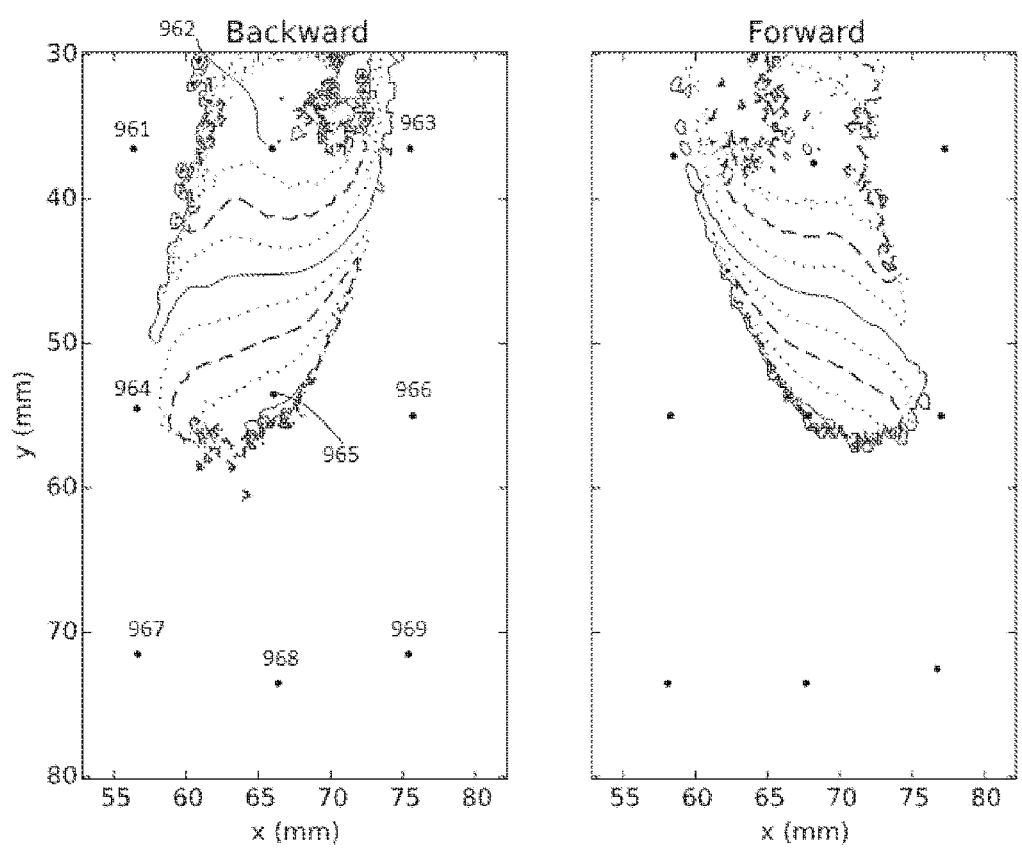

Reference is made to FIGS. 3-5, which are illustrations showing a signal value relationship between neighboring hotspots within 3×3 grids of forward and backward hotspots, in accordance with an embodiment of the present invention. FIGS. 3-5 show relationships between two adjacent hotspot signal values. Each curve follows a fixed relationship value, similar to a topological map. FIG. 3 shows the signal value relationship between top-middle and center hotspots. FIG. 4 shows the signal value relationship between right-middle and center hotspots. FIG. 5 shows the signal value relationship between top-right and center backward hotspots, and between top-middle and right-middle forward hotspots.

Figure 6:
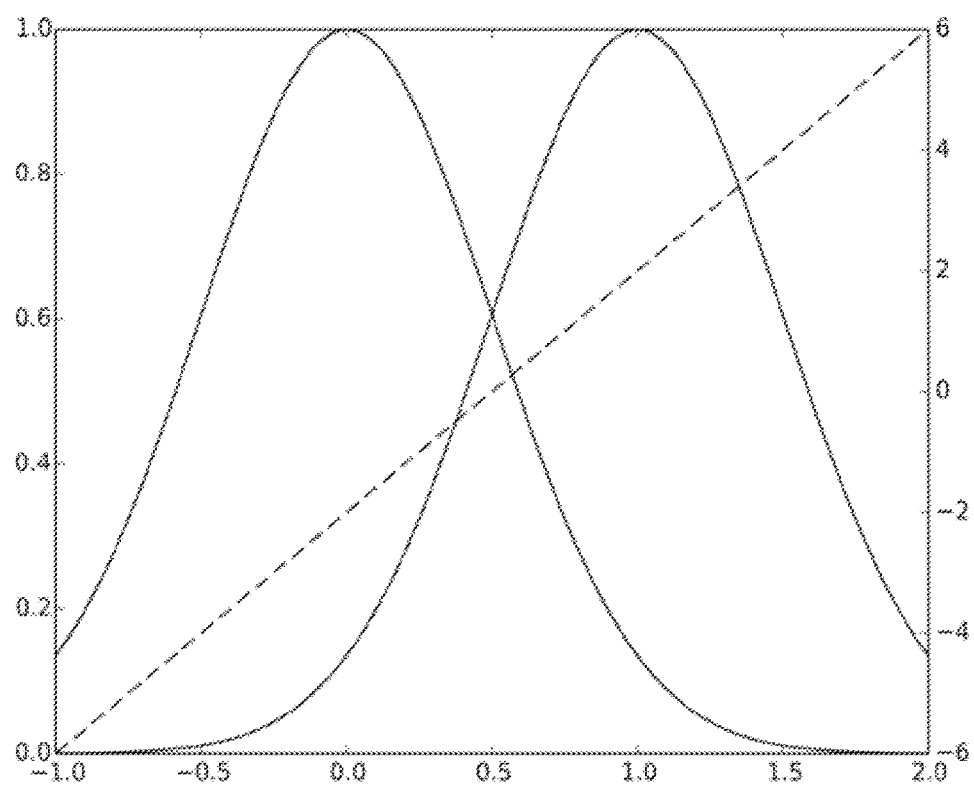
FIG. 6 is an illustration showing a relationship between two signal values v0 and v1 (solid lines) expressed as r=log(v1)−log(v0) (dashed line), in accordance with an embodiment of the present invention.

Reference is made to FIG. 6, which is an illustration showing a relationship between two signal values v0 and v1 (solid lines) expressed as r=log(v1)−log(v0) (dashed line), in accordance with an embodiment of the present invention. This relationship is drowned in noise when either of the signal values has a low signal-to-noise ratio (SNR).

The signal value relationship between two vertically adjacent hotspots corresponds to a curve in FIG. 3. If the signal values are assumed to be normally distributed with a certain standard deviation, then that assumption may be used to find an interpolated location between the hotspot locations according to FIG. 6, referred to as a "crossing". Similarly, vertically adjacent hotspots create a second crossing. The rationale is that the object location is somewhere between the two crossings. If the curves in FIG. 3 are all straight and parallel, this would be accurate. However, curvature causes inaccuracy.

In order to account for such curvature, the location between the crossings is found using the same method, but from the relationships of horizontally adjacent hotspots. The curves are now those in FIG. 4. Instead of interpolating all hotspots to calculate the object's location, a shortcut is used. The vertical crossings are thought of as virtual hotspots, and each virtual signal value is estimated based on the real hotspot signal values and their respective distance from the crossing. The virtual hotspots are interpolated to determine the object location directly.

In some embodiments of the invention, an object is moved throughout the detection area and signal values for all locations in the detection area are recorded and stored. In such cases, an object's current location is derived by matching the current source/sensor pair detection signal values with the stored recorded values and selecting the corresponding stored location in the detection area.

Figure 7:
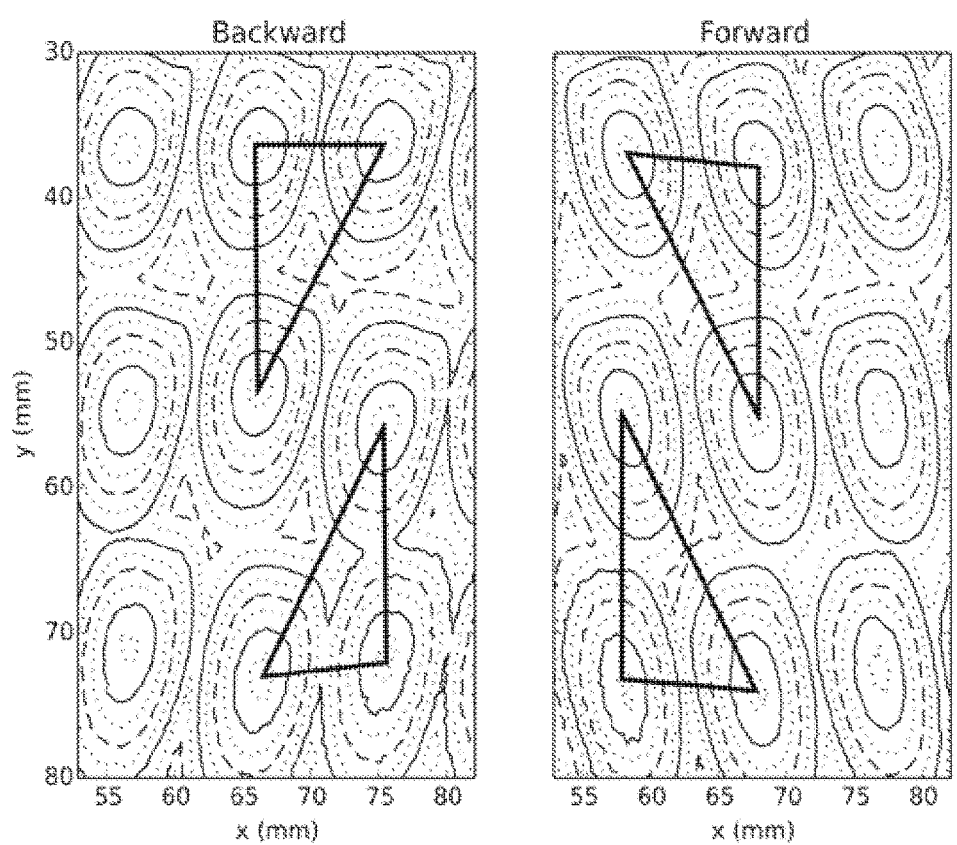
FIG. 7 is an illustration showing use of triangles to mark areas surrounding hotspots at which an object generates strong signal values, in accordance with an embodiment of the present invention.

Reference is made to FIG. 7, which is an illustration showing use of triangles to mark areas surrounding hotspots at which an object generates strong signal values, in accordance with an embodiment of the present invention. The mapping from two-dimensional signal relationships to three-dimensional location and reflectivity is similar in all triangles; especially so in triangles of the same orientation and in the same horizontal band, i.e., being the same distance from the proximity sensor. This means that the mapping needs to be learned and stored for only a few triangle groups. It may be observed in FIG. 2 that there are triangular areas spanned by three hotspots, in which those three hotspot signal values are all relatively high. Some of these are drawn in FIG. 7. This means that the three pairwise relationships between those signals will be above noise within the area. Out of those three relationships one is redundant, since it is derivable from the other two. Within such a triangle, two signal relationships map to a location within that triangle. It also maps to the reflectivity of the object relative to the observed hotspot signal values. These triangular areas cover the whole screen, so the location and reflectivity of an object is found by finding the triangle that is spanned by the hotspots with the highest signal values, and mapping the signal relationships to location and reflectivity.

The mapping transform takes the vertical (FIG. 3) and diagonal (FIG. 5) signal relationships as input. The input 2D space, from minimum to maximum observed in each dimension, is covered by a 9×9 grid of nodes. Each node contains a location expressed in a frame of reference spanned by the triangle's edges. The location may be slightly outside the triangle. The transform contains a compensation factor that, when multiplied with the highest signal value, gives the reflectivity of the object. The four nodes closest to the input are interpolated with bi-linear interpolation.

All hotspots that have a signal value above a certain threshold, and that are stronger than all its eight immediate neighbors, are evaluated for possible object detections. All six triangles that use the maximum hotspot are screened as possible contributors to the detection. Each triangle is given a weight that is calculated as the product of all its hotspot signal values. The highest three are kept, and their weights are reduced by that of the fourth highest. The kept triangles are evaluated, and their results are consolidated to a weighted average, using the weights used for screening.

Using a robot to place a stylus at known locations opposite a proximity sensor of the present invention and recording the resulting detection signals, enables quantifying the accuracy of the algorithm. The recorded sample signal values are sent as input to the algorithm in random order, and the calculated detection locations based on these inputs are compared to the actual sample locations.

Figure 8:
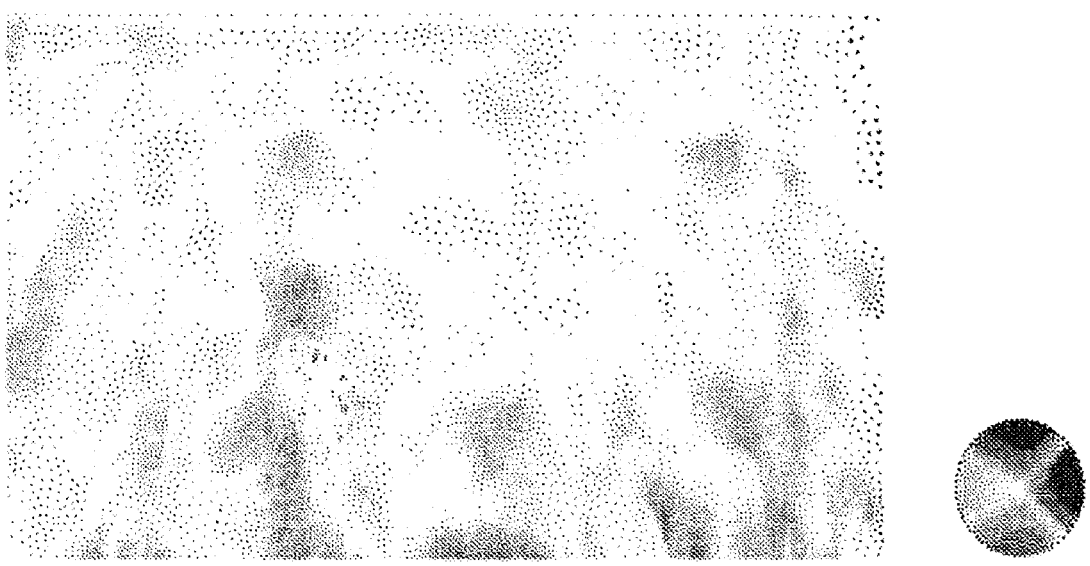
FIG. 8 is an illustration of detection errors across a 100×64 mm touch screen, in accordance with an embodiment of the present invention.

Reference is made to FIG. 8, which is an illustration of detection errors across a 100×64 mm touch screen, in accordance with an embodiment of the present invention. The 2D error vector is coded according to the legend at the right in FIG. 8. The legend circle radius is 5 mm. FIG. 8 shows how large, and in what direction, the error is for samples across the screen.

Figure 9:
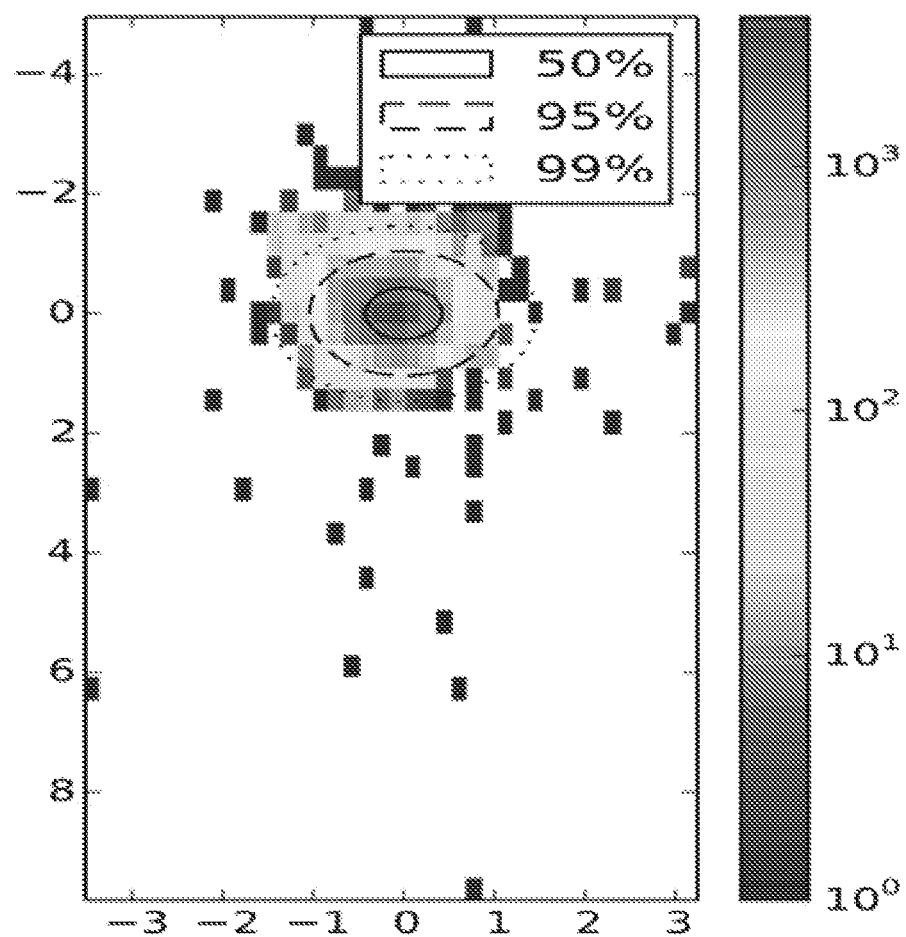
FIG. 9 is an illustration of a 2D histogram of sample error vectors, in accordance with an embodiment of the present invention.

Reference is made to FIG. 9, which is an illustration of a 2D histogram of sample error vectors, in accordance with an embodiment of the present invention. The units of the axes are mm. FIG. 9 shows the distribution of the errors. TABLE I below provides the quantified accuracy values.

TABLE 1

| Measurement | Value |
| --- | --- |
| Error distances 50:th percentile | 0.43 mm |
| Error distances 95:th percentile | 1.04 mm |
| Error distances 99:th percentile | 1.47 mm |
| True positives | 100.0% |
| False positives | 0.0% |

Reference is made to FIGS. 10-13, which are simplified illustrations of a proximity sensor, in accordance with an embodiment of the present invention. Proximity sensor 501 includes light sources 101-110 and light sensors 201-211, each light source being situated between two of the light sensors. Proximity sensor 501 also includes a plurality of lenses, such as lenses 301-304, each lens being positioned in relation to two respective neighboring ones of the light sensors such that light entering that lens is maximally detected at a first of the two light sensors when the light enters that lens at an acute angle of incidence θ1, and light entering that lens is maximally detected at the other of the two light sensors when the light enters that lens at an obtuse angle of incidence θ2. The lens is positioned in relation to the light source situated between these two light sensors such that the light from the light source is collimated as it exits proximity sensor 501. This arrangement provides the two narrow corridors that extend from each sensor in two fixed directions away from opposite sides of the projected light beams as discussed hereinabove with respect to FIG. 1.

Figure 10:
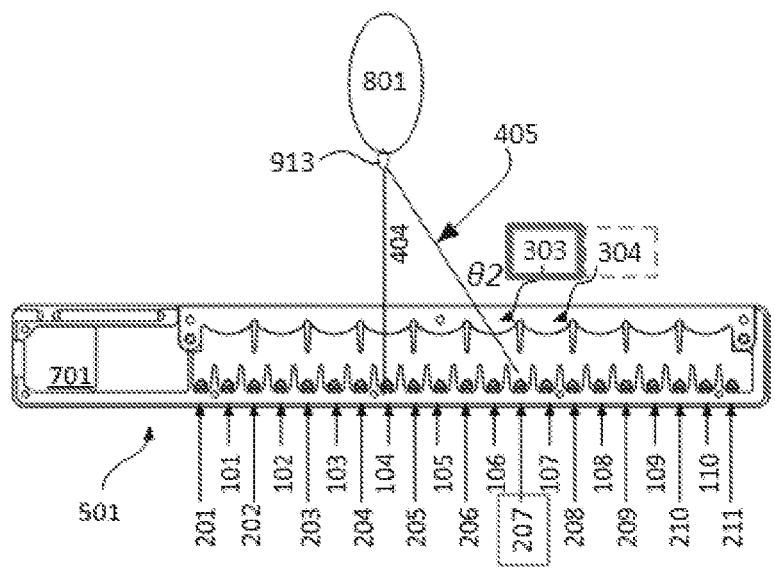
FIGS. 10-13 are simplified illustrations of a proximity sensor, in accordance with an embodiment of the present invention.
Figure 11:
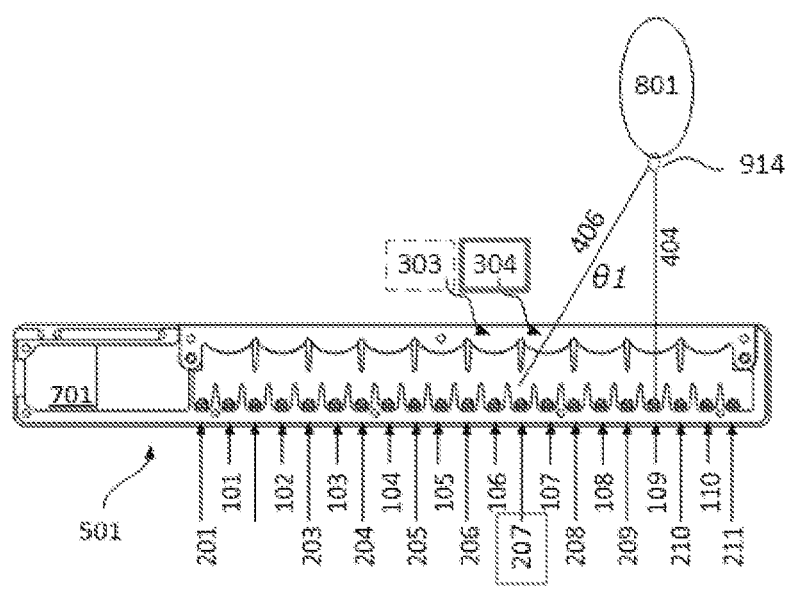

FIG. 10 shows a forward reflection path of maximum detection for hotspot 913 generated by source/sensor pair 104/207, whereby light from source 104 reflected off object 801 is maximally detected by sensor 207, and FIG. 11 shows a backward reflection path of maximum detection for hotspot 914 generated by source/sensor pair 109/207, whereby light from source 109 reflected off object 801 is maximally detected by sensor 207. FIGS. 10 and 11 show how sensor 207 is situated with respect to neighboring lenses 303 and 304 such that sensor 207 receives maximum forward reflection values via lens 303, and maximum backward reflection values via lens 304.

Figure 12:
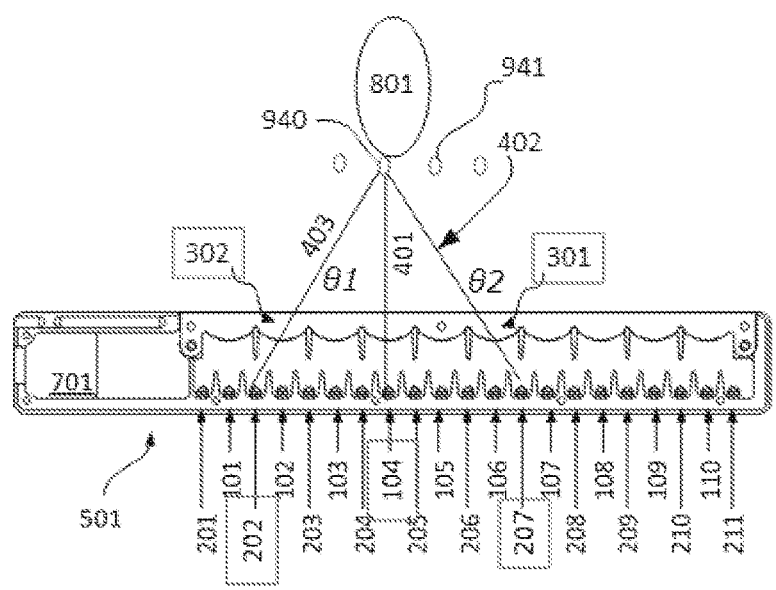
Figure 13:
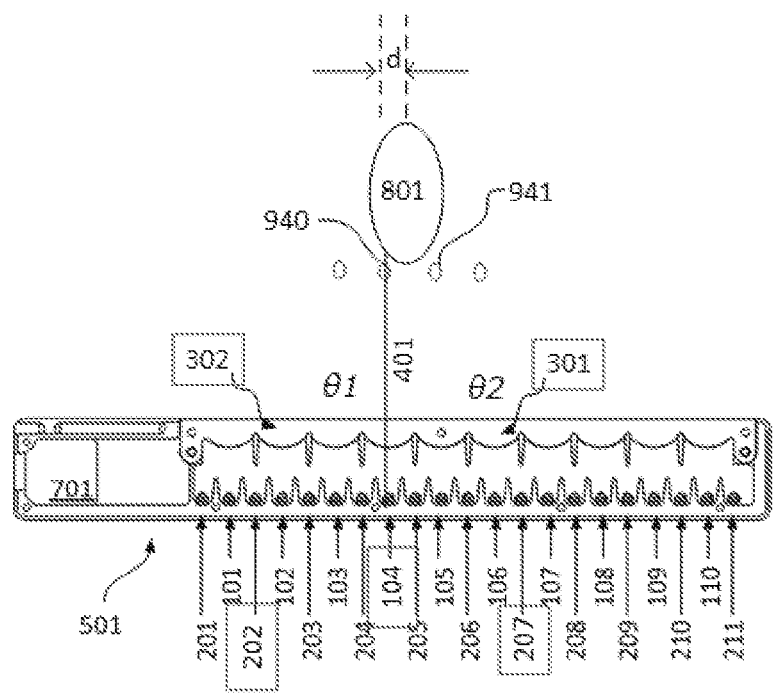

As explained above with respect to FIG. 1, the intersections outside proximity sensor 501 between the projected light beams and the corridors of maximum detection provide a map of hotspots. Four hotspots are illustrated in FIGS. 12 and 13, two of which are numbed 940 and 941. An object 801 is shown nearest hotspot 940 in FIG. 12. Thus, the maximum detection of object 801 is generated by source/sensor pairs 104/202 and 104/207. Source/sensor pair 104/202 provides backward detection, and source/sensor pair 104/207 provides forward detection, as discussed above. Additional detections are generated by other source/sensor pairs, e.g., forward detection source/sensor pair 104/208, because light beams from source 104 are scattered, and a portion thereof arrives at sensor 208, but the amount of light detected at sensor 208 is significantly less than that generated by source/sensor pair 104/207, because the scattered light arriving at sensor 208 does not travel on the corridor of maximum detection.

FIG. 13 shows proximity sensor 501 of FIG. 12, but object 801 is moved a distance d to the right. In this case similar detection signals are generated by forward source/sensor pairs 104/207 and 105/208. Each of these detections will be less than the detection generated by source/sensor pair 104/207 in FIG. 12 and greater than the detection generated by source/sensor pair 105/208 in FIG. 12, as explained above with reference to FIGS. 3-7. The location of object 801 between hotspots 940 and 941 is calculated by interpolating the amounts of light detected by source/sensor pairs 104/207 and 105/208. As discussed above with reference to FIG. 7, a location of object 801 is calculated by performing at least two interpolations between amounts of light detected by source/sensor pairs that correspond to three neighboring hotspots, the neighboring hotspots being the vertices of a triangle in the detection space.

In order to determine how to interpolate the detected amounts of light, detection sensitivities are calculated in the vicinities of the hotspots using a calibration tool that places a calibrating object having known reflective properties at known locations in the detection zone outside and adjacent to proximity sensor 501. At each known location, a plurality of source/sensor pairs is synchronously activated and amounts of light detected by neighboring activated sensors are measured. Repetitive patterns in relative amounts of light detected by the neighboring activated sensors as the object moves among the known location are identified. These patterns are used to formulate detection sensitivities of proximity sensor 501 in the vicinities of the hotspots which are used to determine how to interpolate the amounts of light detected in order to calculate the location of a proximal object.

Figure 14:
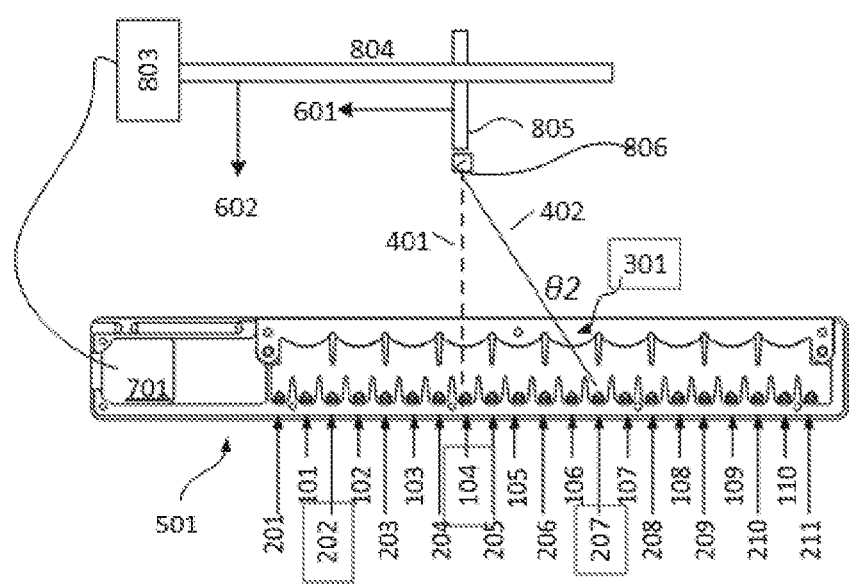
FIGS. 14 and 15 are simplified illustrations of calibration tools for the proximity sensor of FIGS. 10-13, in accordance with an embodiment of the present invention.
Figure 15:
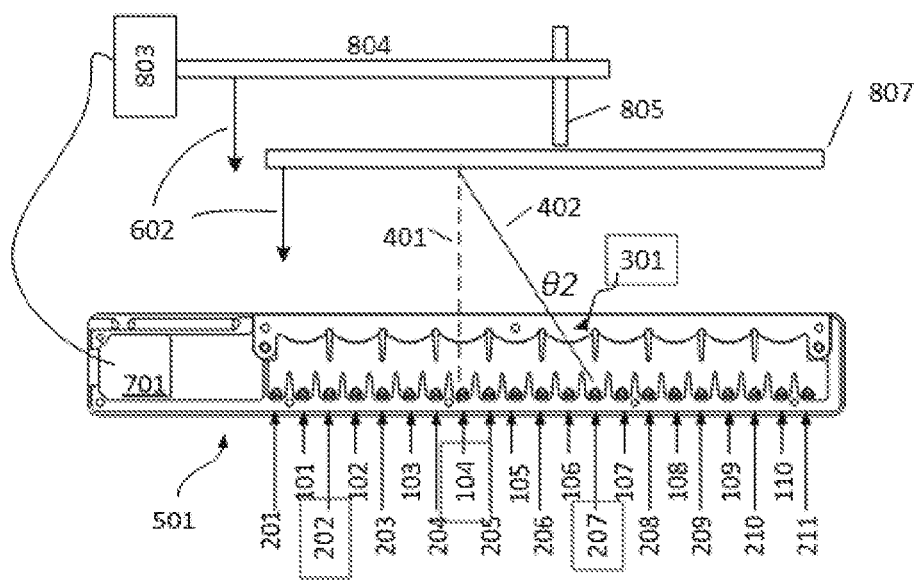

Reference is made to FIGS. 14 and 15, which are simplified illustrations of calibration tools for the proximity sensor of FIGS. 10-13, in accordance with an embodiment of the present invention. FIG. 14 shows a first calibration tool that includes motor 803, and shafts 804 and 805 that move reflective calibration object 806 horizontally and vertically in relation to proximity sensor bar 501, as indicated by arrows 601 and 602. At each location at which object 806 is placed, a plurality of source/sensor pairs that correspond to hotspots in the vicinity of that location are activated and the amounts of light detected are used to determine the sensitivity in the vicinity of those hotspots. Multiple such source/sensor pairs that share a common light source are activated simultaneously.

In some embodiments, a calibration tool, either that illustrated in FIG. 14 or that illustrated in FIG. 15, is used on a representative sample of proximity sensor 501 units, and the interpolation methods derived therefrom are applied to other similar units. In other embodiments each proximity sensor 501 is individually calibrated, in order to provide interpolations tailored to that specific proximity sensor.

FIG. 15 shows a second calibration tool that differs from that of FIG. 14 in the size and shape of the reflective calibration object. In FIG. 14 calibration object 806 is modeled as a finger or stylus typically used with proximity sensor bar 501, whereas in FIG. 15 calibration object 807 is a rod that spans the length of proximity sensor bar 501. The rod is covered in a material having reflective properties similar to those of skin or of a stylus typically used with proximity sensor bar 501. In the calibration tool of FIG. 15, shaft 805 remains at a fixed location on shaft 804, such that object 807 only moves toward and away from proximity sensor bar 501, as indicated by arrows 602. In this case, at each location of object 807 the light sources are activated one after the other and, during each light source activation, any of the light sensors 201-211 that may reasonably be expected to detect a significant reflection therefrom are activated. In some embodiments, all of the light sensors 201-211 are simultaneously activated with each light source activation.

In addition to determining interpolation methods, the calibration tools are used to map the locations of the hotspots that correspond to the source/sensor pairs. Often the locations of the hotspots are shifted from their expected locations due to mechanical issues such as imprecise placement or alignment of a light source or light detector within proximity sensor 501. When used to this end, each proximity sensor unit needs to be calibrated and the calibration tool of FIG. 15 is more efficient than that of FIG. 14.

Figure 16:
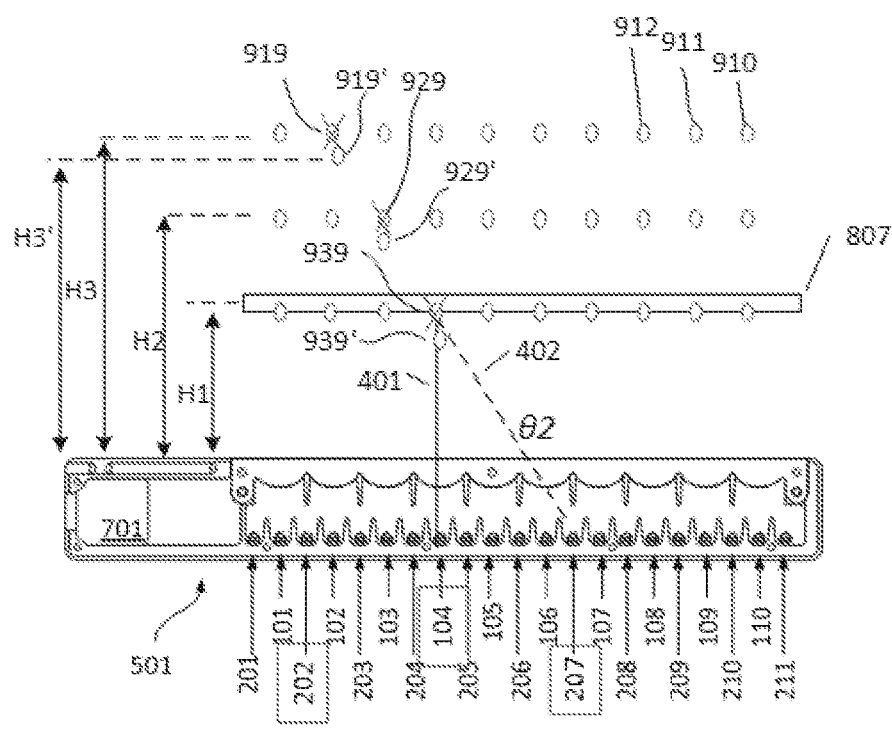
FIGS. 16 and 17 are simplified illustrations showing that the calibration tool of FIG. 15 identifies how the emitters and detectors of the proximity sensor have been mounted therein, in accordance with an embodiment of the present invention.
Figure 17:
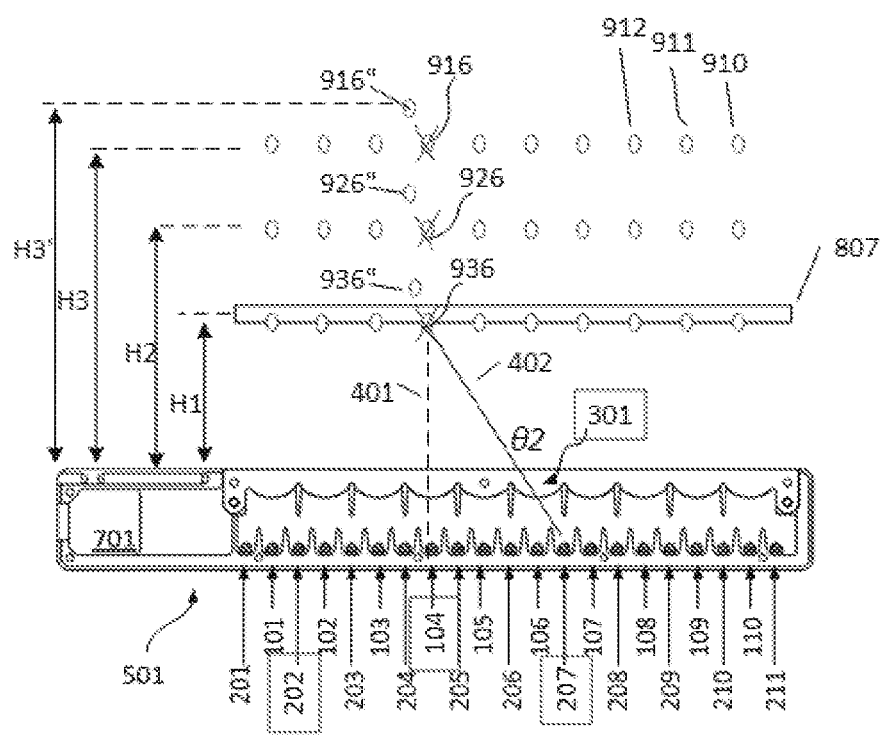

Reference is made to FIGS. 16 and 17, which are simplified illustrations showing that the calibration tool of FIG. 15 identifies how the emitters and detectors of the proximity sensor have been mounted therein, in accordance with an embodiment of the present invention. FIGS. 16 and 17 show how imprecise placement of a light sensor (FIG. 16) or a light source (FIG. 17) is identified by the calibration tool of FIG. 15. FIG. 16 shows three rows of hotspots including hotspots 910-912, 919, 929, and 939. These are expected hotspot locations, i.e., proximity sensor 501 is designed to provide maximum detections of reflected light for respective activated source/sensor pairs when an object is placed at these locations. This is verified as calibration rod 807 moves closer to proximity sensor 501. Each row of hotspots is situated at a fixed distance from proximity sensor 501. Three distances are shown: H1, H2 and H3.

FIG. 16 shows how, when light sensor 207 is placed slightly to the left of its correct position within proximity sensor 501, maximum detection measured at this light sensor corresponds to hotspot locations 919', 929' and 939'. Calibration rod 807 enters these positions at different distances than those expected. FIG. 16 shows how calibration rod 807 arrives at hotspot location 919' when it is a distance H3' from proximity sensor 501. By analyzing a series of local maximum detections that share a common light sensor and occur at different distances than those expected, the calibration system detects the offset of a light sensor from its expected position. In some embodiments processor 701 controls, or receives input from, motor 803 and processor 701 updates its map of hotspots according to the actual local maximum detections.

FIG. 17 shows how, when light source 104 is placed slightly to the left of its correct position within proximity sensor 501, maximum detection measured for source/sensor pairs that include light source 104 are shifted from expected hotspot locations 916, 926 and 936, to positions 916', 926' and 936'. FIG. 17 shows how calibration rod 807 arrives at hotspot position 916' when it is a distance H3' from proximity sensor 501. By analyzing a series of local maximum detections that share a common light source and occur at different distances than those expected, the calibration system detects the offset of the light source from its expected position.

Figure 18:
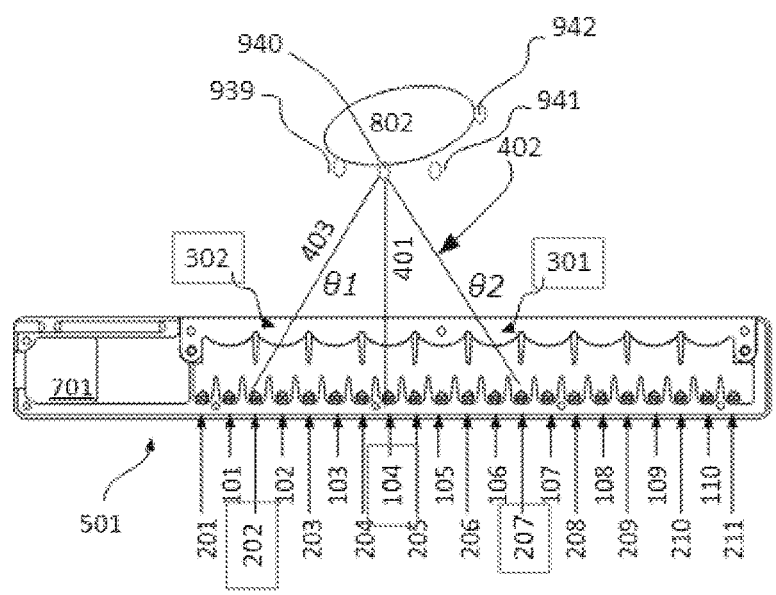
FIG. 18 is a simplified illustration showing a proximity sensor detecting a proximal object, in accordance with an embodiment of the present invention.

A proximity sensor according to the present invention is used to estimate a partial circumference of a proximal object. Reference is made to FIG. 18, which is a simplified illustration showing a proximity sensor detecting a proximal object, in accordance with an embodiment of the present invention. FIG. 18 shows proximity sensor 501 and proximal object 802. Four hotspot locations 939-942 along the edge of object 802 facing the proximity sensor are shown. The reflection values associated with these hotspot locations are used to estimate the contour of this edge.

As described above, each hotspot location is associated with one forward source/sensor pair and one backward source/sensor pair. In FIG. 18, hotspot location 940 is associated with source/sensor pairs 104/202 and 104/207.

The reflection values are used to generate a two-dimensional pixel image of reflection values indicating where reflective surfaces are positioned. For example, when all hotspot locations for all source/sensor pairs in proximity sensor 501 are assigned their respective, normalized reflection values, the result is a two-dimensional image. The reflection values in different embodiments are normalized within a range determined by the number of bits provided for each pixel in the two-dimensional image, e.g., 0-255 for 8-bit pixel values, and 0-1023 for 10-bit pixel values.

Figure 19:
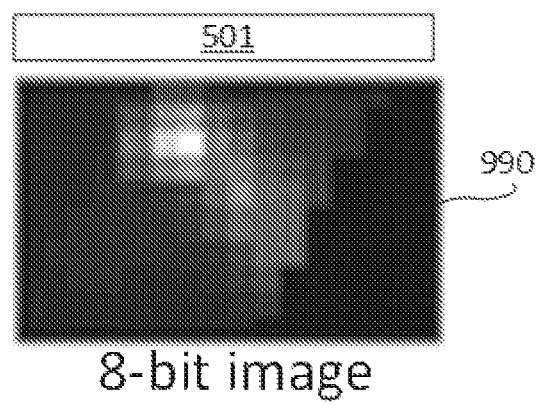
FIG. 19 is a simplified illustration of a two-dimensional image of detection values, in accordance with an embodiment of the present invention.

Reference is made to FIG. 19, which is a simplified illustration of a two-dimensional image of detection values, in accordance with an embodiment of the present invention. FIG. 19 shows proximity sensor 501 whose detection plane is directed downward and the resulting two-dimensional image 990 of reflection values generated by an object situated within that detection plane. The pixel values in image 990 are 8-bit values.

Because both forward and backward source/sensor pairs correspond to each hotspot location, the reflection value for that location in the two-dimensional image can be derived in different ways. Namely, the forward-direction source/sensor pair can be used, or the backward-direction source/sensor pair can be used. In some embodiments, the average of these two values is used, and in other embodiments the maximum of these two values is used, such that some pixels derive their values from forward-direction source/sensor pairs, and other pixels derive their values from backward-direction source/sensor pairs.

Figure 20:
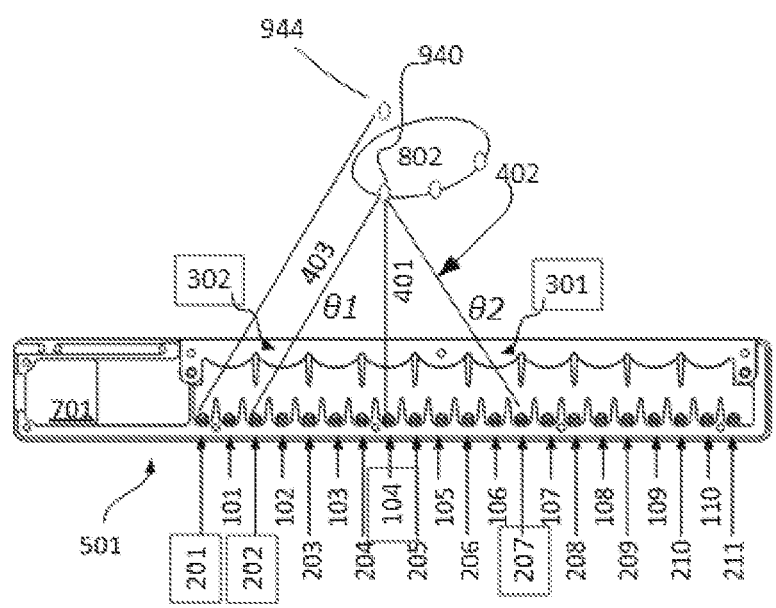
FIGS. 20 and 21 are simplified illustrations showing a detected reflection value for an emitter-receiver pair that is not associated with that pair's hotspot location, in accordance with an embodiment of the present invention.
Figure 21:
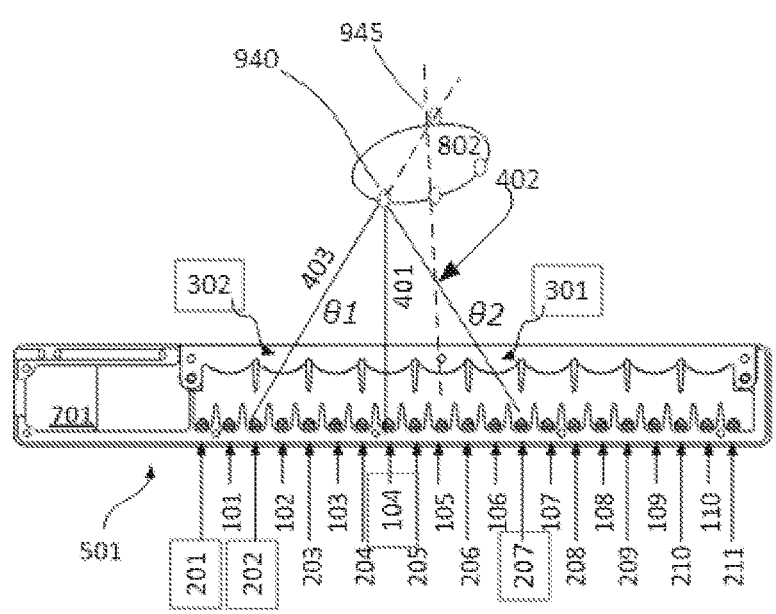

Certain reflection values for source/sensor pairs are not caused by a reflective object at the corresponding hotspot, but rather by stray reflections at entirely different locations. FIGS. 20 and 21 show how these cases are identified. Once identified, the corresponding pixel values in the two-dimensional image are reset to zero.

Reference is made to FIGS. 20 and 21, which are simplified illustrations showing a detected reflection value for an emitter-receiver pair that is not associated with that pair's hotspot location, in accordance with an embodiment of the present invention. FIG. 20 shows hotspot locations 940 and 944 aligned along a common emitter beam path 401. Hotspot location 940 corresponds to source/sensor pairs 104/202 and 104/207, and hotspot location 944 corresponds to source/sensor pairs 104/201 and 104/208. It is clear from FIG. 20 that any light from emitter 104 is blocked by object 802 well before it arrives at hotspot location 944, and therefore any light detected at sensors 201 and 208 during activation of source 104 is not generated by a reflective object at hotspot location 944, but is rather stray reflections off the object at other locations. Therefore, the reflection value appropriate for hotspot location 944 is zero.

This state is determined by the fact that source/sensor pair 104/202 has a significant detected reflection value, indicating that a reflective object is at corresponding location 940, and therefore, light beam 401 does not arrive at location 944. Moreover, because the lenses and the sensors are configured such that the maximum detection arrives at the sensor when it is reflected at angle θ1 it is clear that the source/sensor pair detecting the maximum reflection from among all source/sensor pairs that share a common source is the pair detecting reflections from an object at, or near, the corresponding hotspot location. Indeed, in the example shown in FIG. 20 the detection value for source/sensor pair 104/202 is much greater than the detection value for source/sensor pair 104/201. For the same reason, the detection value for source/sensor pair 104/207 is much greater than the detection value for source/sensor pair 104/208. A similar situation is illustrated in FIG. 21, except that in this case the two hotspot locations are situated along a common detection path.

FIG. 21 shows hotspot locations 940 and 945 aligned along a common maximum detected reflection path 403. Hotspot location 940 corresponds to source/sensor pair 104/202, and hotspot location 945 corresponds to source/sensor pair 105/202. It is clear from FIG. 21 that light from only one location can be reflected along path 403 onto receiver 202. And because the detected reflection value for source/sensor pair 104/202 is greater than the detection value for source/sensor pair 105/202, it is safe to assume that the reflecting object is at, or near, hotspot location 940, and the detection value for source/sensor pair 105/202 is not caused by a reflective object at hotspot location 945. Therefore, the reflection value appropriate for hotspot location 945 is zero.

In general, an emitted light path LP, such as path 401 in FIG. 17, has a plurality of hotspot locations thereon, denoted $P_1, P_2, \ldots, P_N$, at different distances from proximity sensor 501, such as hotspot locations 916, 926 and 936, in FIG. 17. When an object is located at one of these locations, denoted P, other hotspot locations $P_{i+j}$ and $P_{i-k}$ also have corresponding detection values. In such cases, the hotspot location $P_{max}$ for which a maximum detection value is detected from among hotspot locations along LP, is considered to correspond to the object, and all detection values for hotpot locations further from proximity sensor 501 are reset to zero. Detection values for hotpot locations between $P_{max}$ and proximity sensor 501 are retained. Often, two hotspot locations $P_{max}$ and $P_{max+1}$ are used to calculate the location of the object, as explained hereinabove, and in such cases $P_{max+1}$ is not reset to zero.

Similarly, a reflected light path RP, such as path 402 in FIG. 16, has a plurality of hotspot locations thereon, denoted $P_1, P_2, \ldots, P_N$, at different distances from the proximity sensor 501, such as hotspot locations 919, 929 and 939, in FIG. 16. When an object is located at one of these locations, denoted P, other hotspot locations $P_{i+j}$ and $P_{i-k}$ also have corresponding detection values. In such cases, the hotspot location $P_{max}$ for which a maximum detection value is detected from among hotspot locations along RP, is considered to correspond to the object, and all detection values for hotpot locations further from proximity sensor 501 are reset to zero. Detection values for hotpot locations between $P_{max}$ and proximity sensor 501 are retained. Often, two hotspot location $P_{max}$ and $P_{max+1}$ are used to calculate the location of the object, as explained hereinabove, and in such cases $P_{max+1}$ is not reset to zero.

Figure 22:
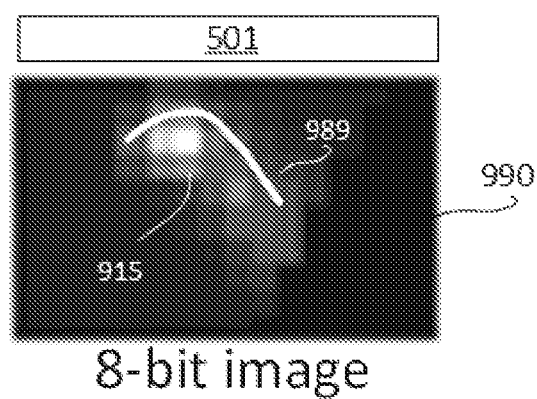
FIG. 22 is a simplified illustration of a detected partial circumference of an object in a two-dimensional image of detection values, in accordance with an embodiment of the present invention.

In this manner, the two-dimensional pixel image is refined and begins to represent the contour of the object facing the sensor. Reference is made to FIG. 22, which is a simplified illustration of a detected partial circumference of an object in a two-dimensional image of detection values, in accordance with an embodiment of the present invention. FIG. 22 shows the detected partial circumference 989 in the detection image 990 of FIG. 19 and an example pixel 915 having a non-zero detection value, but whose appropriate reflection value is zero, as explained hereinabove.

The next step is to filter the pixels in this image to obtain sub-pixel precision for the location of the object's contour between hotspot locations. After calculating sub-pixel values, various edge detection filters are applied to the two-dimensional pixel image to identify the edges of the object facing the sensor and discard stray reflections. Known edge detection filters include Sobel, Canny, Prewitt, Laplace, gradient. This edge information is used to determine a length of this portion of the object, i.e., a partial circumference of the object, and its location.

The length of the detected portion of the object is calculated using different methods, in accordance with different embodiments of the invention. Some embodiments determine the number of pixels, or sub-pixels, along the detected portion of the object. Other embodiments calculate the sum of the distances between each pair of neighboring pixels, or sub-pixels, along the detected portion of the object. Still other embodiments determine an equation for a curve that passes through each of the pixels, or sub-pixels, along the detected portion of the object, and calculates the length of the partial circumference of the object according to this equation.

In some embodiments, an estimate of the partial circumference is calculated based on three points: the point on the object for which there is a maximum detection value and the two outermost points along the partial circumference.

Figure 23:
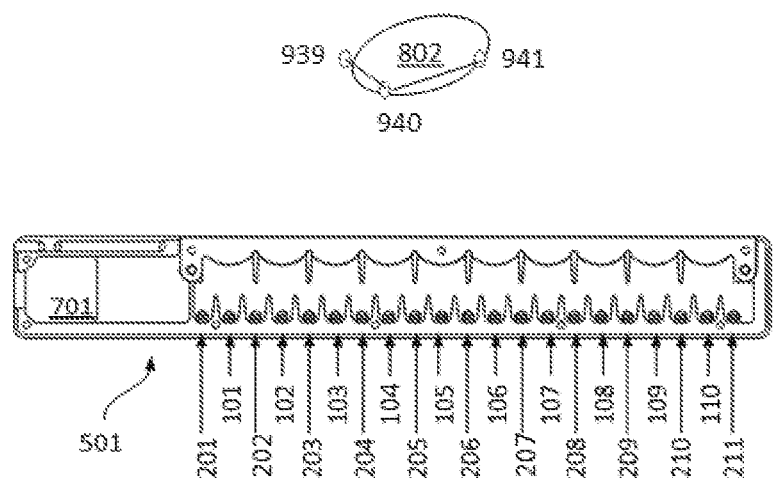
FIG. 23 is a simplified illustration of a method of estimating a partial circumference of an object, in accordance with an embodiment of the present invention.

Reference is made to FIG. 23, which is a simplified illustration of a method of estimating a partial circumference of an object, in accordance with an embodiment of the present invention. FIG. 23 shows point 940 for which there is a maximum detection value and two outermost points 939 and 941 along the partial circumference of object 802. An estimate of the partial circumference is the sum of the distances from point 939 to point 940 and from point 941 to point 940. In order to further refine this calculation the system calculates the sub-pixel coordinates of these three positions using the immediate neighbors of the respective hotspot locations 939-941, but does not calculate sub-pixel locations for any other pixels in the two-dimensional pixel image. Point 940, or a respective sub-pixel location, for which there is a maximum detection value is used as the object's coordinates.

In other embodiments of the invention, the shape of the proximity sensor is not a straight line, but circular, or wave-shaped to provide a 3D detection volume, instead of a 2D detection plane. In such alternative embodiments, the emitters and receivers are still alternated as they are in proximity sensor 501, and each emitter is paired with each of the receivers as a source/sensor pair having a corresponding hotspot within a 3D volume above the proximity sensor.

Figure 24:
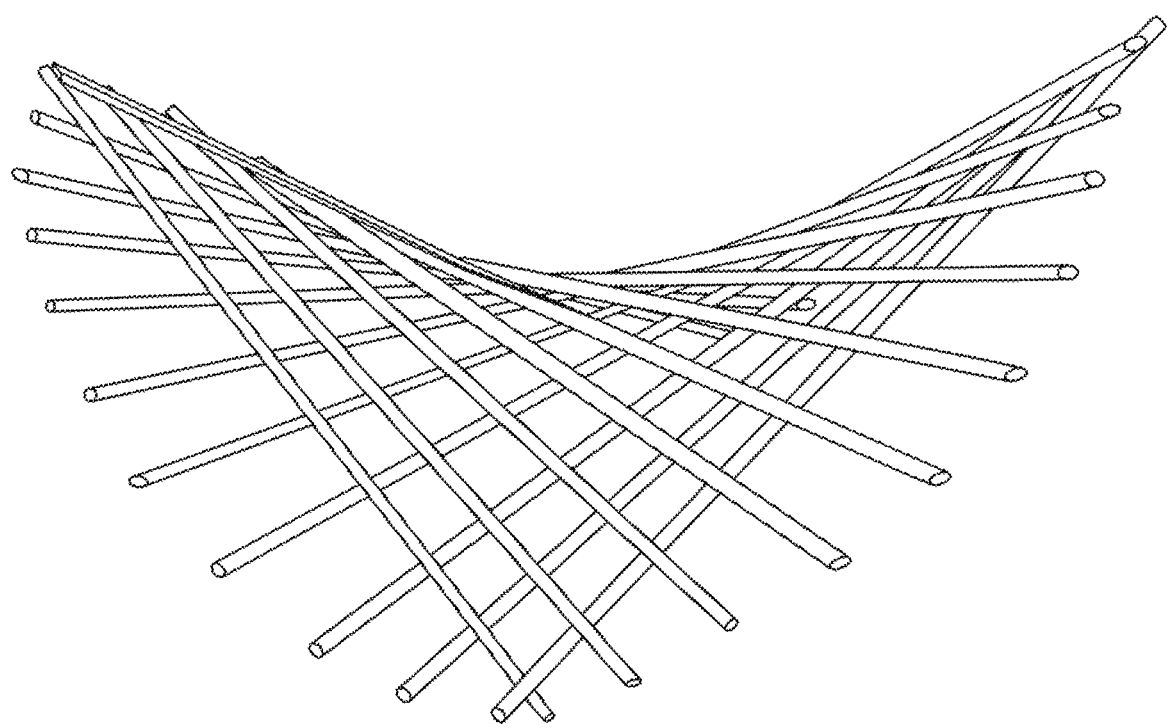
FIG. 24 is an illustration of a saddle roof or hyperbolic paraboloid corresponding to the emitter light paths and reflected light paths of a 3D proximity sensor, in accordance with an embodiment of the present invention.

Reference is made to FIG. 24, which is an illustration of a saddle roof or hyperbolic paraboloid corresponding to the emitter light paths and reflected light paths of a 3D proximity sensor, in accordance with an embodiment of the present invention.

Figure 25:
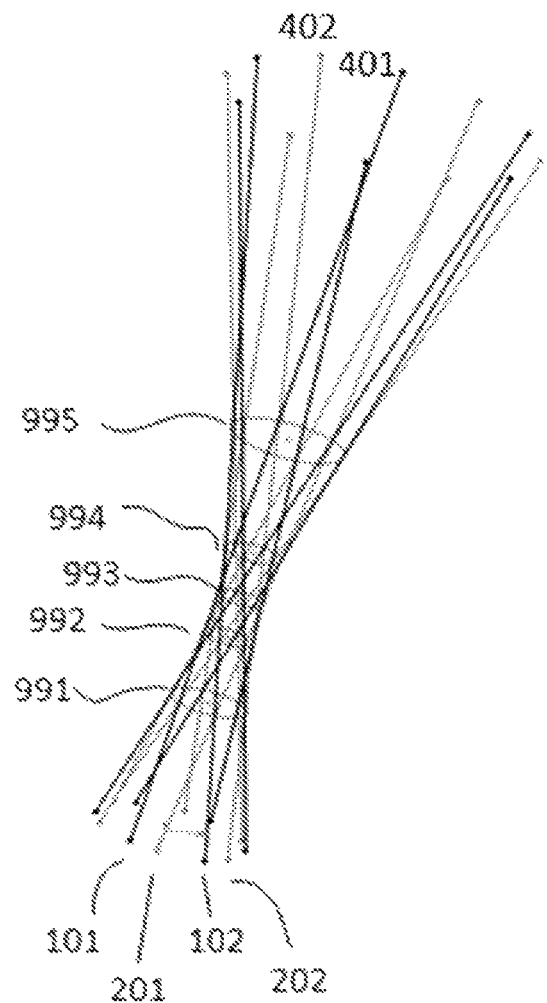
FIG. 25 is a simplified illustration of a circular arrangement of six emitters and six receivers arranged alternatingly along a circular base that provide 30 hotpot locations along a 3D hyperboloid, in accordance with an embodiment of the present invention.

Reference is made to FIG. 25, which a simplified illustration of a circular arrangement of six emitters and six receivers arranged alternatingly along a circular base that provides 30 hotpot locations along a 3D hyperboloid, in accordance with an embodiment of the present invention. FIG. 25 shows emitters 101 and 102, and receivers 201 and 202, which, together with the remaining emitters and receivers, provide 30 hotpot locations along a 3D hyperboloid, in accordance with an embodiment of the present invention. FIG. 25 shows five rings, 991-995, of hotspot locations along the height of the hyperboloid.

Figure 26:
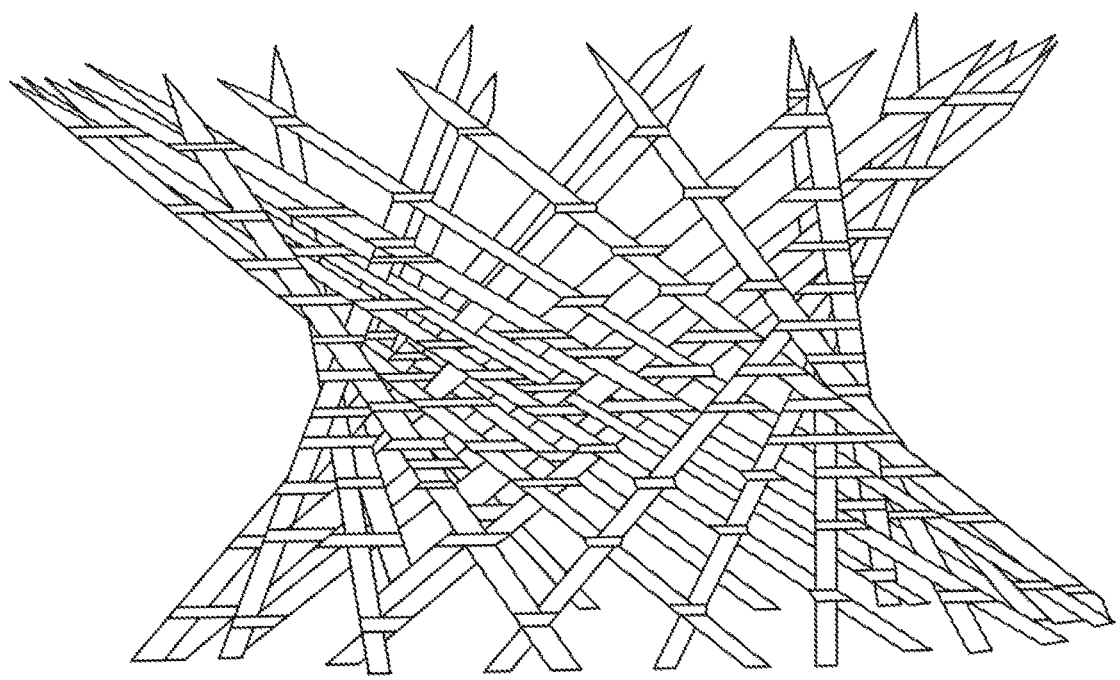
FIG. 26 is a simplified illustration of a grid representing emitted and reflected light beams from a circular arrangement of 16 emitters and 16 receivers arranged alternatingly along the circle, which provide 176 hotpot locations along a 3D hyperboloid, in accordance with an embodiment of the present invention.

Reference is made to FIG. 26, which is a simplified illustration of a grid representing emitted and reflected light beams from a circular arrangement of 16 emitters and 16 receivers arranged alternatingly along a circular base, which provides 176 hotpot locations along a 3D hyperboloid, in accordance with an embodiment of the present invention. Alternative configurations include 4 emitters and 4 receivers for a stripped down hyperboloid, 3 emitters and 3 receivers for a regular octahedron and 2 emitters and 2 receivers for a regular tetrahedron. These 3D proximity sensors are used inter alia for detecting in-air hand wave gestures as the hand performing such a gesture passes through the hyperboloid.

Proximity sensors according to the present invention have numerous applications for touch screens, control panels and new user interface surfaces. The proximity sensor can be mounted, e.g., on a wall, on a window, or placed on a notebook, and it will provide touch and gesture detection upon that item. These detected gestures are then used as input to electronic systems. For example, a gesture along a wall is used to dim the lighting in the room by mounting the sensor along an edge of the wall and communicating the detected gestures to the lighting system. Significantly, the proximity sensor is only mounted along one edge of the detection area, reducing component cost and providing more flexibility for industrial design of touch screens and touch sensitive control panels.

Figure 27:
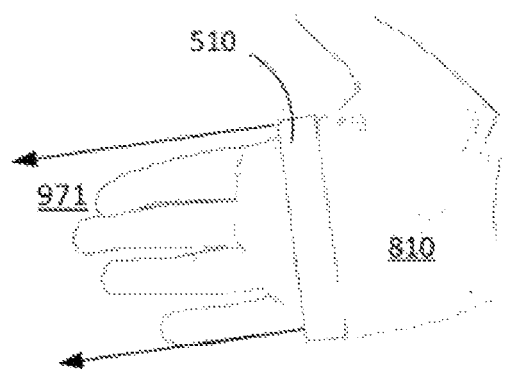
FIGS. 27-29 are simplified illustrations of a first input accessory for virtual reality systems, in accordance with an embodiment of the present invention.
Figure 28:
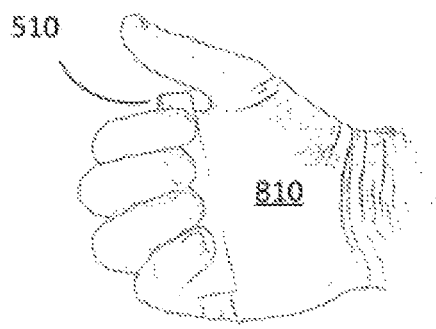
Figure 29:
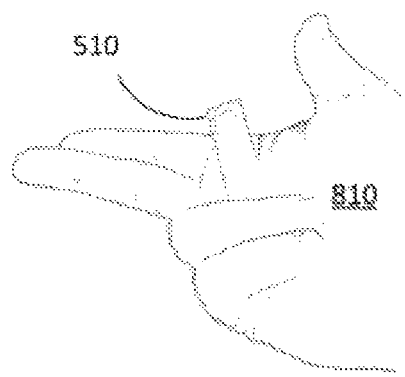

Reference is made to FIGS. 27-29, which are simplified illustrations of a first input accessory 510 for virtual reality (VR) systems, in accordance with an embodiment of the present invention. The purpose of this input accessory 510 is to detect grasping and flexing gestures performed by hand 810. The accessory is the proximity sensor described hereinabove with reference to FIGS. 10-13 and accommodated in a housing that fits in a user's hand 810. As explained hereinabove, this proximity sensor includes a printed circuit board (PCB) on which an array of interleaved individually activatable laser diode emitters and photodiode detectors is mounted, wherein the laser diode emitters emit light along a detection plane 971 outside of the housing, and the photodiode detectors generate detection signals when the light emitted by the laser diode emitters is reflected by an object that passes through the detection plane back to the photodiode detectors.

Input accessory 510 detects grasping and flexing gestures by having the user hold input accessory 510 in a manner that its detection plane 971 extends above and across the prone fingers of hand 810, as illustrated in FIG. 27, whereas flexed fingers of hand 810 enter detection plane 971, as illustrated by FIGS. 28 and 29. The processor in accessory 510 identifies which fingers are flexed by mapping fingers on hand 810 to locations along the length of accessory 510. The processor is in communication with a VR system to report detected grasping and flexing gestures.

The processor is connected to the laser diode emitters and photodiode detectors, to (i) selectively activate the laser diode emitters and photodiode detectors, (ii) detect a plurality of grasping and flexing gestures performed when holding the accessory in the palm of hand 810 as one or more of the hand's fingers pass through the projection plane, based on detection signals generated by the photodiode detectors, and (iii) transmit input signals to the VR system, corresponding to the detected grasping and flexing gestures. FIG. 28 shows a first detected gesture in which two fingers are flexed and two others are prone, and FIG. 29 shows a second detected gesture in which four fingers are flexed. In response to these detected gestures the VR system performs actions in its virtual environment. For example, in response to a detected grasping gesture the VR system simulates the user picking up an object in the virtual environment, and in response to detecting a release gesture of stretching out one's fingers the VR system simulates the user releasing a held object in the virtual environment. Combinations of gestures by different fingers of hand 810 activate different functions. E.g., bending the middle finger and the index finger activates a first function, and bending the ring finger and the index finger activates a second function.

Figure 30:
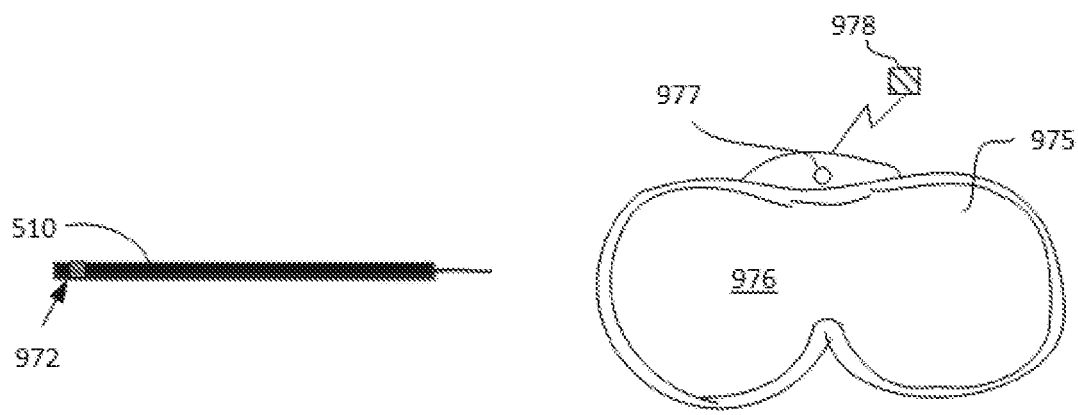
FIGS. 30 and 31 are simplified illustrations of a second input accessory for virtual reality systems, in accordance with an embodiment of the present invention.
Figure 31:
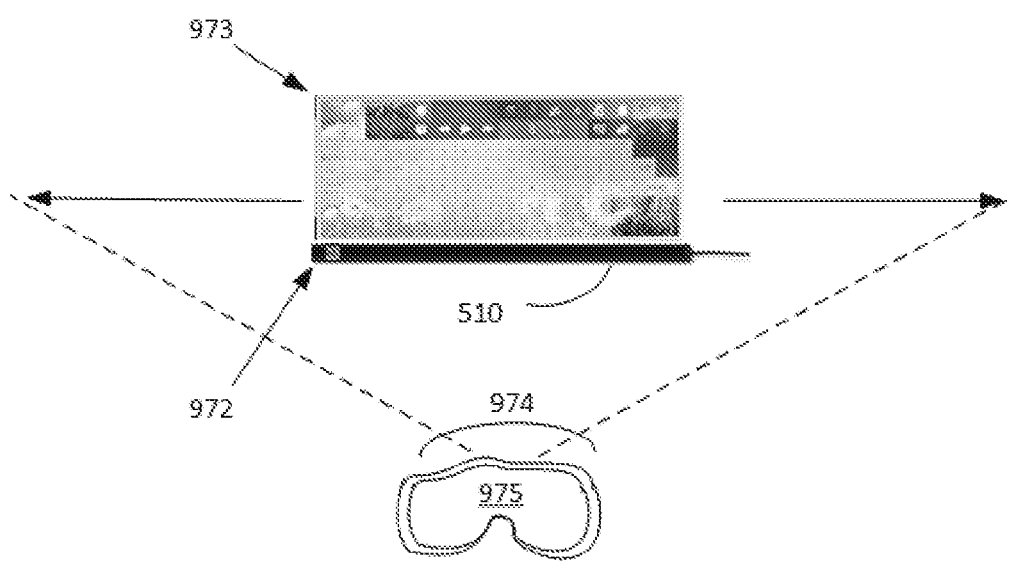

Reference is made to FIGS. 30 and 31, which are simplified illustrations of a second input accessory 510 for VR systems, in accordance with an embodiment of the present invention. The purpose of this input accessory 510 is to provide a virtual keyboard or trackpad. The accessory is the proximity sensor described hereinabove with reference to FIGS. 10-13 accommodated in a housing on which QR code 972, or another identifiable graphic, is provided. The VR system includes headset 975 having a semi-transparent display 976 operable to overlay graphics, such as screen graphic 973, on the wearer's field of view 974. Headset 975 also includes a camera 977 that captures at least a portion of the wearer's field of view 974, and an image processing unit 978 that extracts information from the captured images. Image processing unit 978 is shown outside headset 975 in FIG. 30 for clarity. However, image processing unit 978 may be mounted in headset 975 or outside it.

When camera 977 captures an image of input accessory 510, image processing unit 978 extracts information, namely, (i) an identifier, from QR code 972, identifying the type of keyboard or trackpad to be rendered on display 976, and (ii) the location of QR code 972 in the wearer's field of view 974. Display 976 renders the thus identified keyboard anchored at or near the QR code location in the wearer's field of view 974 such that gestures performed on the virtual keyboard or trackpad are inside detection plane 971 of accessory 510, and the virtual keys are seen by the wearer as being actuated. Accessory 510 also includes communication circuitry that sends the detected gesture input to headset 975 or to another unit of the VR system.

Figure 32:
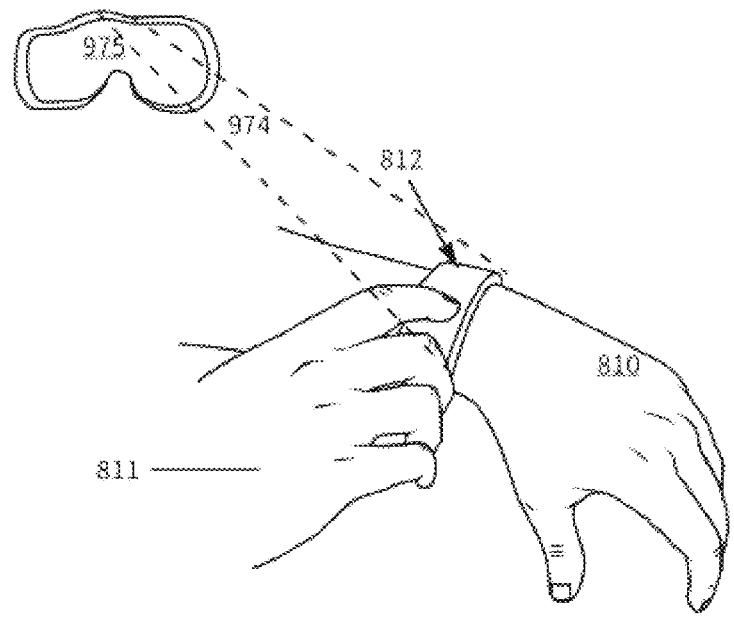
FIGS. 32-34 are simplified illustrations of a third input accessory for virtual reality systems, in accordance with an embodiment of the present invention.
Figure 33:
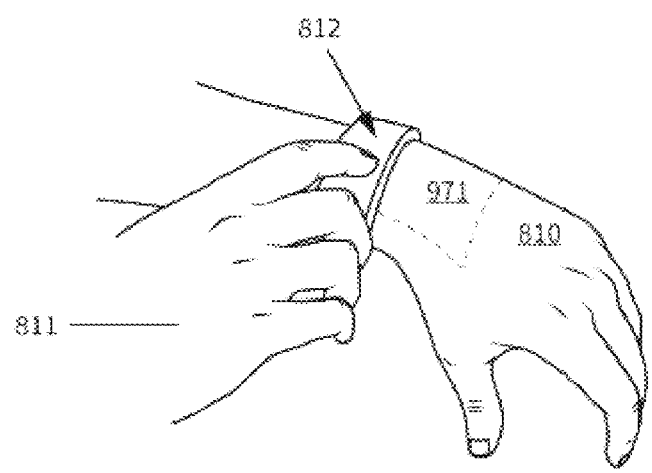
Figure 34:
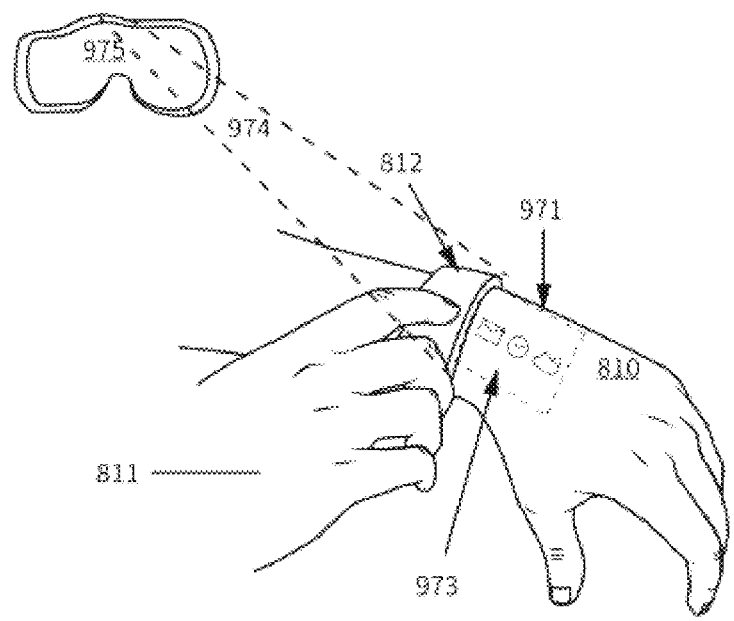

Reference is made to FIGS. 32-34, which are simplified illustrations of a third input accessory for VR systems, in accordance with an embodiment of the present invention. FIGS. 32-34 show a bracelet 812 for use in a VR system similar to that shown in FIGS. 30 and 31. FIGS. 32-34 show bracelet 812 worn on a user's arm above hand 810. FIG. 32 shows an arm wearing bracelet 812 as seen by the naked eye. FIG. 33 shows a detection zone 971 on the user's arm provided by a light-based proximity sensor housed in bracelet 812, similar to that described hereinabove with reference to FIGS. 10-13. FIG. 34 shows the user's arm as seen by the wearer of headset 975. A QR code or other identifiable graphic (not shown) on bracelet 812 is visible to camera 977 in headset 975, and the identification of that code or graphic by image processing unit 978 causes headset display 976 to render a corresponding keyboard 973 anchored at or near the QR code location, on the user's arm. Gestures performed on the virtual keyboard are inside detection plane 971 of bracelet 812, and the virtual keys are seen by the wearer as being actuated by the user's other hand 811. Bracelet 812 also includes wireless communication circuitry that sends the detected gesture input to headset 975.

Figure 35:
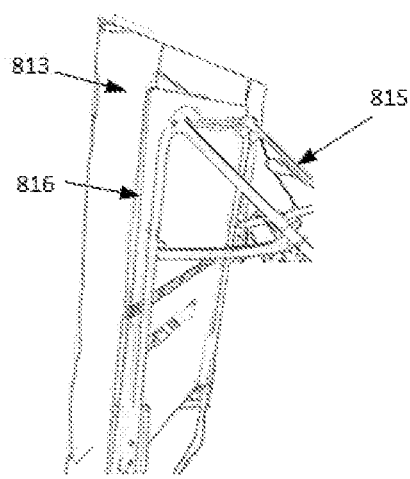
FIGS. 35-37 are simplified illustrations of an interactive mirror, in accordance with an embodiment of the present invention.
Figure 36:
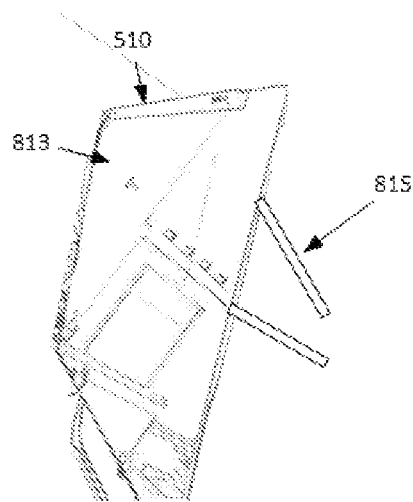
Figure 37:
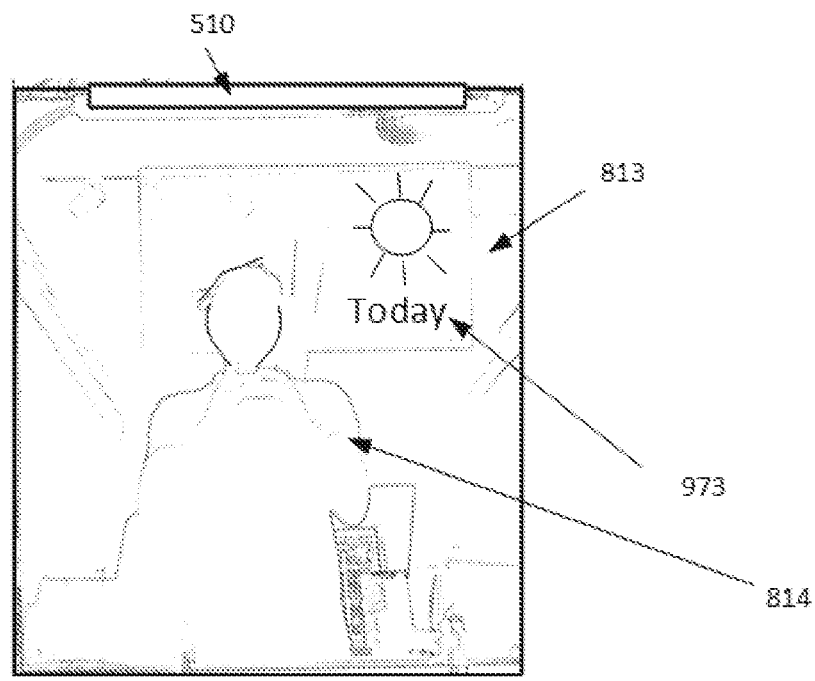

Reference is made to FIGS. 35-37, which are simplified illustrations of an interactive mirror, in accordance with an embodiment of the present invention. FIG. 35 is a view from behind the mirror, showing one-way mirror 813, display 816 and bracket 815 for maintaining the mirror upright or mounting it on a wall. The front of display 816, on which images are rendered, faces one-way mirror 813 that so that images rendered on display 816 are visible to a user facing the front of mirror 813.

FIG. 36 shows a front-facing view of one-way mirror 813. Proximity sensor 510, described hereinabove with reference to FIGS. 10-13, is situated along an edge of mirror 813 and its detection plane extends along the upper surface of mirror 813 to detect user gestures that interact with the underlying graphic on display 816. Proximity sensor 510 is in communication with display 816, so that inputs detected by sensor 510 are transmitted to display 816. FIG. 37 shows both a reflection 814 and an image from display 816, seen in one-way mirror 813.

Figure 38:
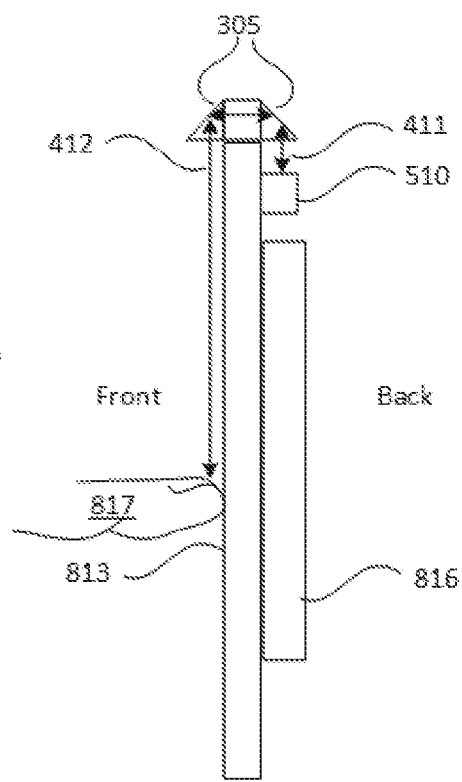
FIGS. 38 and 39 are simplified illustrations of an interactive mirror with an optical sensor mounted behind the mirror, in accordance with an embodiment of the present invention.
Figure 39:
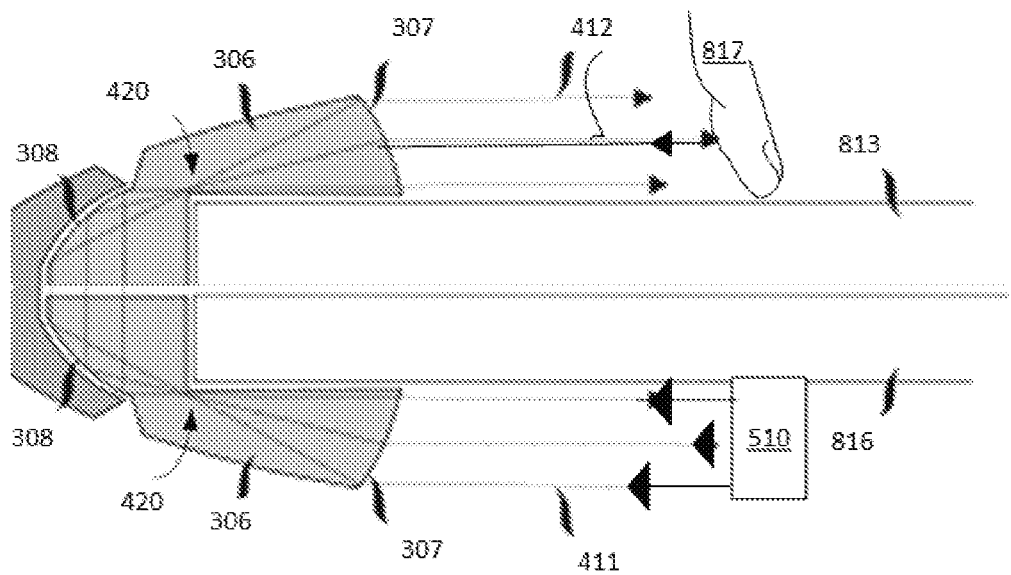

Reference is made to FIGS. 38 and 39, which are simplified illustrations of an interactive mirror with an optical sensor mounted behind the mirror, in accordance with an embodiment of the present invention. FIG. 38 is a profile view of an alternative configuration for an interactive mirror, in which optical proximity sensor 510 is mounted behind the mirror. FIG. 38 shows one-way mirror 813, display 816 and proximity sensor 510 mounted behind mirror 813, and a pair of reflectors 305 for redirecting proximity sensor light beams 411 in front of mirror 813 and redirecting light beams 412 reflected by finger 817 back to proximity sensor 510.

FIG. 39 is a profile view of a lens for redirecting light beams from behind mirror 813 to the front of mirror 813 and back, to replace reflectors 305. FIG. 39 shows one-way mirror 813, display 816 and proximity sensor 510 mounted behind mirror 813, and lenses 306 for redirecting proximity sensor light beams 411 in front of mirror 813 and redirecting light beams 412 reflected by finger 817 back to proximity sensor 510. Each lens 306 includes an outer refractive surface 307 and an inner reflective surface 308 that have a shared focus 420. Lenses 306 are described in U.S. Pat. No. 8,587,562, entitled LIGHT-BASED TOUCH SCREEN USING ELLIPTICAL AND PARABOLIC REFLECTORS, incorporated herein by reference in its entirety.

Figure 40:
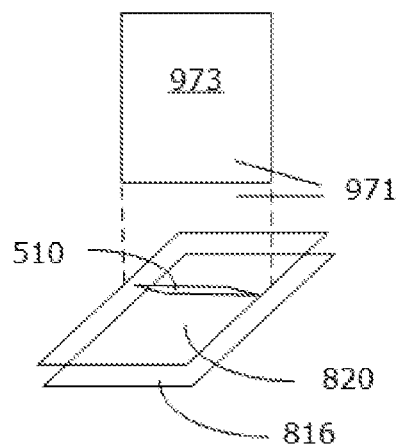
FIG. 40 is a simplified illustration of an interactive mid-air display system, in accordance with an embodiment of the present invention.

Reference is made to FIG. 40, which is a simplified illustration of an interactive mid-air display system, in accordance with an embodiment of the present invention. FIG. 40 shows an interactive mid-air display featuring display 816 and a projector 820 that projects the image on display 816 in-air above the display where it is seen as image 973. The interactive mid-air display includes proximity sensor bar 510 directed along the plane of image 973 for mapping input gestures onto projected image 973 and sending the detected gestures back to display 816.

Proximity sensors according to the present invention are used to generate 3D information about one or more proximal objects by repeatedly moving the proximity sensor, such that light emitted by the emitters is projected into a different planar airspace after each move, repeatedly selectively activating the emitters and the photodiode detectors, repeatedly identifying a shape of the object in the planar airspace, based on outputs of the photodiode detectors and the known angles of maximum emitted light intensity and maximum detected reflections, and combining the identified shapes in the different planar airspaces to generate a three-dimensional image of the object, based on orientations of the planar airspaces. The generated 3D information identifies the object's shape, a 3D volume in which the object is contained, and the object's location.

Figure 41:
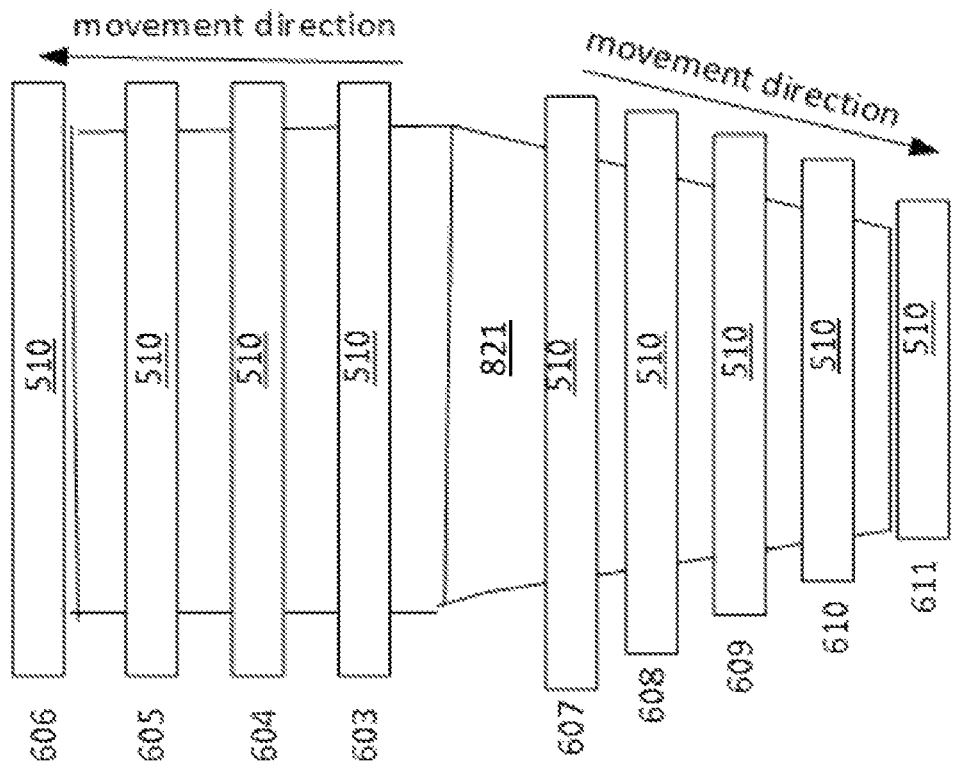
FIG. 41 is a simplified illustration showing an upright proximity sensor bar being repeatedly moved in relation to a detected object, to generate a three-dimensional image of the object, in accordance with an embodiment of the present invention.

Reference is made to FIG. 41, which is a simplified illustration showing an upright proximity sensor bar 510 being repeatedly moved in relation to a detected object, to generate a three-dimensional image of the object, in accordance with an embodiment of the present invention. FIG. 41 shows object 821 being repeatedly scanned by proximity sensor bar 510 at locations 603-606 along a first edge of object 821, and at locations 607-611 along a second edge of object 821. At each scan location proximity sensor bar 510 generates an image of object 821 in the proximity sensor's 2D detection plane. A 3D image of the object is generated by mapping the different 2D detection planes and their respective detections to 3D space. In some embodiments of the invention, proximity sensor bar 510 includes an inertial measurement unit (IMU) that tracks the position and orientation of the sensor bar, and its detection plane, to facilitate mapping the different 2D detection planes and their respective detections to a common 3D space. The IMU includes one or more components operable to measure and report the sensor bar's specific force and angular rate, inter alia, accelerometers and gyroscopes.

Figure 42:
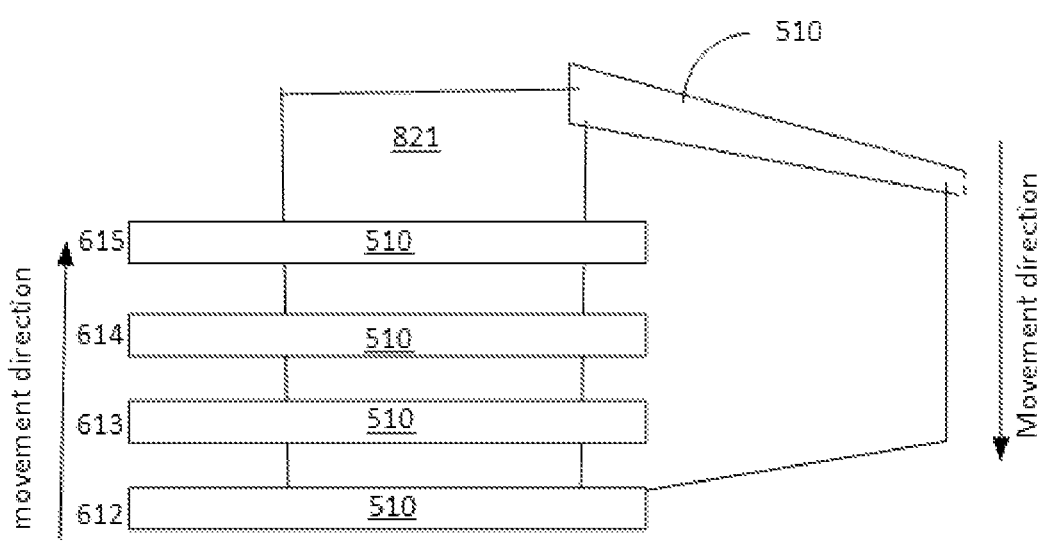
FIG. 42 is a simplified illustration showing a horizontal proximity sensor bar being repeatedly moved in relation to a detected object, to generate a three-dimensional image of the object, in accordance with an embodiment of the present invention.

Reference is made to FIG. 42, which is a simplified illustration showing a horizontal proximity sensor bar being repeatedly moved in relation to a detected object, to generate a three-dimensional image of the object, in accordance with an embodiment of the present invention. FIG. 42 shows object 821 being repeatedly scanned as proximity sensor bar 510 moves upward at locations 612-615 along a first edge of object 821, and as proximity sensor bar 510 moves downward along a second edge of object 821. At each scan location proximity sensor bar 510 generates an image of object 821 in the proximity sensor's 2D detection plane. A 3D image of the object is generated by mapping the different 2D detection planes and their respective detections to 3D space. Although FIGS. 41 and 42 show only two edges of object 821 being scanned, additional edges are scanned as well, and their information is added to the 3D information. In some embodiments of the invention, for each 2D detection plane proximity sensor bar 510 detects multiple points on the outer edge of object 821 and those locations are combined to create a point cloud in the 3D space. In other embodiments of the invention, for each 2D detection plane proximity sensor bar 510 identifies a contiguous edge of object 821 and those edges are combined to create a 3D model in the 3D space.

Figure 43:
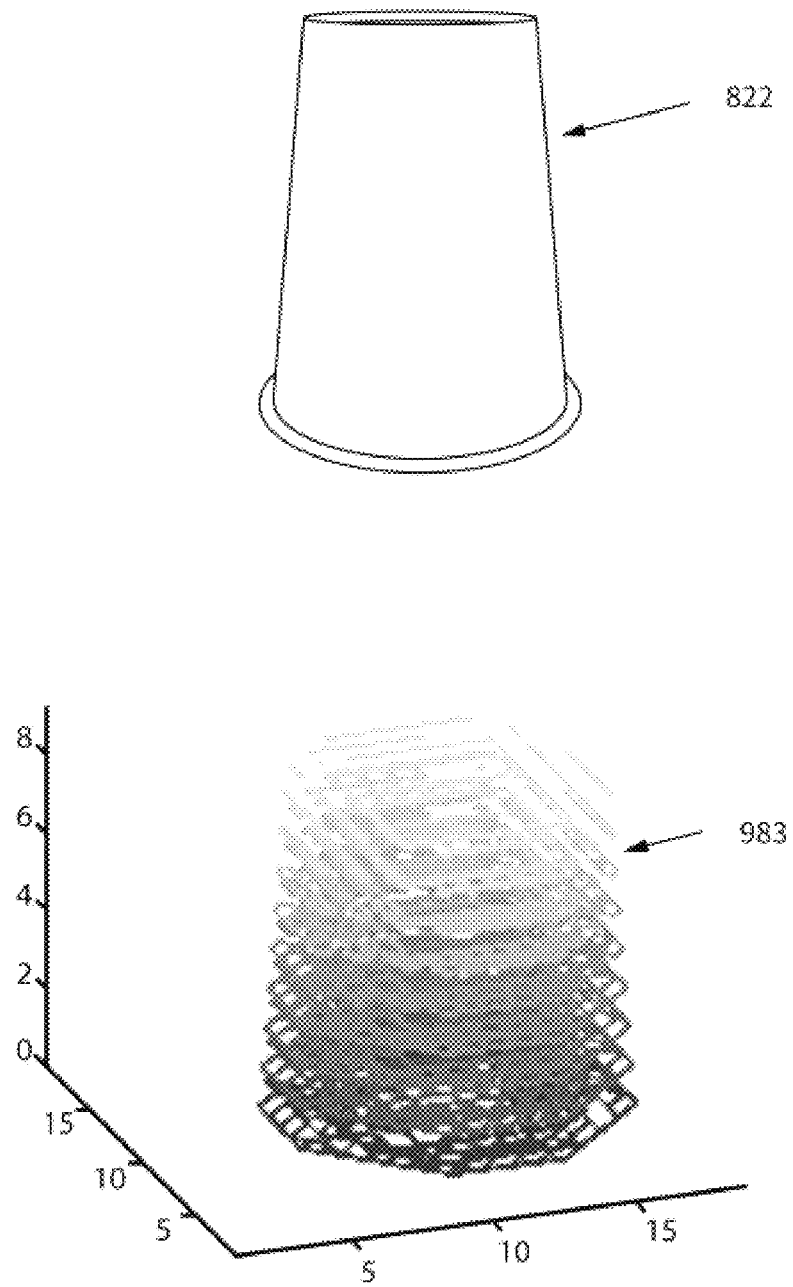
FIG. 43 is an illustration of a scanned cup and scan data combined into a 3D model, in accordance with an embodiment of the present invention.

Reference is made to FIG. 43, which is an illustration of a scanned cup and scan data combined into a 3D model, in accordance with an embodiment of the present invention. FIG. 43 shows a cup 822 and 3D image 983. 3D image 983 was generated by scanning cup 822 with a proximity sensor bar (not shown) at a range of different heights and around the cup's circumference and combining the scan information.

Figure 44:
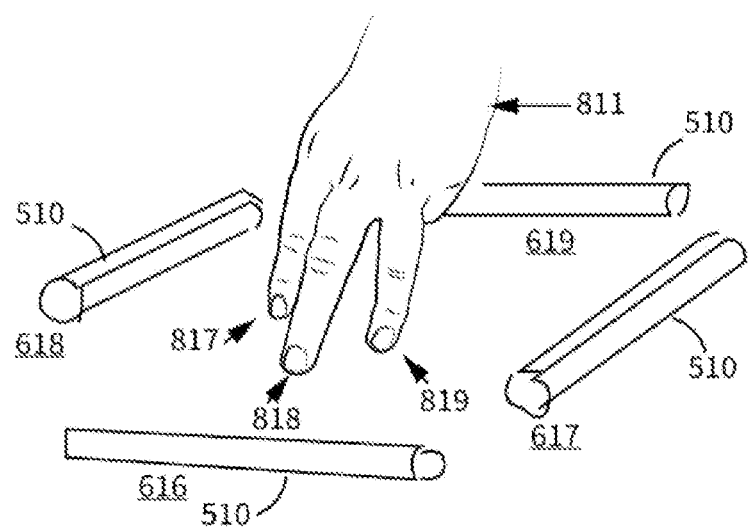
FIG. 44 is a simplified illustration showing three fingers being scanned by a proximity sensor on four different sides of the fingers, in accordance with an embodiment of the present invention.

Reference is made to FIG. 44, which is a simplified illustration showing three fingers being scanned by a proximity sensor on four different sides of the fingers, in accordance with an embodiment of the present invention. FIG. 44 shows three fingers 817-819 of a hand 811 being scanned by proximity sensor bar 510 at four locations 616-619 around the three fingers.

Figure 45:
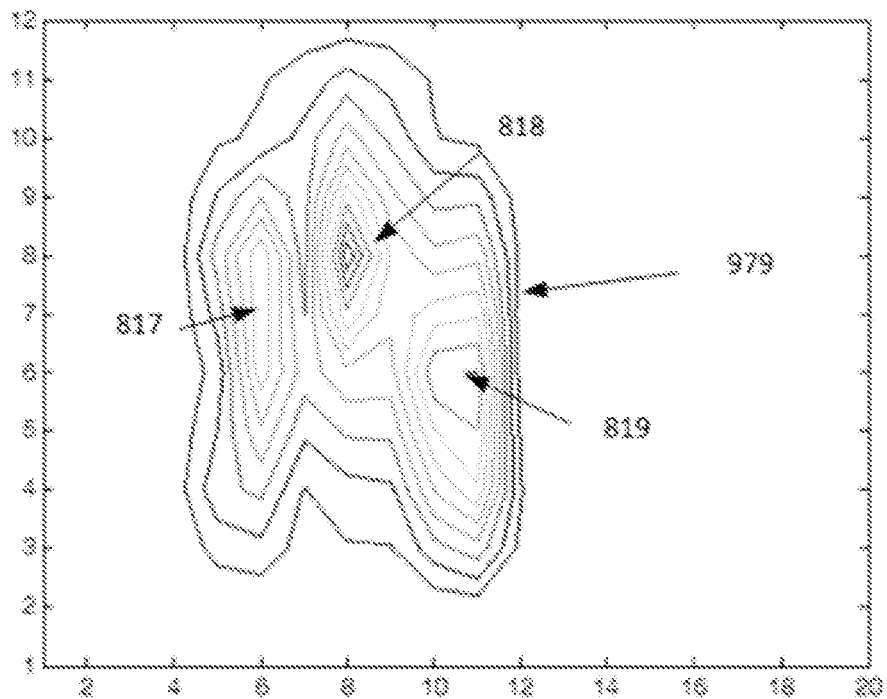
FIG. 45 is a simplified illustration showing detections of the scan operations illustrated in FIG. 44, in accordance with an embodiment of the present invention.

Reference is made to FIG. 45, which is a simplified illustration showing detections of the scan operations illustrated in FIG. 44, in accordance with an embodiment of the present invention. FIG. 45 shows scan signals 979 mapped to locations in the detection plane from one of the proximity sensor locations in FIG. 44. The locations of fingers 817-819 are indicated in signals 979.

Figure 46:
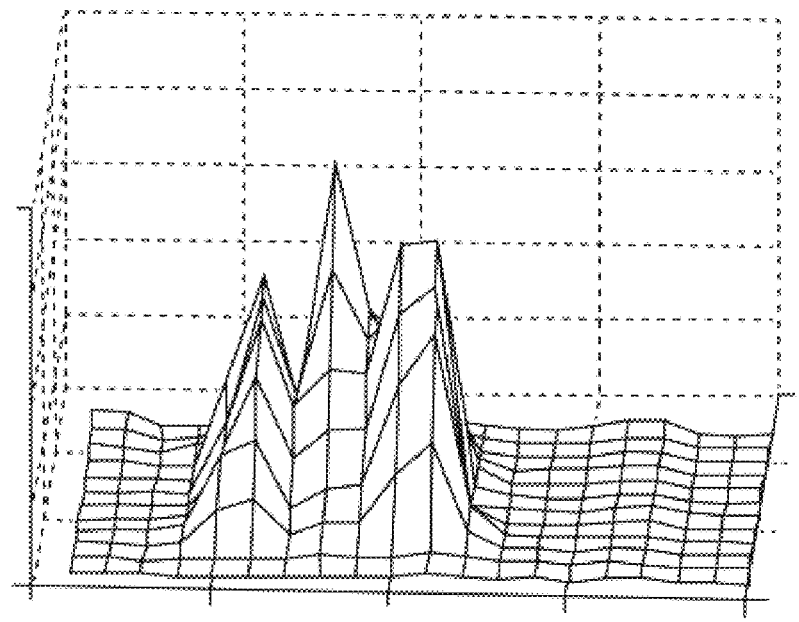
FIG. 46 is a simplified illustration showing signal intensities in the scan operations illustrated in FIG. 44, in accordance with an embodiment of the present invention.

Reference is made to FIG. 46, which is a simplified illustration showing signal intensities in the scan operations illustrated in FIG. 44, in accordance with an embodiment of the present invention. FIG. 46 shows a 3D model 980 of the scan signals 979 of FIG. 45 mapped to locations in the detection plane.

Figure 47:
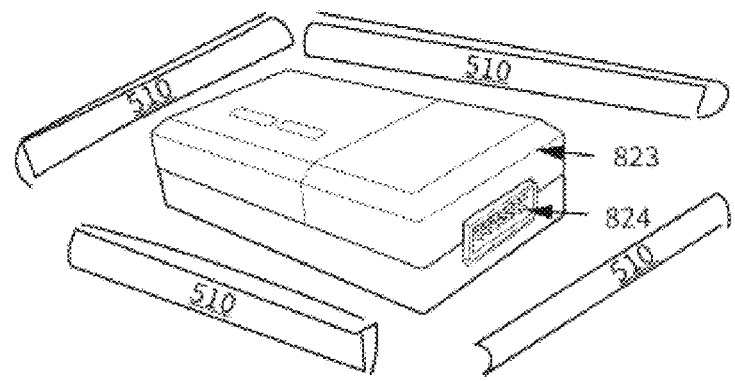
FIG. 47 is a simplified illustration of a debugger interface unit scanned by a proximity sensor on four different sides of the unit, in accordance with an embodiment of the present invention.

Reference is made to FIG. 47, which is a simplified illustration of a debugger interface unit scanned by a proximity sensor on four different sides of the unit, in accordance with an embodiment of the present invention. FIG. 47 shows a debugger unit 823 being scanned by proximity sensor bar 510 at four sides of the unit. Scanning is performed at multiple heights opposite each side of unit 823 in order to generate a 3D image of the unit.

Figure 48:
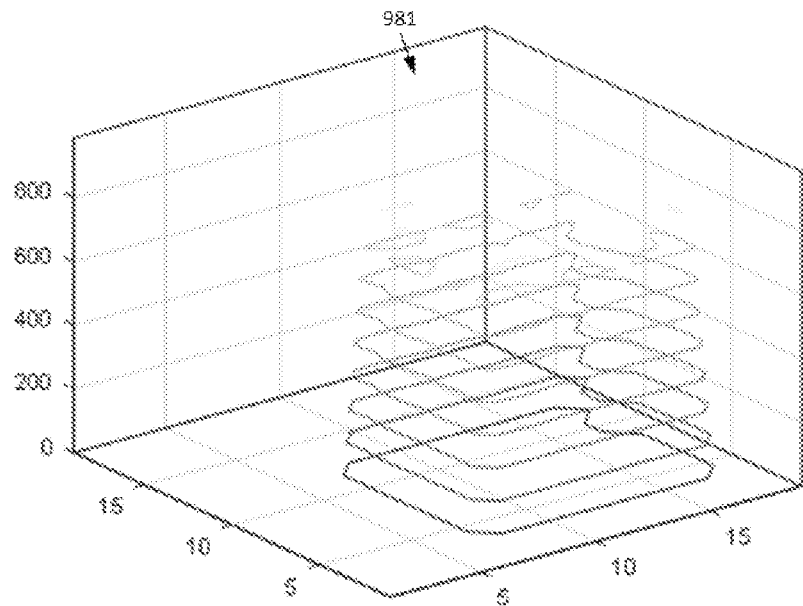
FIG. 48 is a simplified illustration showing signal intensities in the scan operations illustrated in FIG. 47, in accordance with an embodiment of the present invention.

Reference is made to FIG. 48, which is a simplified illustration showing signal intensities in the scan operations illustrated in FIG. 47, in accordance with an embodiment of the present invention. FIG. 48 shows a 3D image 981 of unit 823 created by combining scan information from the multiple scans discussed in relation to FIG. 47. The indent at the right edge of 3D image 981 corresponds to socket 824 shown in FIG. 47.

As proximity sensor bar 510 is translated along the height of a scanned object, three types of detection event are generated: NULL, OBJECT and SHADOW. A NULL event is generated when noise or no signal is detected, indicating that no object is situated in the proximity sensor detection plane. An OBJECT event is generated when a high reflection is detected, indicating that an object is situated in the proximity sensor detection plane. A SHADOW event is on the border between a NULL event and an OBJECT event, i.e., when some reflection is detected, but it is unclear if that reflection should be treated as noise or as an object reflection. SHADOW events are generated, inter alia, when proximity sensor light beams pass near an object, for example when the detection plane is just beyond the top or bottom of the object.

Figure 49:
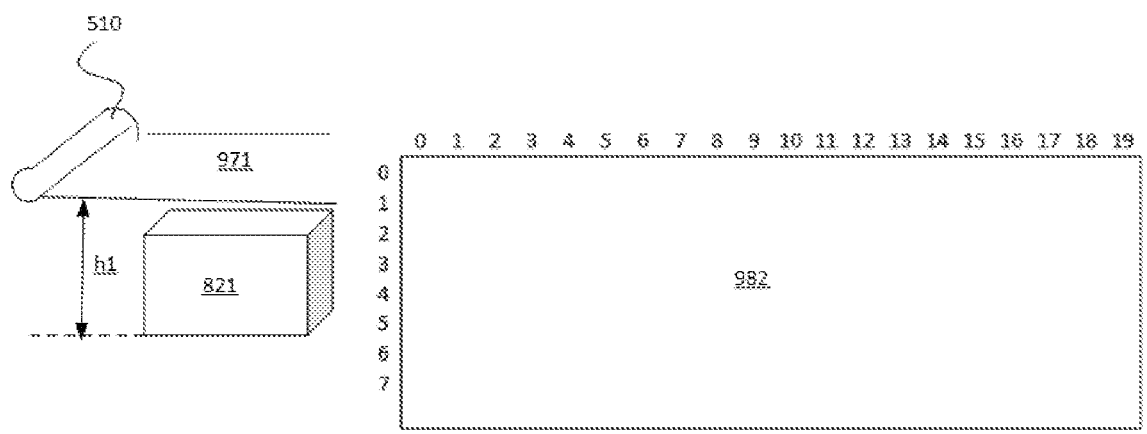
FIG. 49 is a simplified illustration showing a proximity sensor directed above an object, and the resulting scan information, in accordance with an embodiment of the present invention.

Reference is made to FIG. 49, which is a simplified illustration showing a proximity sensor directed above an object, and the resulting scan information, in accordance with an embodiment of the present invention. FIG. 49 shows sensor 510 at a height h1, whose detection plane 971 is above object 821. Detections of reflected light are mapped to detection plane 982. In this case there are no object reflections and all detections are NULL events, as detection plane 971 is above object 821.

Figure 50:
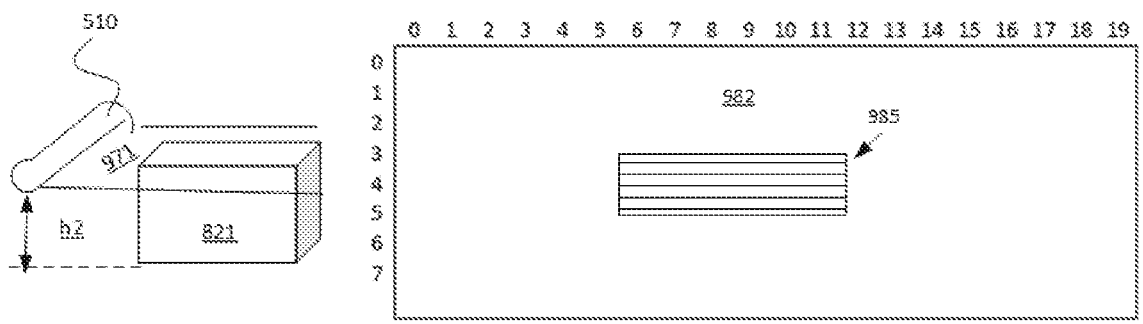
FIG. 50 is a simplified illustration showing a proximity sensor directed at an upper edge of an object, and the resulting scan information, in accordance with an embodiment of the present invention.

Reference is made to FIG. 50, which is a simplified illustration showing a proximity sensor directed at an upper edge of an object, and the resulting scan information, in accordance with an embodiment of the present invention. FIG. 50 shows sensor 510 at a height h2, whose detection plane 971 coincides with the top of object 821. Detections 985 of reflected light are mapped to detection plane 982. In this case, the detections are all SHADOW events.

Figure 51:
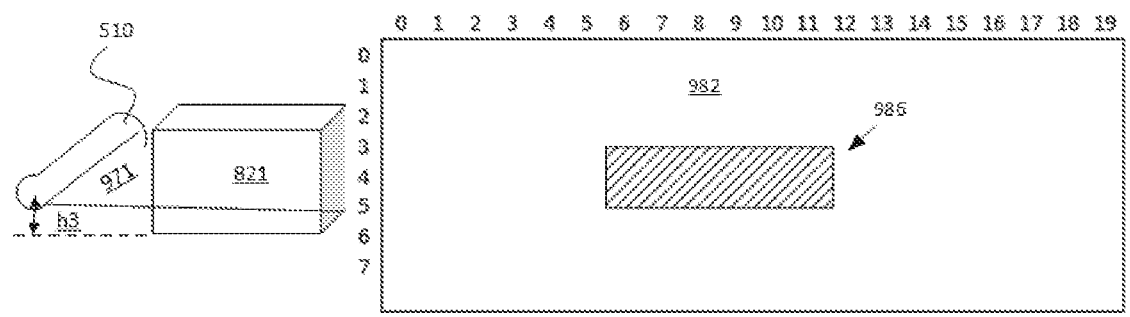
FIG. 51 is a simplified illustration showing a proximity sensor directed at the center of an object, and the resulting scan information, in accordance with an embodiment of the present invention.

Reference is made to FIG. 51, which is a simplified illustration showing a proximity sensor directed at the center of an object, and the resulting scan information, in accordance with an embodiment of the present invention. FIG. 51 shows sensor 510 at a height h3, whose detection plane 971 intersects the middle of object 821. Detections 986 of reflected light are mapped to detection plane 982. In this case, the detections are OBJECT events.

Figure 52:
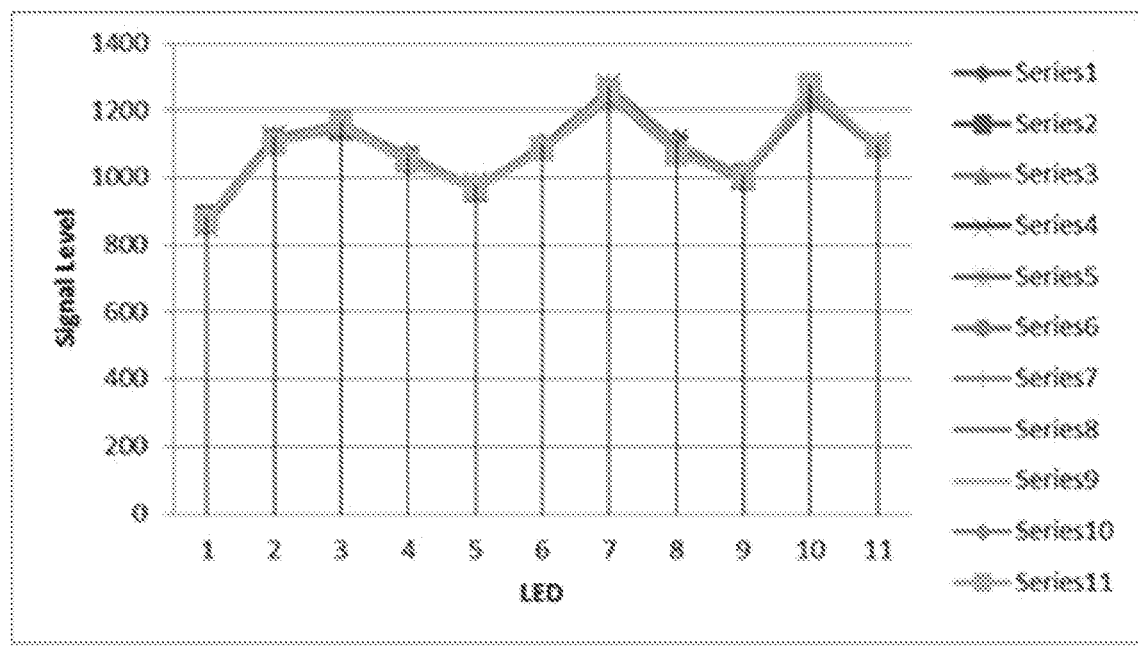
FIG. 52 is a graph of detection signals for individual emitter-detector pairs generated by 11 scan sequences performed by a proximity sensor situated at a fixed location in relation to an object, in accordance with an embodiment of the present invention.

Reference is made to FIG. 52, which is a graph of detection signals for individual emitter-detector pairs generated by 11 scan sequences performed by a proximity sensor situated at a fixed location in relation to an object, in accordance with an embodiment of the present invention. FIG. 52 shows results of 11 scan sequences by a proximity sensor bar placed a fixed distance from an object. The x-axis represents an index of the emitters in the proximity sensor bar, and the y-axis represents signal strength. For each emitter the maximum detected reflection is plotted on the graph. Although maximum signals for neighboring emitters differ, the maximum signal from each emitter remains stable over all 11 activations, indicating that the signals are stable.

Figure 53:
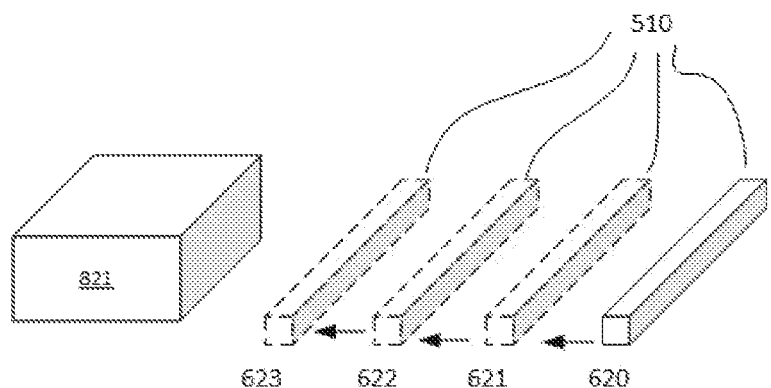
FIG. 53 is a simplified illustration showing a proximity sensor scanning an object at four different distances from the object, in accordance with an embodiment of the present invention.
Figure 54:
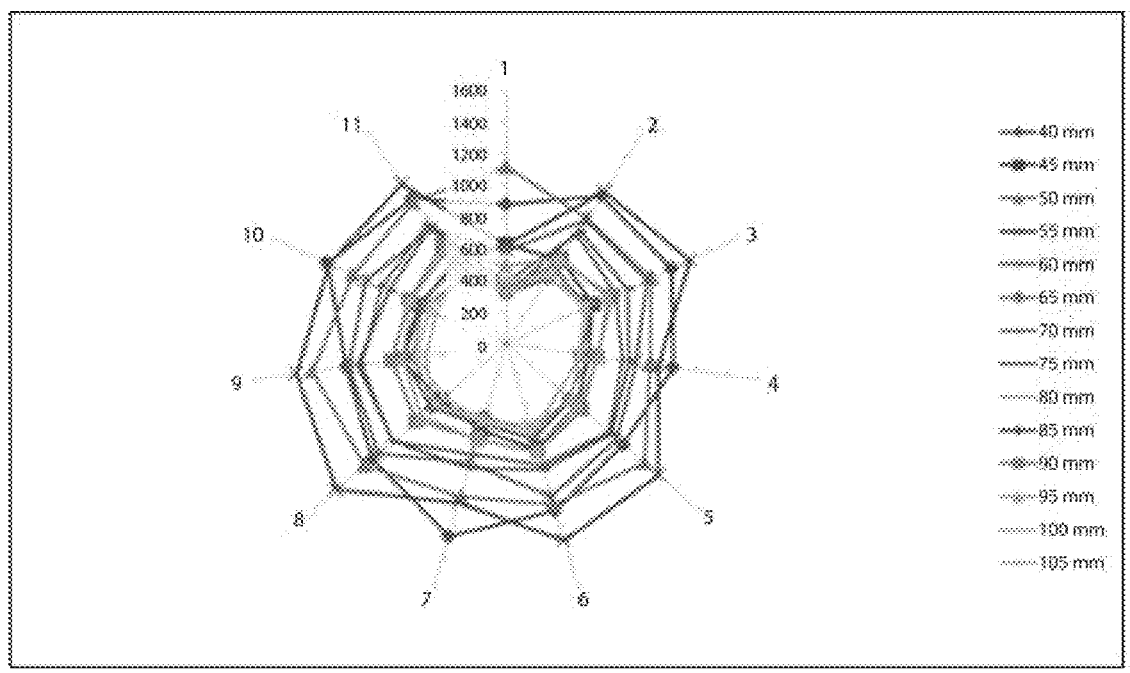
FIG. 54 is a radar plot of detection signals generated by scan sequences performed at multiple locations around an object, and at different distances from the object, in accordance with an embodiment of the present invention.

FIGS. 53 and 54 show how a distance between the sensor bar and a detected object is derived from the strength of the detector signal. Reference is made to FIG. 53, which is a simplified illustration showing a proximity sensor scanning an object at four different distances from the object, in accordance with an embodiment of the present invention. FIG. 53 shows sensor bar 510 scanning object 821 at four locations 620-623, each a different distance from object 821. The magnitude of the detected reflections of object 821 is weaker as the distance increases. Reference is made to FIG. 54, which is a radar plot of detection signals generated by scan sequences performed at multiple locations around an object, and at different distances from the object, in accordance with an embodiment of the present invention. FIG. 54 shows a radar plot of detection signals generated by the proximity sensor bar at 14 different locations, 40 mm-105 mm from the object with a 5 mm step between locations. FIG. 54 shows that radar plots for detections generated at locations 20 mm apart do not intersect. Thus, detection signal strength is used to detect a distance between the object and the sensor bar at a resolution of 20 mm.

Figure 55:
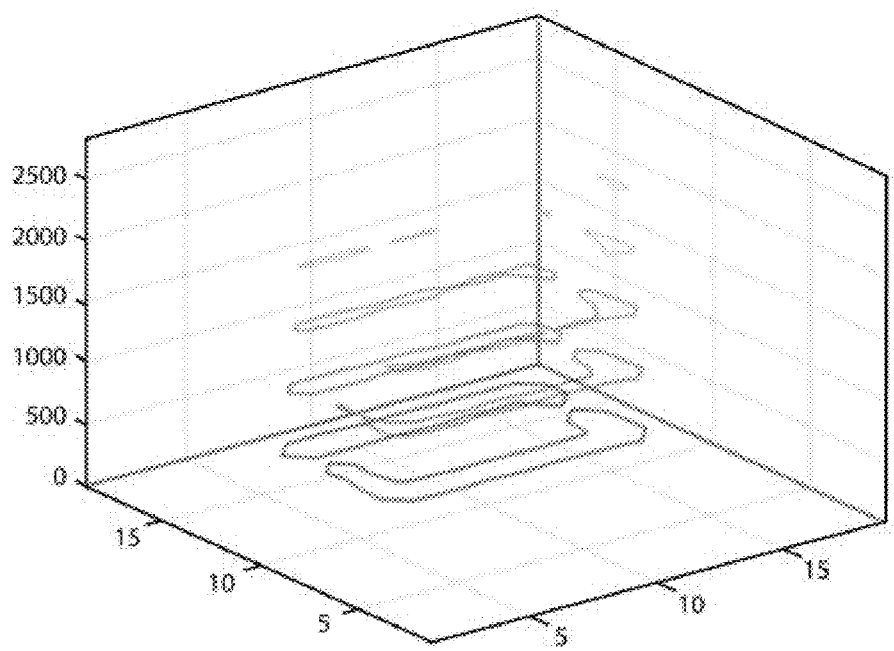
FIG. 55 is a 3D graph of signal intensities generated by a proximity sensor bar placed along four sides of a scanned object at a first height, in accordance with an embodiment of the present invention.
Figure 56:
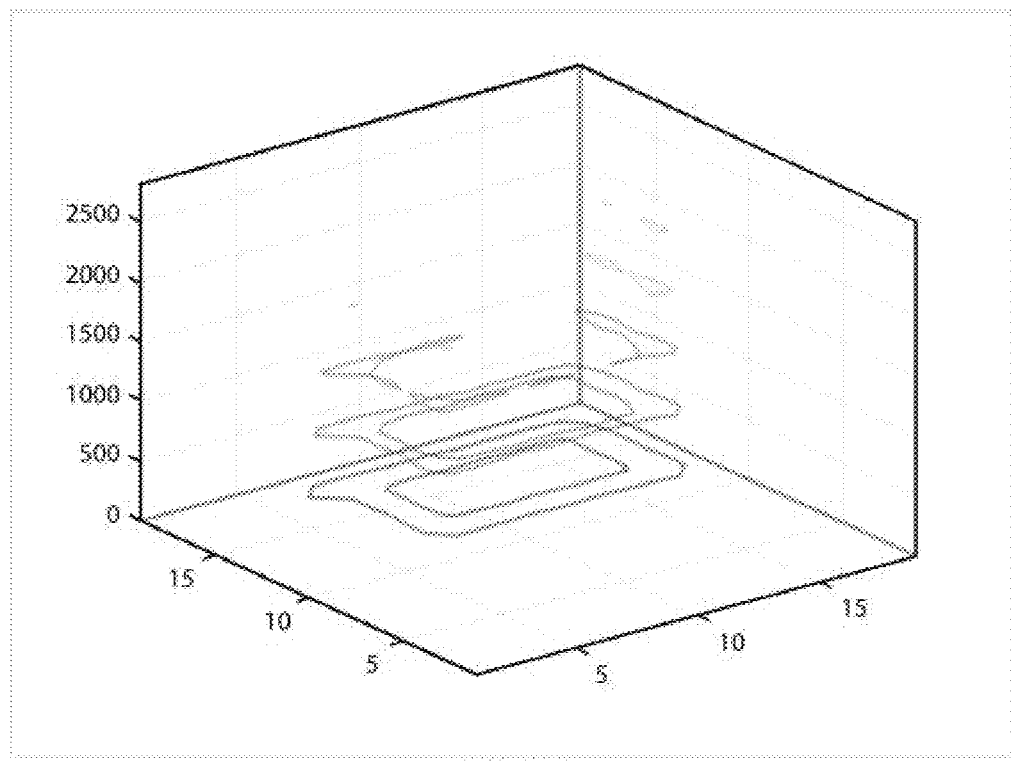
FIG. 56 is a graph of detection signals generated by scan sequences performed at multiple locations around an object, similar to those of FIG. 55 but at a second fixed height in relation to the object, in accordance with an embodiment of the present invention.
Figure 57:
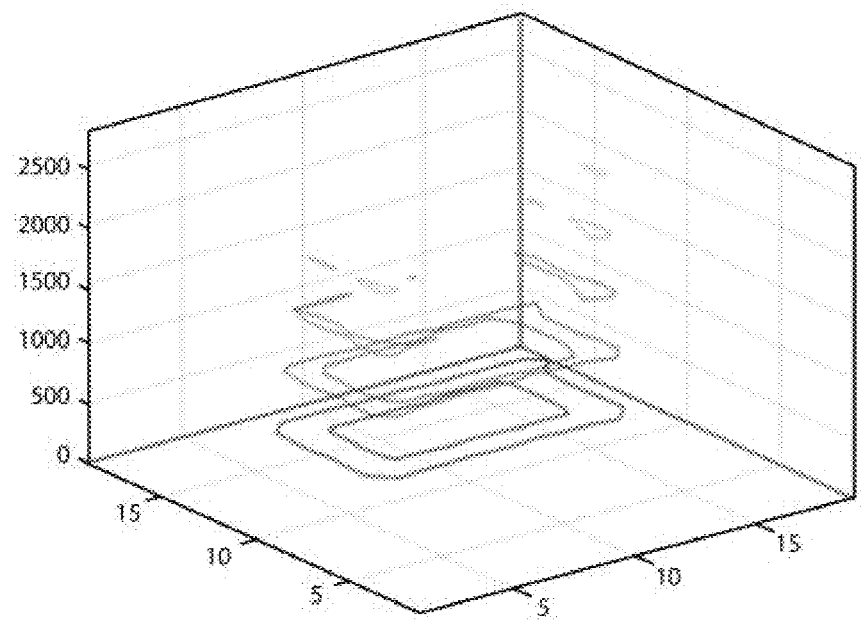
FIG. 57 is a 3D graph of signal intensities generated by a proximity sensor bar placed along the four sides of a scanned object at a third height, in accordance with an embodiment of the present invention.
Figure 58:
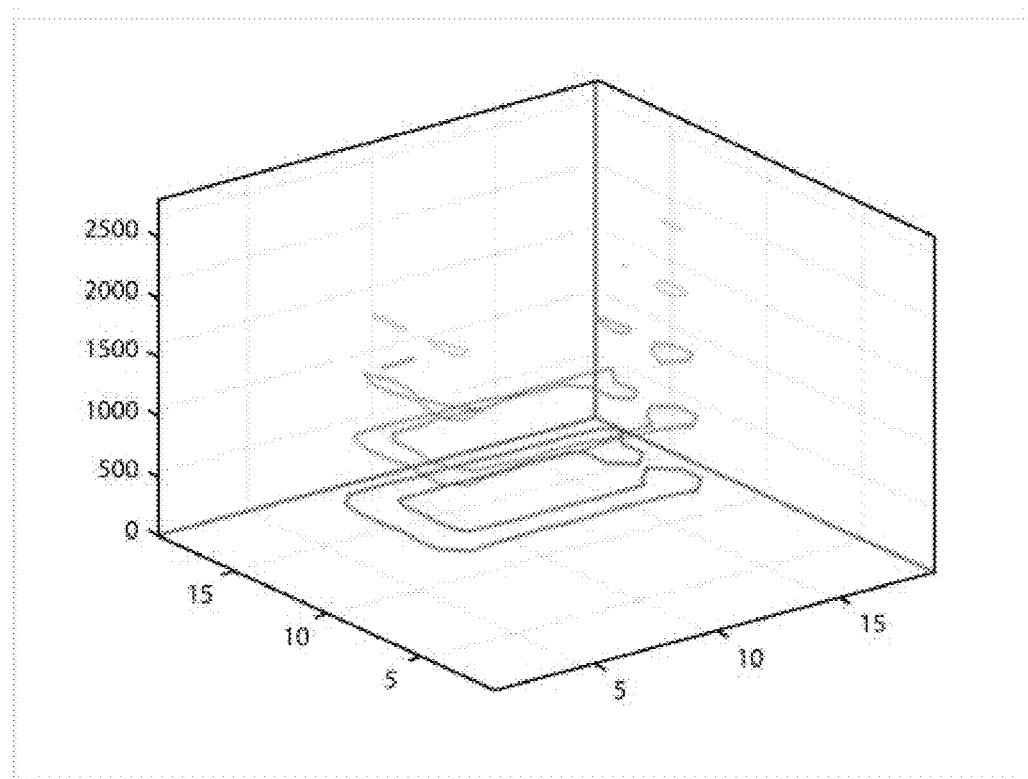
FIG. 58 is a 3D graph of signal intensities generated by a proximity sensor bar placed along the four sides of a scanned object at a fourth height, in accordance with an embodiment of the present invention.
Figure 59:
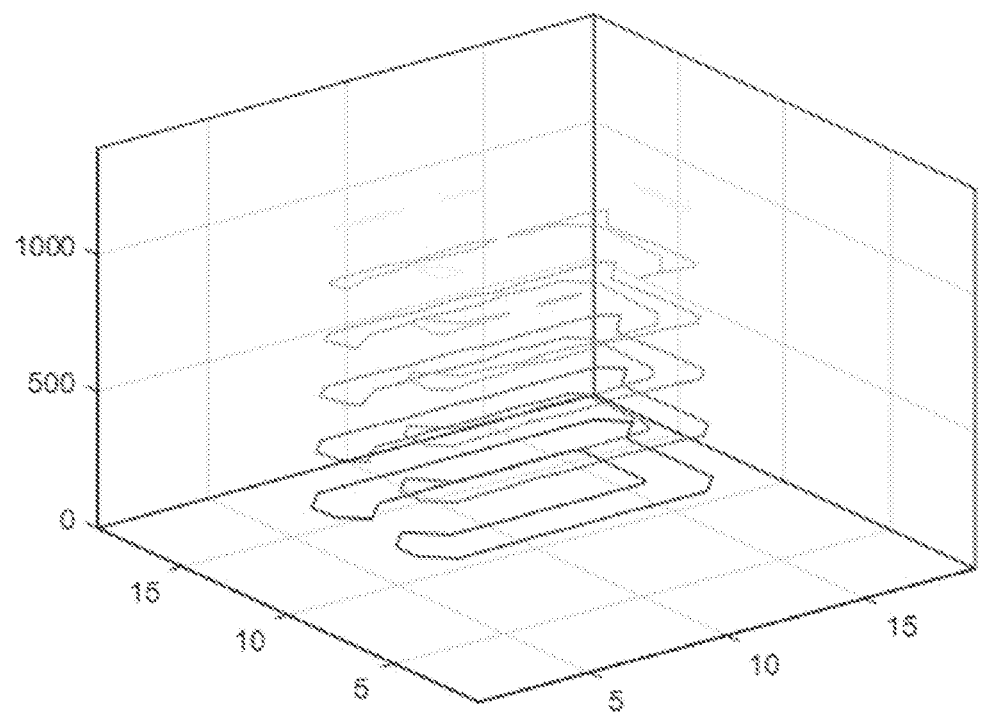
FIG. 59 is a simplified illustration of a 3D image of a scanned object, generated by combining detections of a proximity sensor placed at locations around the object, and at different heights in relation to the object, in accordance with an embodiment of the present invention.
Figure 60:
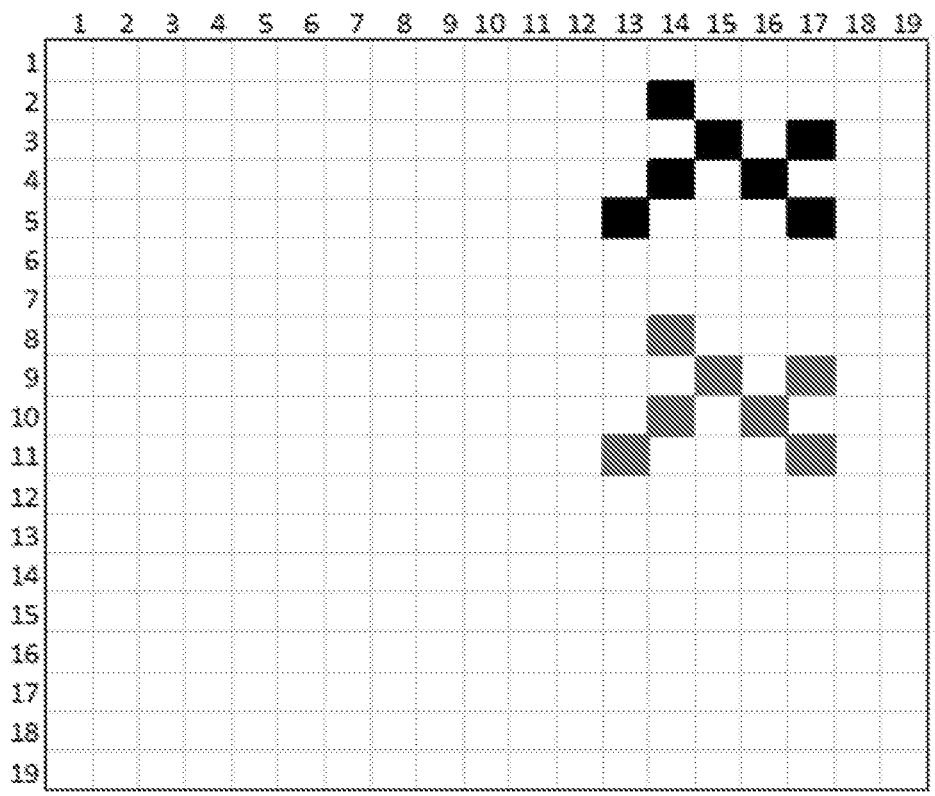
FIGS. 60-63 are illustrations showing translating the location of an object, as detected in a single proximity sensor's detection plane, to a common detection plane formed by the union of multiple proximity sensor detection planes, in accordance with an embodiment of the present invention.
Figure 61:
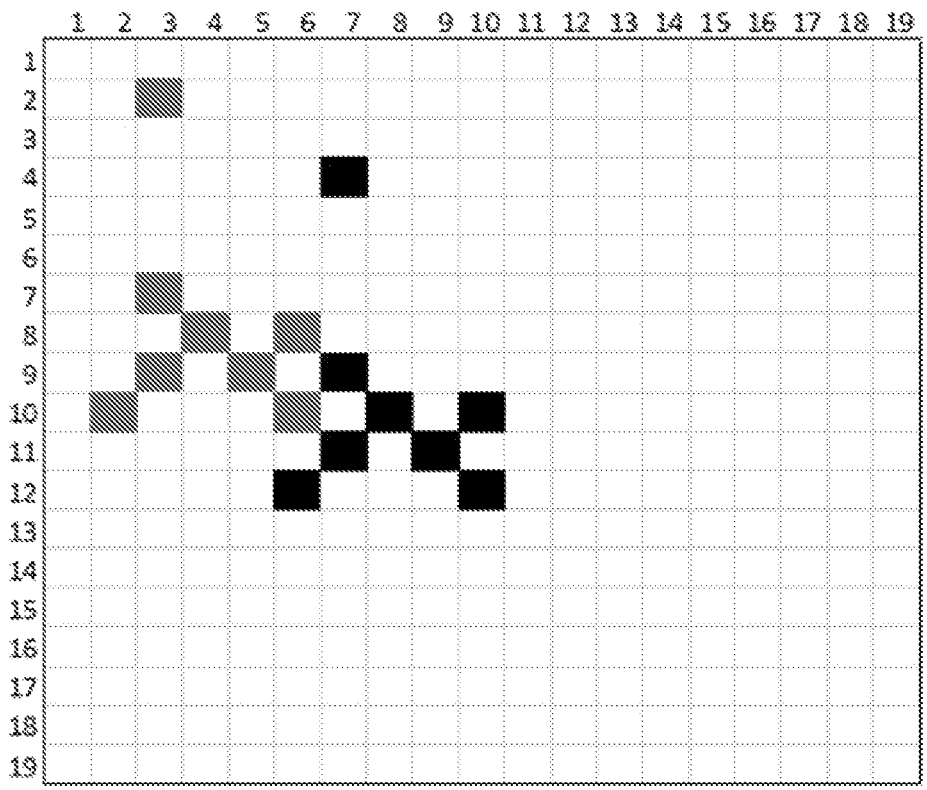
Figure 62:
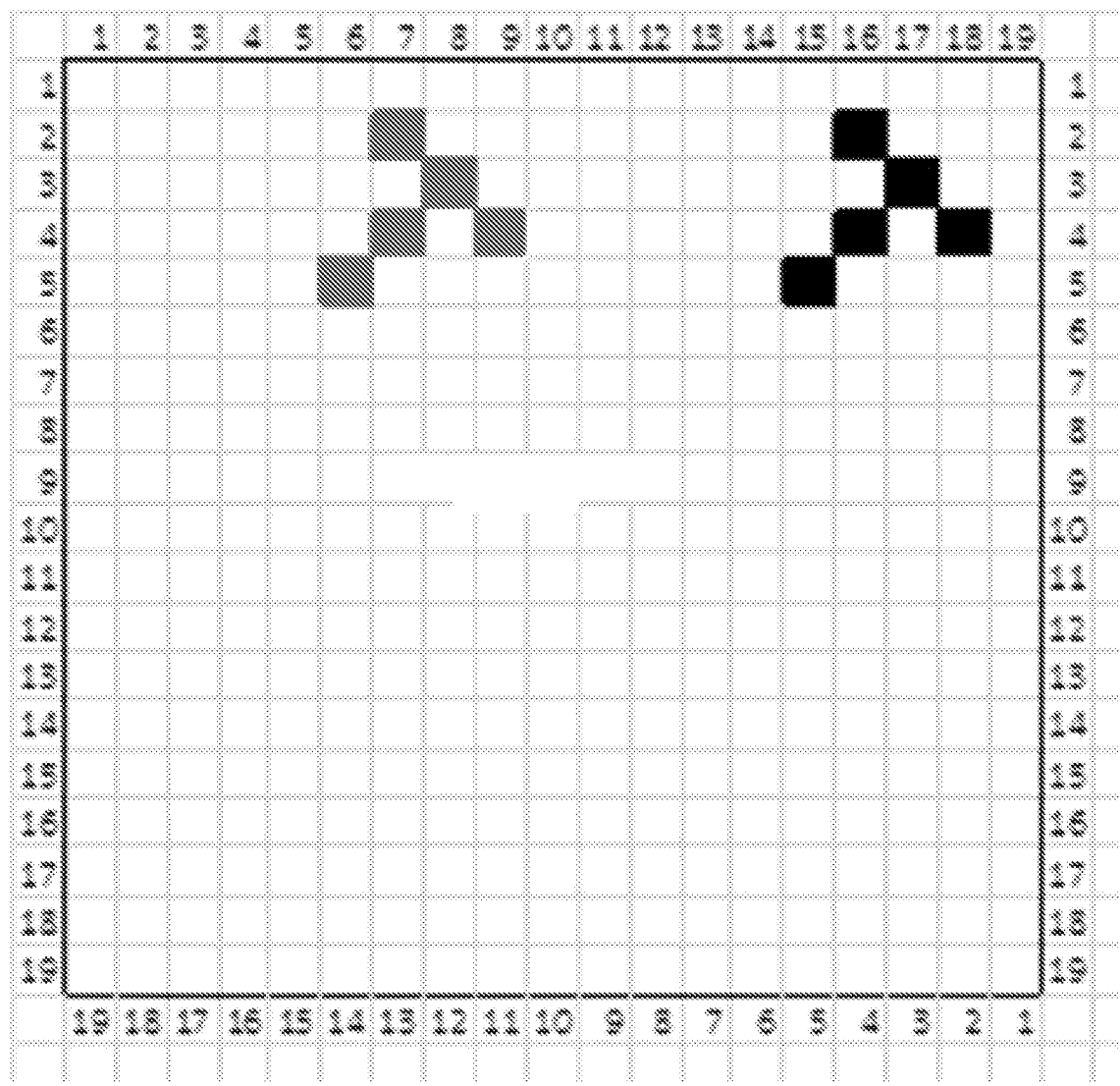
Figure 63:
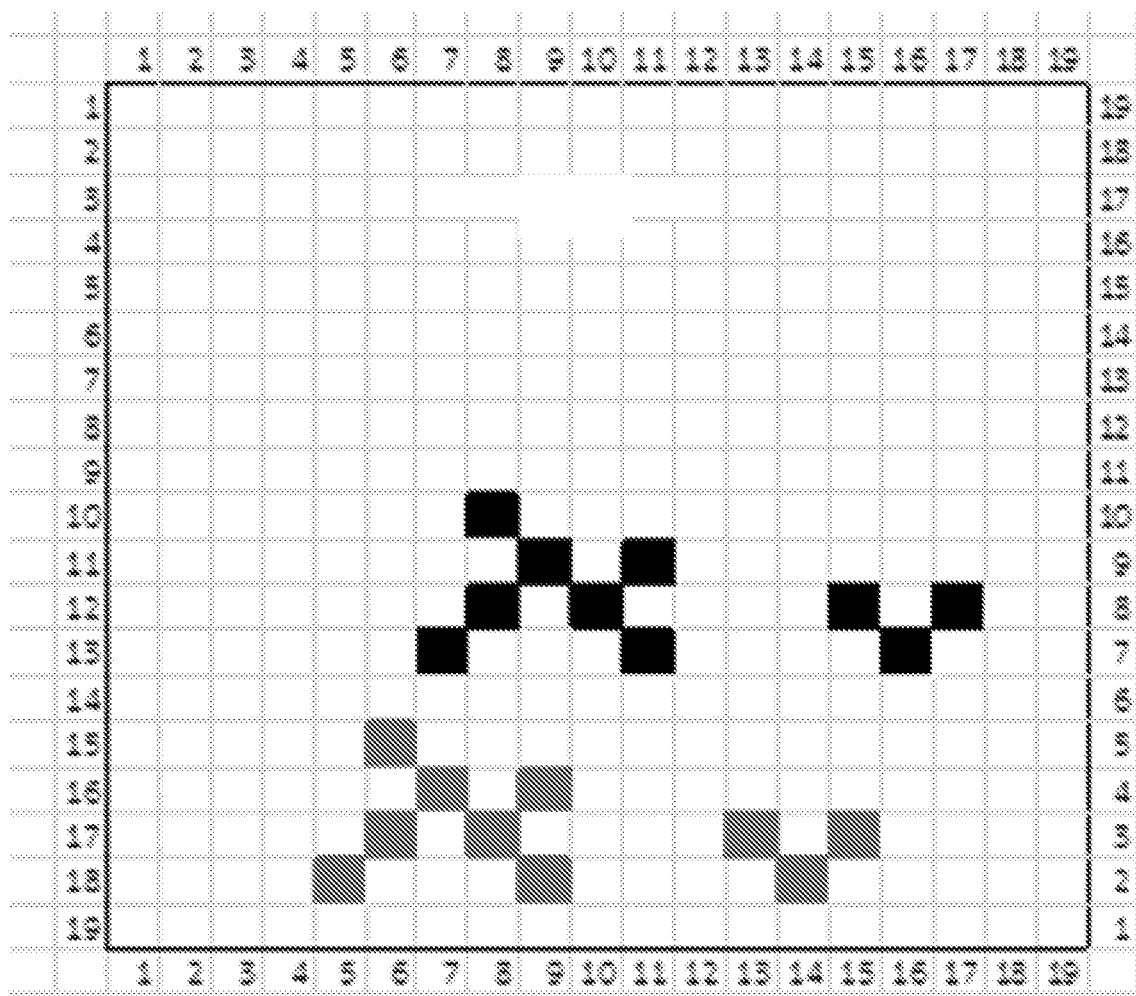

Reference is made to FIG. 55, which is a 3D graph of signal intensities generated by a proximity sensor bar placed along four sides of a scanned object at a first height, in accordance with an embodiment of the present invention. Reference is made to FIG. 56, which is a 3D graph of signal intensities generated by the proximity sensor bar placed along the four sides of the scanned object at a second height, in accordance with an embodiment of the present invention. Reference is made to FIG. 57, which is a 3D graph of signal intensities generated by the proximity sensor bar placed along the four sides of the scanned object at a third height, in accordance with an embodiment of the present invention. Reference is made to FIG. 58, which is a 3D graph of signal intensities generated by the proximity sensor bar placed along the four sides of the scanned object at a fourth height, in accordance with an embodiment of the present invention. The scanned object is debugger unit 823 shown in FIG. 47. Reference is made to FIG. 59, which is a simplified illustration of a 3D image of a scanned object, generated by combining detections of a proximity sensor placed at locations around the object, and at different heights in relation to the object, in accordance with an embodiment of the present invention. FIG. 59 shows a 3D image of the scanned object, created by combining the four sets of scan information shown in FIGS. 55-58.

Reference is made to FIGS. 60-63, which are illustrations showing translating the location of an object, as detected in a single proximity sensor's detection plane, to a common detection plane formed by the union of multiple proximity sensor detection planes, in accordance with an embodiment of the present invention. FIGS. 60-63 show how to combine scan information generated along different sides of an object. Each of FIGS. 60-63 shows the object detection in a 19×19 pixel scan area, generated by a proximity sensor bar placed along one side of the object. Black squares indicate the location or position of the object within the scan area as detected by the proximity sensor bar, irrespective of the other scans, whereas the red squares indicate where the object is located when all four scan areas are aligned to a single, 2D area. These translations are needed when the 19×19 pixel scan areas for each scan are not aligned with one another. Although FIGS. 60-63 show a 19×19 pixel scan area, the size of the scan area depends on several factors, inter alia, the number of emitters, and the distance between emitters, on the proximity sensor bar.

Figure 64:
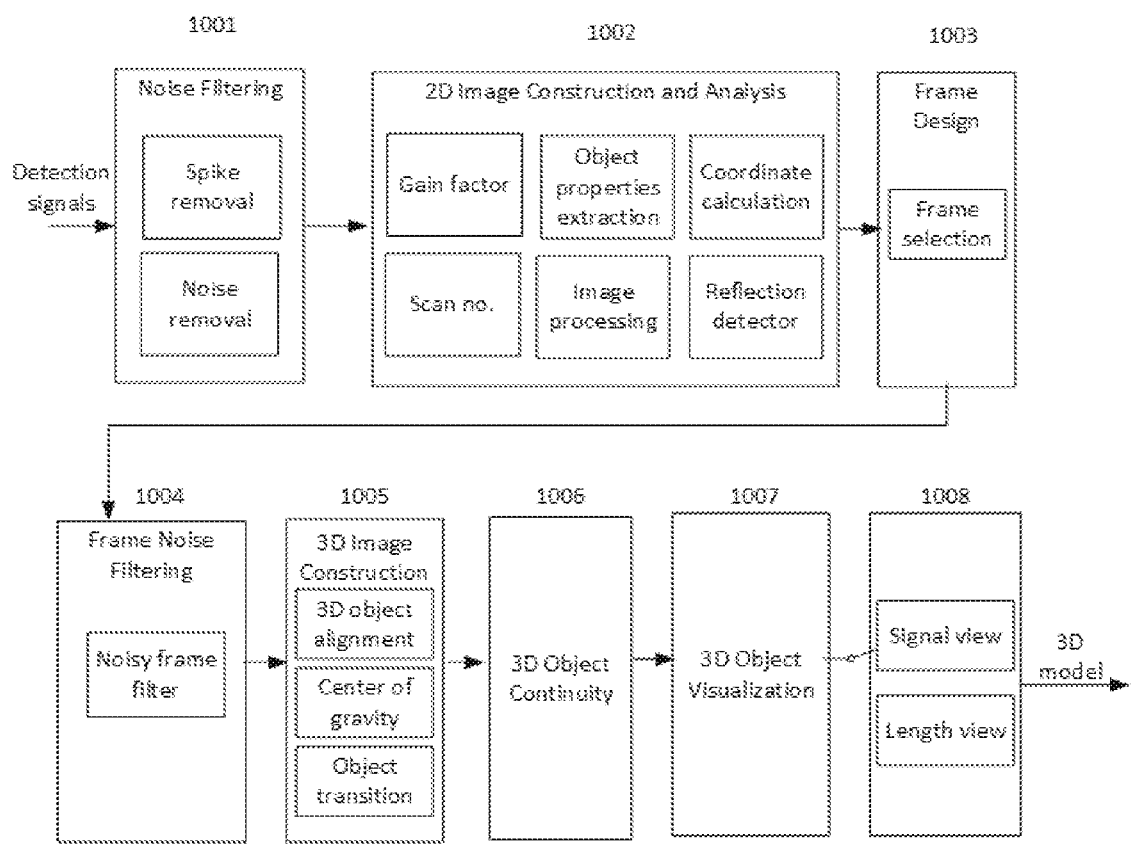
FIG. 64 is a simplified flow chart of a process for converting scan information into a 3D representation of a scanned object, in accordance with an embodiment of the present invention.

Reference is made to FIG. 64 which is a simplified chart of a process for converting scan information into a 3D representation of a scanned object, in accordance with an embodiment of the present invention. Steps 1001-1008 convert detection signals from a proximity sensor bar to a 3D image of a scanned object. Step 1001 ("Noise Filtering") shows processing done at the signal level, e.g., spike removal and noise removal. Step 1002 ("2D Image Construction and Analysis") is where the signals from one scan of the proximity sensor are transformed into the 2D domain. This typically involves the steps of applying a gain factor or otherwise normalizing the signals ("gain factor"), indexing each scan output according to the location of the proximity sensor during the scan for the later step of combining multiple scans into a 2D frame ("scan no."), removing signals associated with respective hotspots where the signals were not generated by a reflective object at the hotspot location ("reflection detector"), edge detection ("image processing"), calculating 2D coordinates of the object's edges in the detection plane ("coordinate calculation") and extracting various object properties, inter alia, object size, object coordinates in the proximity sensor scan plane and which of the proximity sensor emitter-detector pairs detect the object.

At step 1003 ("Frame Design") multiple 2D images of step 1002 captured when the proximity sensor was placed at different locations around the object, but along the same 2D plane, are selected and indexed to facilitate combining them into a 2D image referred to as a "frame". Thus, a frame represents a slice of the object along a 2D plane. Different frames represent parallel slices of the object at different heights that can be combined into a 3D image of the object. When constructing a frame, it may become apparent that certain ones of the scans are problematic. For example, the reconstructed frame of a solid object should have a closed shape, but in one of the scans, the detected edge doesn't span the gap indicated by the neighboring scans on either side of that scan. In these cases, at step 1004 ("Frame Noise Filtering") the problematic scan information is either removed from the frame construction or the data in the problematic scan is filtered. Also at step 1004, noise arising from combining 2D information from different scans into a coherent frame is filtered out ("Noisy frame filtering").

At step 1005 multiple frames are combined to create a 3D image of the object ("3D Image Construction") as discussed hereinabove. This involves the steps of identifying the center of gravity of the object in each frame ("center of gravity") and using the center of gravity in adjacent frames to align those frames ("3D object alignment"). When the distance between the centers of gravity in adjacent frames is within a defined tolerance level, e.g., 5 mm, the frames are stacked with their centers of gravity aligned one above the other. When the distance between the centers of gravity in adjacent frames is above the defined tolerance, it is understood that the object is not perpendicular to the 2D planes of the frames and the adjacent frames are stacked accordingly. In certain cases, pixels from some reconstructed frames extend beyond the 3D domain. In such cases, these outlying pixels are translated to the nearest edge of the 3D domain ("Object transition"), as explained hereinbelow with reference to FIGS. 71-73.

At step 1006 the combined 3D image is filtered to smooth any discontinuities resulting from combining the different frames ("3D Object Continuity"). In some embodiments of the invention this is done by translating object pixels at both sides of a discontinuity so that they represent a single common location on the object. This reduces the size of the object.

At step 1007 lighting effects are added to the constructed 3D image for better visualization ("3D Object Visualization"). At step 1008, the system creates a 3D image from the combined 2D images. This 3D image uses the z-axis either to plot the height of the object ("length view"), or alternatively, to indicate the intensity of the detected signals at each mapped 2D coordinate ("signal view").

Figure 65:
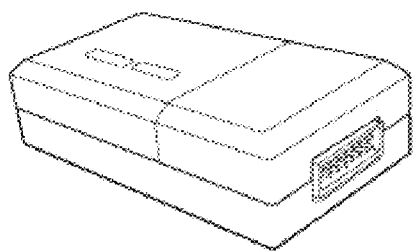
FIGS. 65-70 are illustrations of scanned objects and 3D images of those objects generated from proximity sensor detections, in accordance with an embodiment of the present invention.
Figure 65:
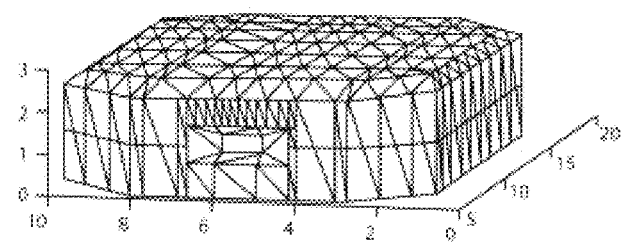

Reference is made to FIGS. 65-70, which are illustrations of a scanned object and a 3D image of the object generated from proximity sensor detections, in accordance with an embodiment of the present invention. FIG. 65 shows a scanned debugger unit on the left and the 3D image generated from the multiple scans thereof on the right.

Figure 66:
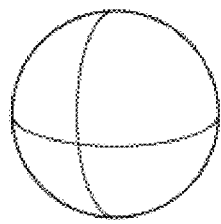
Figure 66:
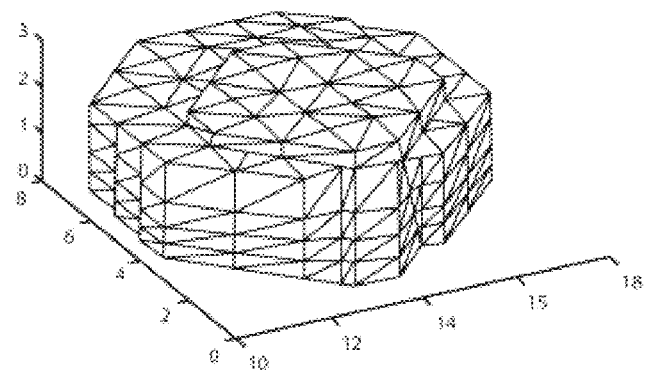

FIG. 66 shows a scanned ball on the left and the 3D image generated from the multiple scans thereof on the right.

Figure 67:
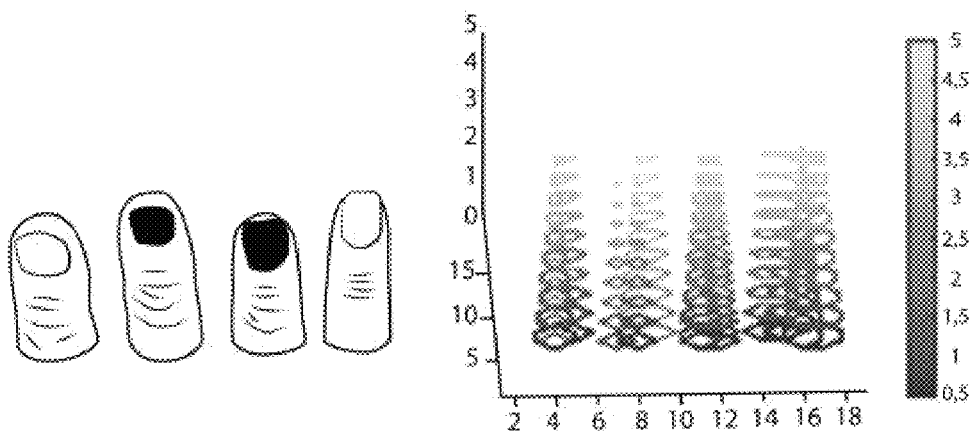

FIG. 67 shows a scanned arrangement of four prosthetic fingers on the left and the 3D image generated from the multiple scans thereof on the right. In the illustrated case of four fingers having different heights arranged in a row, the height of the object detected when the proximity sensor scans that side of the arrangement in which most of the fingers are in the shadow of another, only one height is detected, namely, the height of the tallest finger. When reconstructing the 3D image this height is used for all edges of the image. Therefore, in the 3D image on the right of FIG. 67 all four fingers have the same height. In some embodiments, although a single height is used for the entire reconstructed object, the height used is the average of the two tallest heights detected during the scanning.

Figure 68:
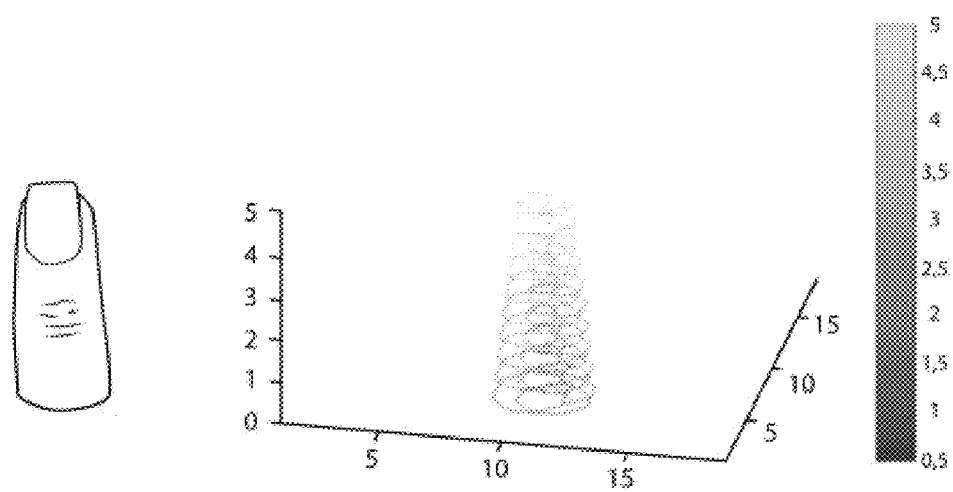

FIG. 68 shows a scanned prosthetic finger on the left and the 3D image generated from the multiple scans thereof on the right.

Figure 69:
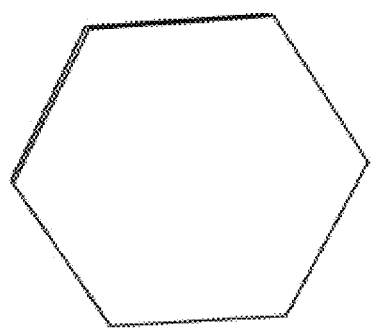
Figure 69:
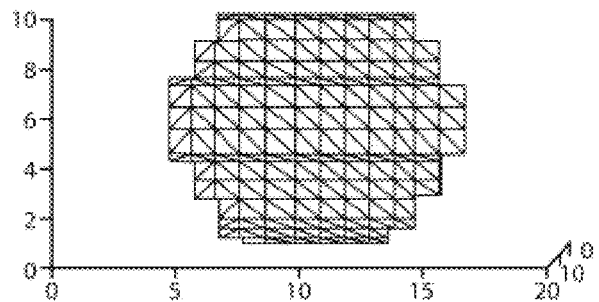

FIG. 69 shows a scanned upright, hexagon-shaped coaster on the left and the 3D image generated from the multiple scans thereof on the right.

Figure 70:
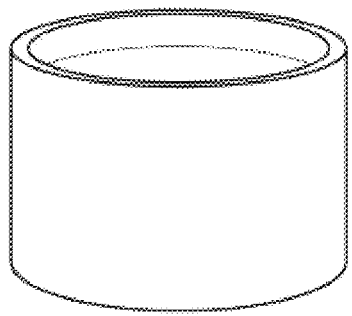
Figure 70:
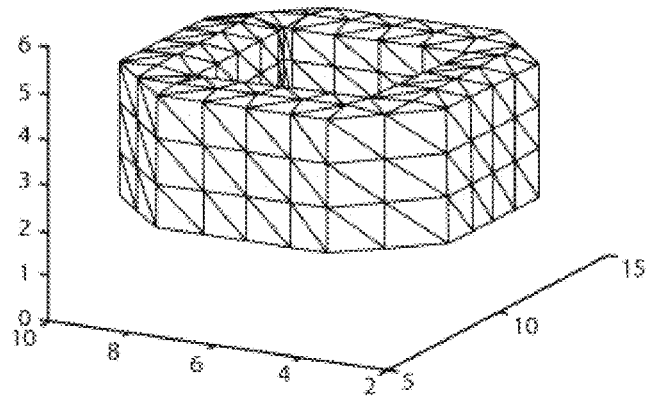

FIG. 70 shows a scanned roll of adhesive tape on the left and the 3D image generated from the multiple scans on the right.

In certain embodiments of the invention, only a limited amount of memory, e.g., a screen buffer, is available to store the entire reconstructed 3D model of the scanned object. During reconstruction, if a portion of the object juts out beyond the 3D domain, it is transferred to the nearest edge of the 3D domain. The following example clarifies this case.

Suppose the scanned object is shaped as an upside-down "L". The proximity sensor scans this object from all four sides at different heights from the bottom up. Each set of four scans at a single height is combined into a 2D slice of the object at the given height. These slices are combined from bottom to top, with the first slices of the object being mapped to the 3D domain. When the upper slices of the object are added to the model, outermost pixels on the roof of the upside-down "L" are outside the 3D domain. These pixels are translated to the nearest edge of the 3D domain. This is a dynamic process that is performed while adding the different 2D scans into a 3D model.

Figure 71:
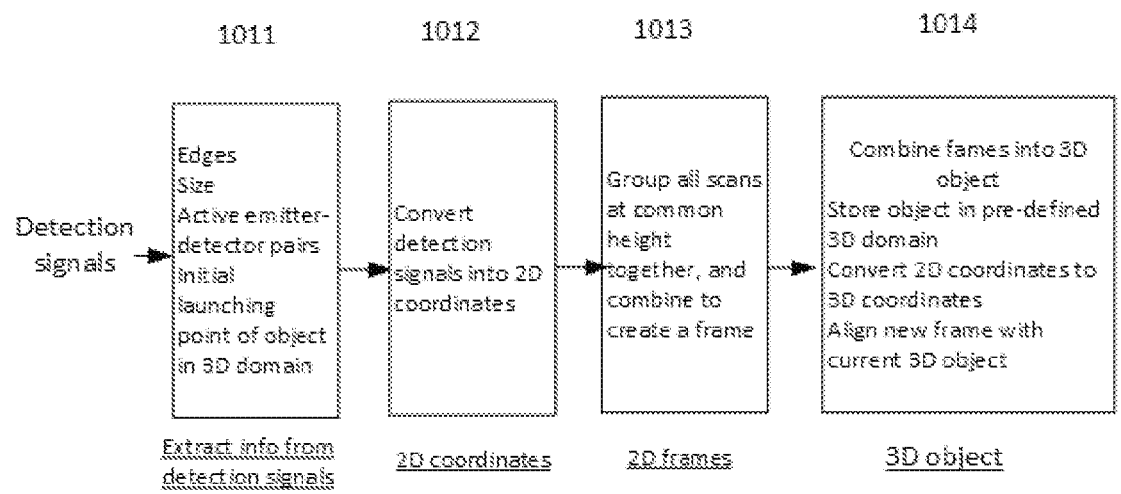
FIG. 71 is a simplified flow chart of a process for converting scan information into a 3D representation of a scanned object, in accordance with an embodiment of the present invention.

Reference is made to FIG. 71, which is a simplified flow chart of a process for converting scan information into a 3D representation of a scanned object, in accordance with an embodiment of the present invention. The process of FIG. 71 combines multiple 2D scan information into a 3D model of the object. At step 1011 all scan information from all scans made is analyzed to identify object edges in the scan information; determine the size of the object; determine an initial launching point of the object in the 3D domain, based on the object's size; and, in each scan, identify the active emitter-detector pairs that detected the object. This last parameter is used to determine if the proximity sensor bar was shifted during scanning. At step 1012 the detection signals are converted into 2D coordinates. At step 1013 a slice of the object is created by combining 2D scans taken by the proximity sensor from four sides of the object at a common height. This slice is also called a "frame". At this stage the system connects the edges identified in the different 2D scans to form a closed shape, and also calculates the center of gravity of that shape.

At step 1014 the process combines the frames of step 1013 into a 3D object. This process involves copying each successive frame into a pre-allocated memory beginning at the initial launching point calculated at step 1011 and ensuring that the object edges in neighboring frames are connected. In some embodiments, the degree of alignment between the center of gravity of each newly added frame and the center of gravity of the current 3D object is measured. Misalignment up to a threshold is assumed to arise from an actual variation in the contour of the object, but a large misalignment is assumed to arise due to errors that occurred when the scans were performed. In this latter case, the new frame is translated so that its center of gravity is aligned with the center of gravity of the 3D object. At step 1014 the system checks if, after adding each new frame to the 3D object, any of the pixels in the new frame extend outside the 3D domain. If they do, those pixels are moved to the nearest edge of the 3D domain, thereby essentially shrinking the object. At step 1014 the system converts the 2D coordinates of the object to 3D coordinates.

Figure 72:
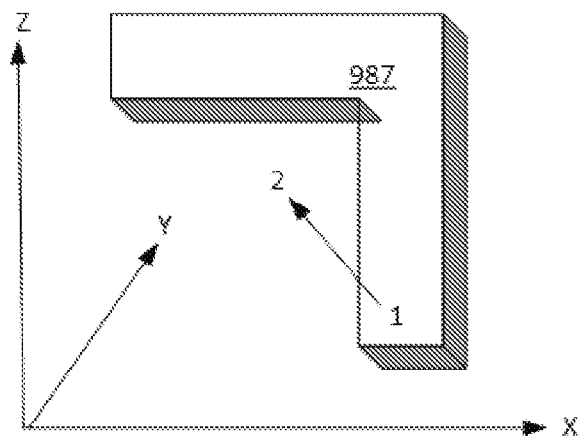
FIG. 72 is an illustration showing translating an object's bounding box within a shared detection plane, in accordance with an embodiment of the present invention.

Reference is made to FIG. 72, which is an illustration showing translating an object's bounding box within a shared detection plane, in accordance with an embodiment of the present invention. FIG. 72 shows 3D model 987 of a scanned elbow-shaped object. FIG. 72 shows a first center of gravity 1 of the object's bounding box when only some of the lower frames of the object have been added to the 3D model. FIG. 72 also shows a second center of gravity 2 of the object's bounding box when the entire object is included in the 3D model.

Figure 73:
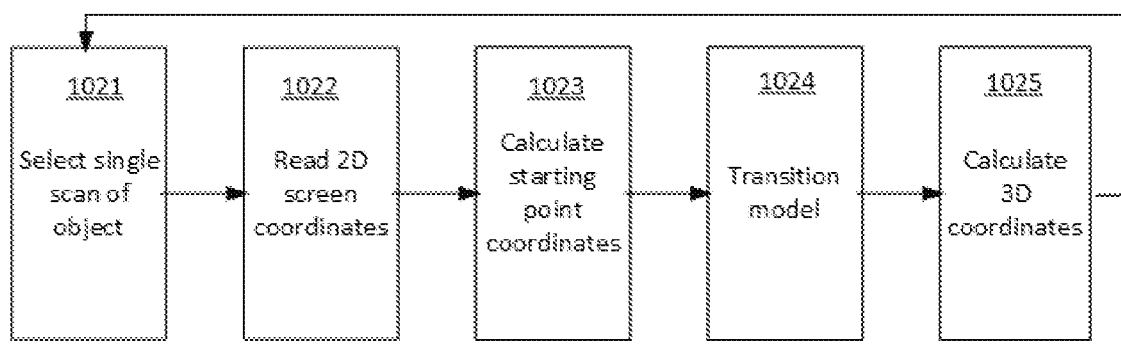
FIG. 73 is a simplified flow chart for a method of generating a 3D image of a scanned object, by combining detections of a proximity sensor placed at locations around the object, and at different heights in relation to the object, in accordance with an embodiment of the present invention.

Reference is made to FIG. 73, which is a flow chart for a method of generating a 3D image of a scanned object, by combining detections of a proximity sensor placed at locations around the object, and at different heights in relation to the object, in accordance with an embodiment of the present invention. The flowchart shows how scan information from scans of the proximity sensor at different locations are combined into a frame. The process begins after multiple scans of the object have been performed, each scan being stored and indexed based on the proximity sensor location with respect to the object during the scan. At step 1021 one set of scan information is selected. At step 1022, the 2D coordinates of the object are read from the selected scan information, and at step 1023 an outermost coordinate is selected as a starting point. The series of concatenated edge coordinates is read from the selected scan information, and each coordinate is transformed, at step 1025, to a common 3D space based on a transition model (step 1024). This continues until the end of the object edge in the selected scan information is reached. The process loops back to step 1021 to select the next set of scan information, namely, scan information related to the object edge adjacent to the final coordinate from the previous scan. At step 1023, an outermost first pixel in this new set of scan information is mapped onto the same location as the final pixel of the previous scan information. After all four edge scans have been processed in this way the system calculates the center of gravity of the object slice in the 2D frame and compares it to the centers of gravity of the object's previous frames. The expectation is that for an upright object these centers of gravity are aligned, and for a tilted or curved object, these centers of gravity are not aligned. In some embodiments, when the centers of gravity of multiple consecutive frames are non-aligned, the system calculates a slope of the object based on the series of non-aligned frames and translates the coordinates of those frames according to that slope, on the assumption that the object is tilted or curved as indicated by the non-aligned centers of gravity. When within a few consecutive frames the centers of gravity do not indicate a consistent slope, e.g., the center of gravity of frames N+1 and N+2 is not aligned with that of frame N, and the center of gravity of frame N+3 is aligned with that of frame N, the method translates the coordinates of frames N+1 and N+2 to align their centers of gravity with those of frames N and N+3, under the assumption that the non-alignment resulted from a lack of precision in placement of the sensor bar during scanning.

Next, the system retrieves the scan information for the next frame, namely, four scans taken at an incrementally higher height than the previous scan. This process repeats until all of the scan information has been transformed to the shared 3D domain.

Figure 74:
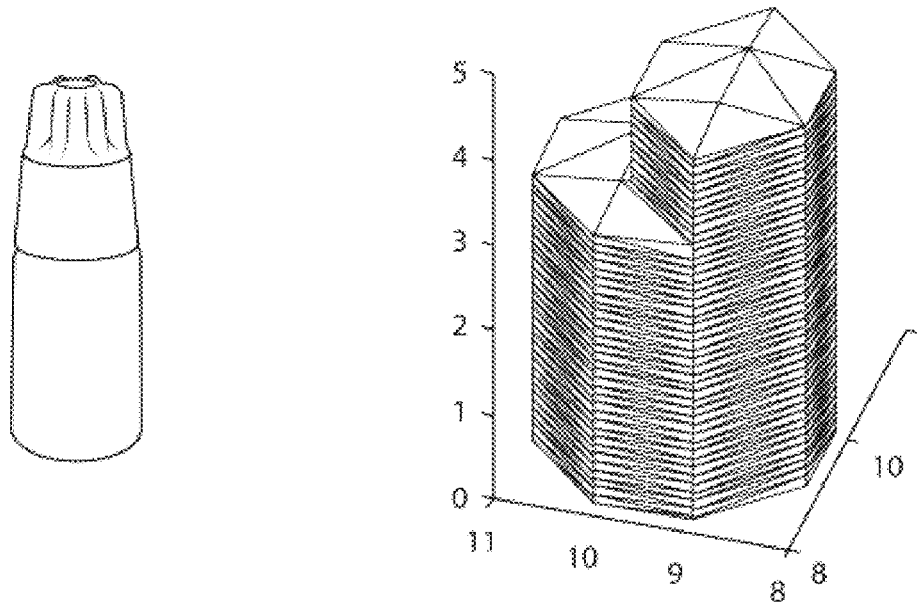
FIGS. 74 and 75 are illustrations of scanned objects and 3D images of those object generated from proximity sensor detections, in accordance with an embodiment of the present invention.
Figure 75:
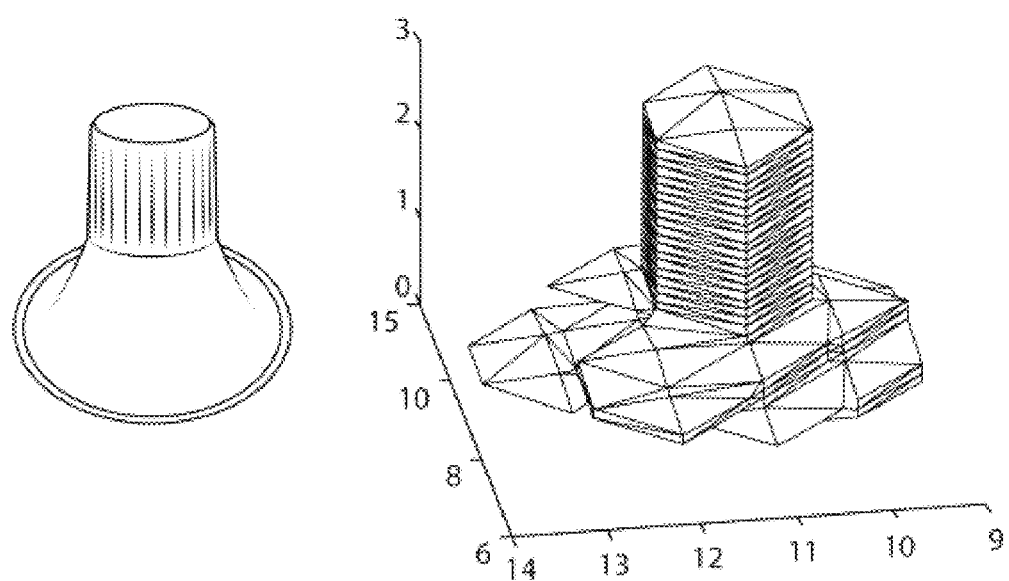

Reference is made to FIGS. 74 and 75, which are illustrations of scanned objects and 3D images of those objects generated from proximity sensor detections, in accordance with an embodiment of the present invention. FIGS. 74 and 75 each show a scanned tapered object on the left and the 3D image generated from the multiple scans on the right.

Figure 76:
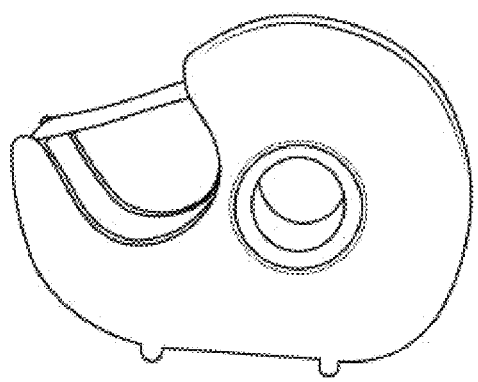
FIG. 76 is an illustration of a scanned scotch tape dispenser and the heights of that dispenser detected on four sides thereof, in accordance with an embodiment of the present invention.
Figure 76:
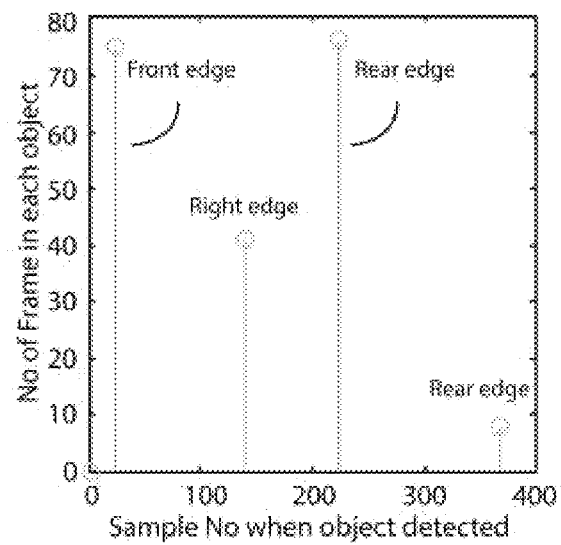

Reference is made to FIG. 76, which is an illustration of a scanned scotch tape dispenser and the heights of that dispenser detected on four sides thereof, in accordance with an embodiment of the present invention. FIG. 76 shows a tape dispenser that is scanned by a proximity sensor placed at locations around the dispenser's perimeter at multiple heights. The graph on the right shows four lines, each representing different heights at which the object is detected along one edge of the tape dispenser. The height of the dispenser detected along the two long edges—front and rear—of the dispenser is greater than the height detected along the narrow—left and right—edges of the dispenser. This is due to tapering at the left and right edges of the dispenser, which can be seen in the figure.

Figure 77:
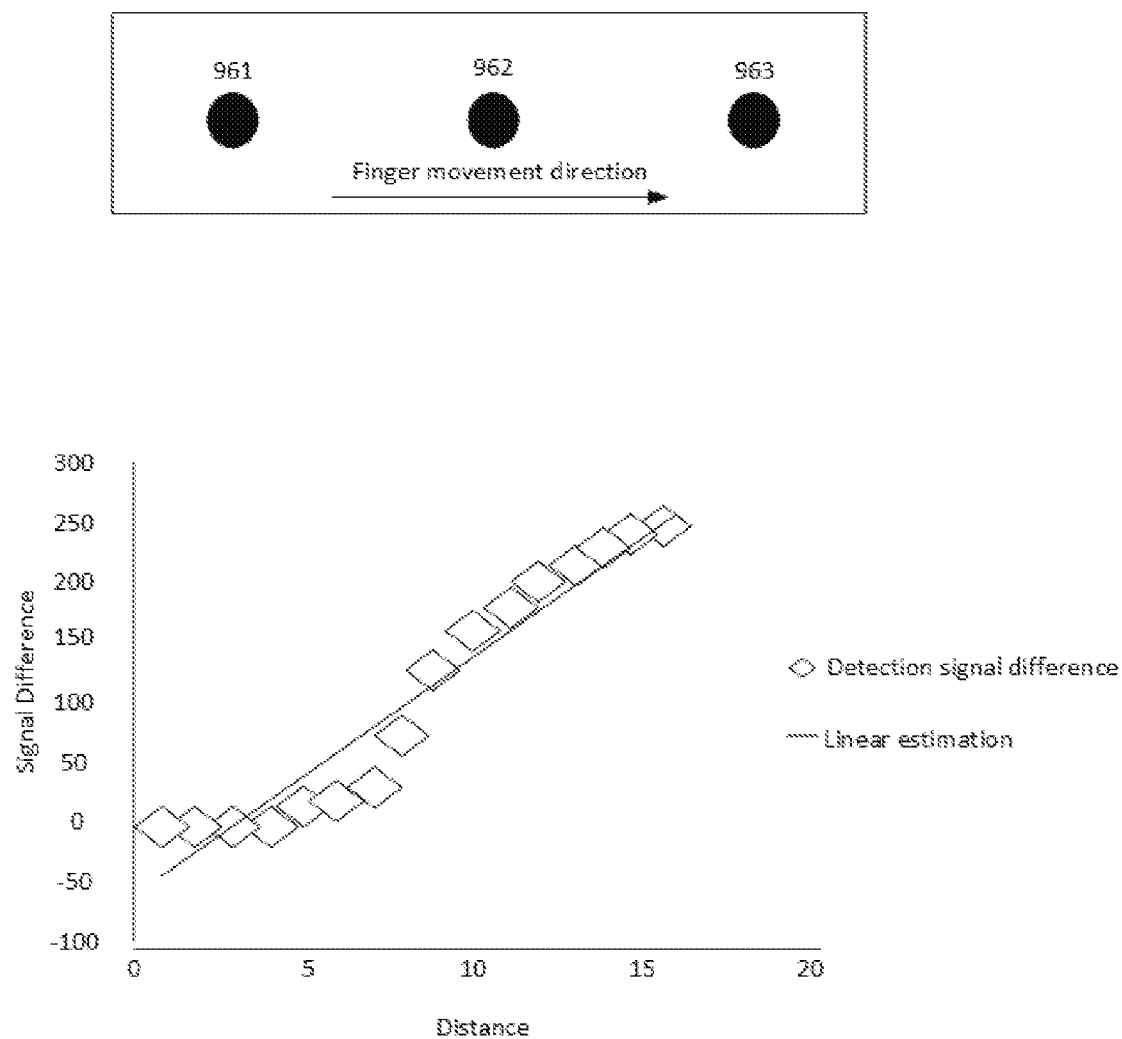
FIGS. 77 and 78 are illustrations of signal behavior as a fingertip moves between hotspots, in accordance with an embodiment of the present invention.
Figure 78:
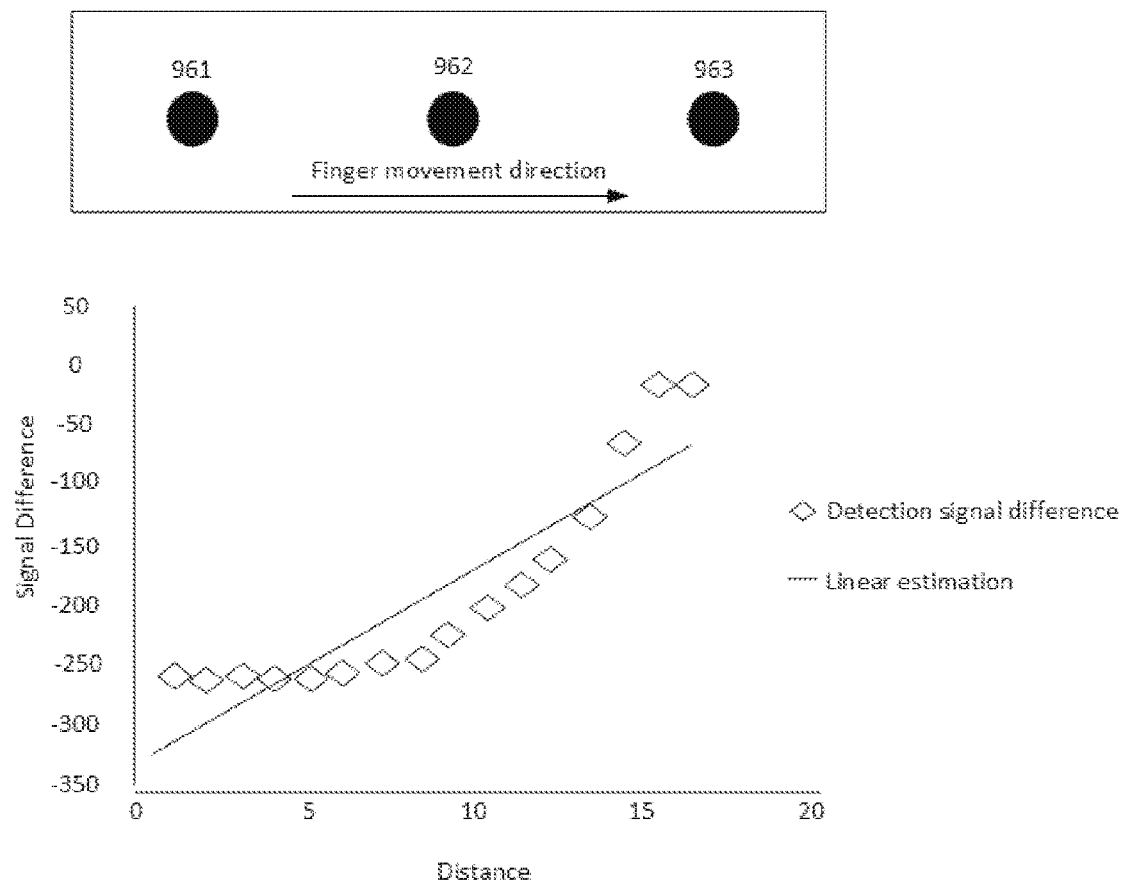

As discussed hereinabove with respect to FIG. 23, sub-pixel calculation increases the resolution of a detected object's size and position. Reference is made to FIGS. 77 and 78, which are illustrations of signal behavior as a fingertip moves between hotspots, in accordance with an embodiment of the present invention. FIG. 77 shows signal behavior when an object moves away from a hotspot, and FIG. 78 shows signal behavior when an object moves towards a hotspot. FIGS. 77 and 78 show three neighboring hotspots 961-963 between which the fingertip moves. The fingertip spans two hotspot locations. At the beginning of the movement tracked in FIGS. 77 and 78 the fingertip is fully detected at hotspots 961 and 962 and is not detected at all at hotspot 963; at the end of the tracked movement the fingertip is fully detected at hotspots 962 and 963 and is not detected at all at hotspot 961. FIG. 77 is a graph that tracks the differences between detection signals of hotspots 962 and 961 as the fingertip moves, i.e., the y-axis shows the value $$\text{Signal difference} = \text{detection\_signal}_{962} - \text{detection\_signal}_{961}$$

Thus, at the beginning of the tracked movement the fingertip is fully detected at both hotspots 961 and 962, and the difference between them is 0. As the fingertip moves toward hotspot 963 it remains fully detected at hotspot 962 and detection at hotspot 961 is gradually reduced. The detection values are 8-bit values.

FIG. 78 is a graph that tracks the differences between detection signals of hotspots 963 and 962 as the fingertip moves, i.e., the y-axis shows the value $$\text{Signal difference} = \text{detection\_signal}_{963} - \text{detection\_signal}_{962}$$

Thus, at the beginning of the tracked movement the fingertip is not detected at hotspot 963 but is fully detected at hotspot 962, and the difference is −255. As the fingertip moves toward hotspot 963 it remains fully detected at hotspot 962 and detection at hotspot 963 gradually increases.

Although the signal plots in FIGS. 77 and 78 are not linear as a function of distance from the hotspot, a linear calculation provides a close estimate as illustrated by the line in each graph marked "Linear estimation".

Figure 79:
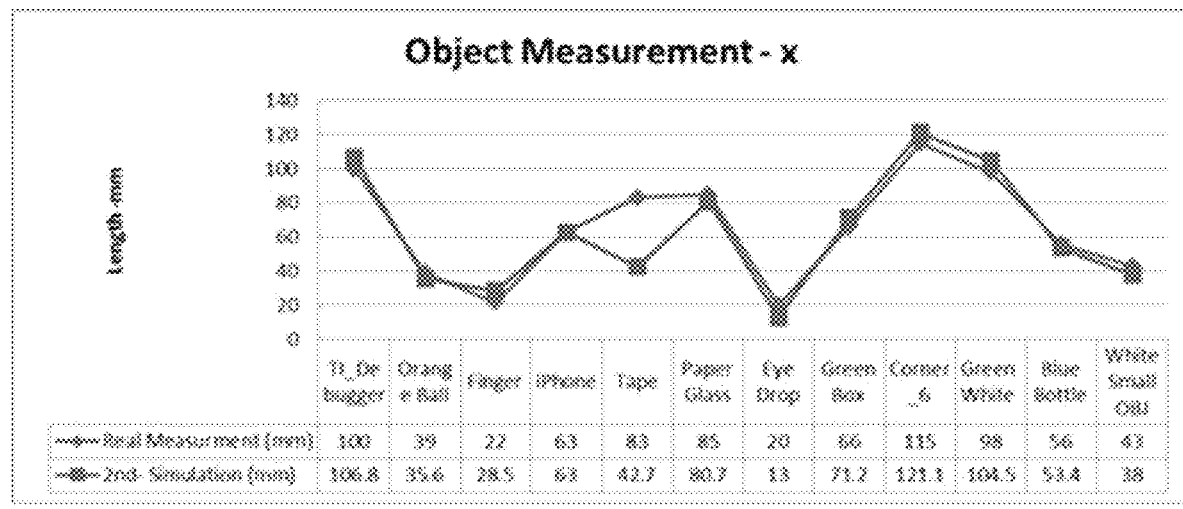
FIGS. 79-81 are illustrations showing measurement of errors by a proximity sensor, for a plurality of different objects, in accordance with an embodiment of the present invention.
Figure 80:
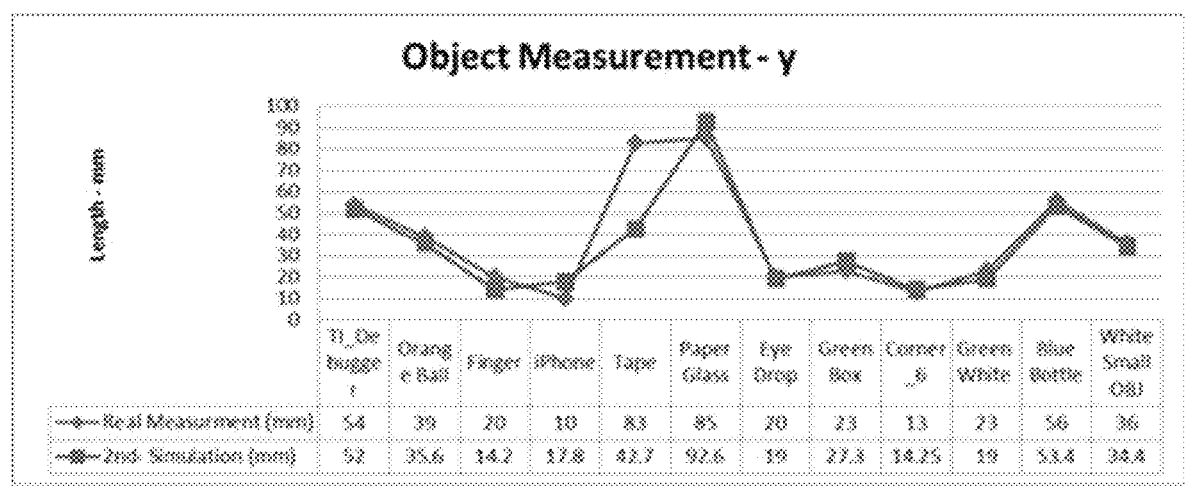
Figure 81:
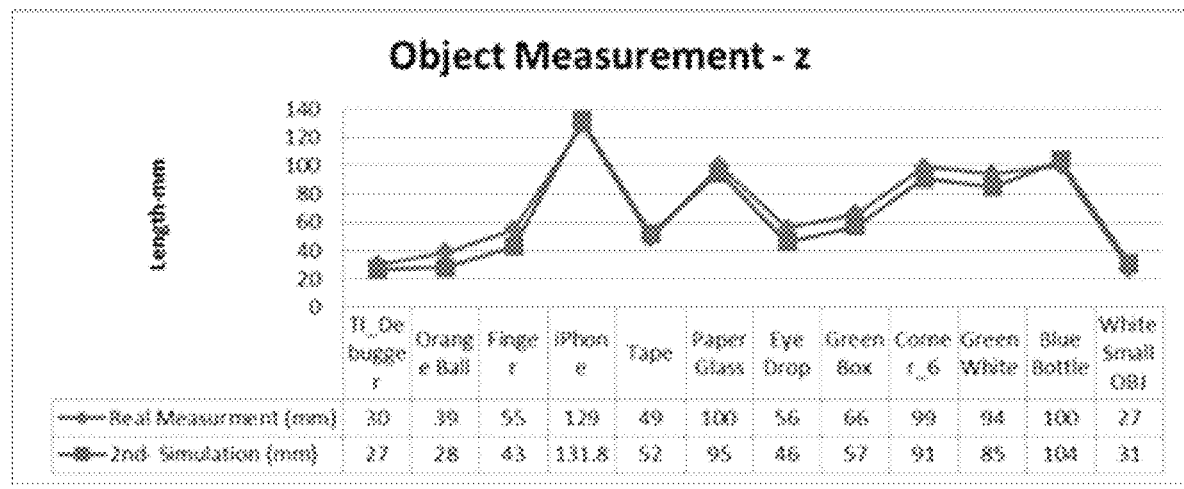

FIGS. 79-81 are illustrations showing measurement of errors by a proximity sensor, for a plurality of different objects, in accordance with an embodiment of the present invention. FIGS. 79-81 show the difference between object size measured by a proximity sensor and the actual object size, for a plurality of different objects. FIGS. 79-81 demonstrate the accuracy of using a linear model for sub-pixel calculations. FIGS. 79-81 compare (i) the sizes of various objects measured by a proximity sensor of the present invention using linear interpolation with (ii) the object's actual size. FIG. 79 shows calculated lengths (x-axis) for many objects and the corresponding actual lengths of the objects. For all objects except the tape shown in FIG. 70 the calculated length matched the actual length. The tape shown in FIG. 70 has a glossy surface curved along the x-axis, which disturbs the reflection signals compared to reflections off a non-glossy object. This is why the calculated length was not accurate. FIG. 80 shows calculated widths (y-axis) for many objects and the corresponding actual widths of the objects. For all objects except the tape shown in FIG. 70 the calculated width matched the actual width. In this case too, the highly reflective surface, curved along the y-axis caused an incorrect width calculation. FIG. 81 shows calculated heights (z-axis) for many objects and the corresponding actual heights of the objects. For all objects the calculated height matched the actual height. Although the tape shown in FIG. 70 is glossy, it is not curved in the z-axis and therefore the height calculation is not distorted.

Figure 82:
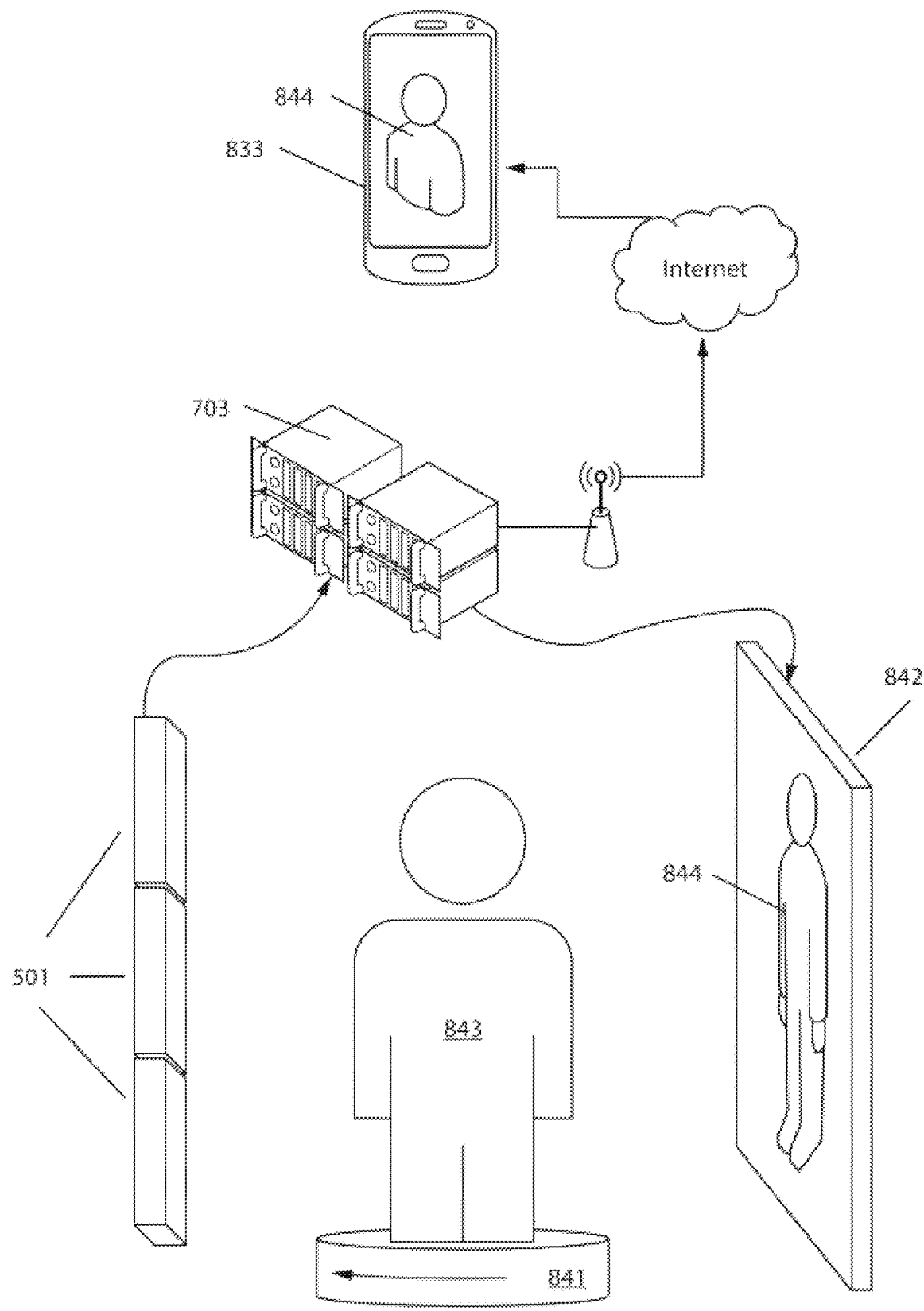
FIG. 82 is a simplified illustration of a system for scanning a human body for use in retail clothing applications and for generating avatars used in social media apps and in games, in accordance with an embodiment of the present invention.

Reference is made to FIG. 82, which is a simplified illustration of a system for scanning a human body for use in retail clothing applications and for generating avatars used in social media apps and in games, in accordance with an embodiment of the present invention. The system includes an array of proximity sensor bars 501 arranged along a rotating platform 841 on which a user 843 stands. As platform 841 is rotated, proximity sensor bars 501 capture repeated scans of the person, which are transmitted to server 703 which converts the scan data into a 3D model as explained hereinabove. In some embodiments, certain key measurements are extracted from the scan information, e.g., height, shoulder span, waist size, arm length, inner leg length. In retail applications, the 3D model or the extracted key measurements are used by server 703 to search a clothing inventory and find clothes that fit the scanned model. In some embodiments of the invention, this scanning system is installed in a store dressing room together with a display 842 on which the scanned model is displayed as avatar 844 outfitted in the clothes returned by the search. The user then shops for the clothes on display 842. In certain embodiments of the invention, display 842 is a one-way mirror. In gaming and social media applications, the 3D model or the extracted key measurements are used to create a personalized avatar 844 that the user downloads to his or her phone 833 for use in gaming and social media apps.

Figure 83:
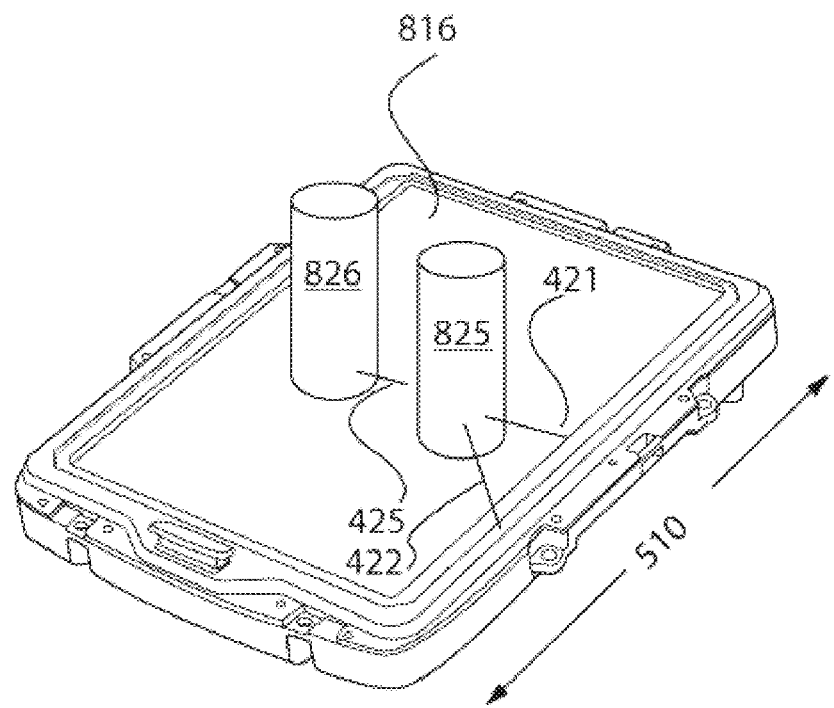
FIG. 83 is an illustration showing a situation in which a second object in a proximity sensor detection plane is not detected.

Reference is made to FIG. 83, which is an illustration showing a situation in which a second object in a proximity sensor detection plane is not detected. FIG. 83 shows a scenario in which two reflective objects 825 and 826 are in the detection plane of proximity sensor bar 510, but because the two objects are aligned along the path of the emitter beams illustrated by beam 421, object 826 farther from proximity sensor bar 510 is not detected. FIG. 83 shows emitter beam 421 and reflection 422 off object 825. Emitter beam 421 would have to extend 425 beyond object 825 in order to encounter object 826.

Figure 84:
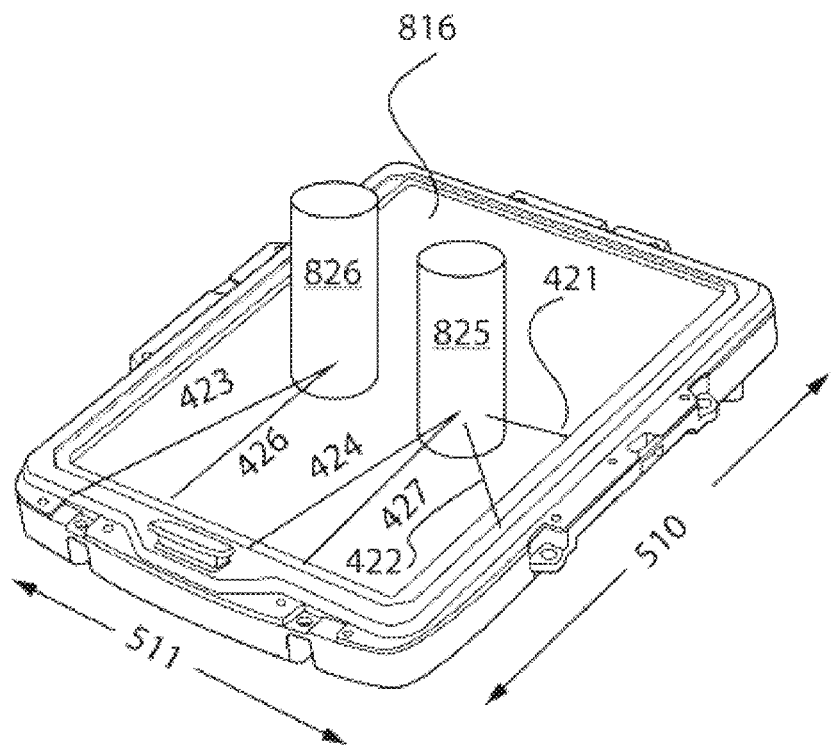
FIG. 84 is an illustration showing how two proximity sensor bars along different edges of a detection plane are used to solve the problem of FIG. 83, in accordance with an embodiment of the present invention.

Reference is made to FIG. 84, which is an illustration showing how two proximity sensor bars along different edges of a detection plane are used to solve the problem of FIG. 83, in accordance with an embodiment of the present invention. FIG. 84 shows how a second proximity sensor bar 511 placed along a second edge of the detection plane solves the problem of FIG. 83. The two objects 825 and 826 reflect different emitter beams 427 and 426 and both objects are detected. Although FIG. 84 shows proximity sensor bars 510 and 511 placed along adjacent edges of screen 816, in other embodiments the two proximity sensor bars are placed along opposite edges of screen 816, along three edges or along all four edges.

Figure 85:
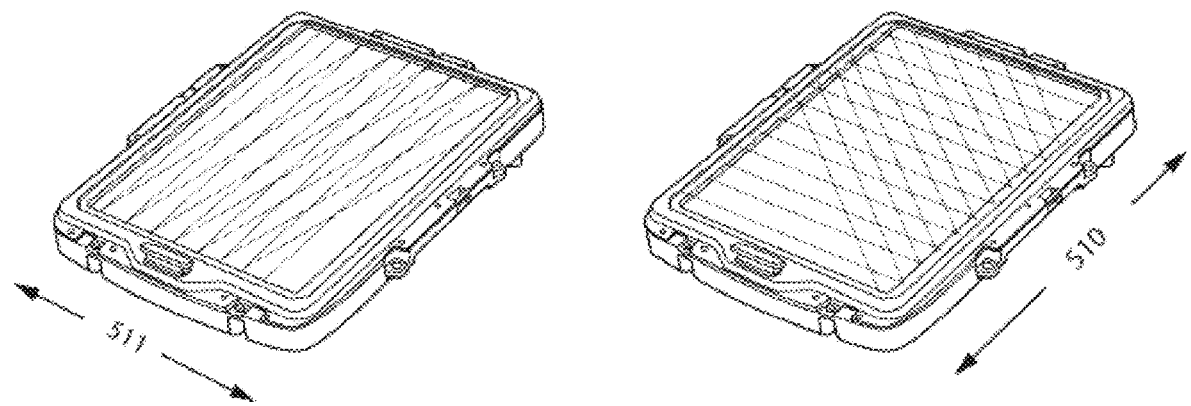
FIG. 85 is a simplified illustration showing some of the projected and reflected light paths used by the two proximity sensor bars of FIG. 84 along different edges of the detection plane, in accordance with an embodiment of the present invention.

Reference is made to FIG. 85, which is a simplified illustration showing some of the projected and reflected light paths used by the two proximity sensor bars of FIG. 84 along different edges of the detection plane, in accordance with an embodiment of the present invention. FIG. 85 shows the emitter beams and paths of maximum detected reflections for proximity sensor bar 510 on the right, and for proximity sensor bar 511 on the left. Specifically, the lines perpendicular to the screen edge from which they exit represent the emitters beam paths, and the lines tilted in relation to that screen edge represent paths of maximum detected reflections. Only the set of forward maximum detected reflection paths is shown in order not to clutter the figure. Because the detection area is rectangular, the paths of maximum detected reflections are at different angles in relation to each proximity sensor, as each sensor is designed to maximize the number of hotspots in the screen area and distribute those hotspots as evenly as possible within the screen area.

Figure 86:
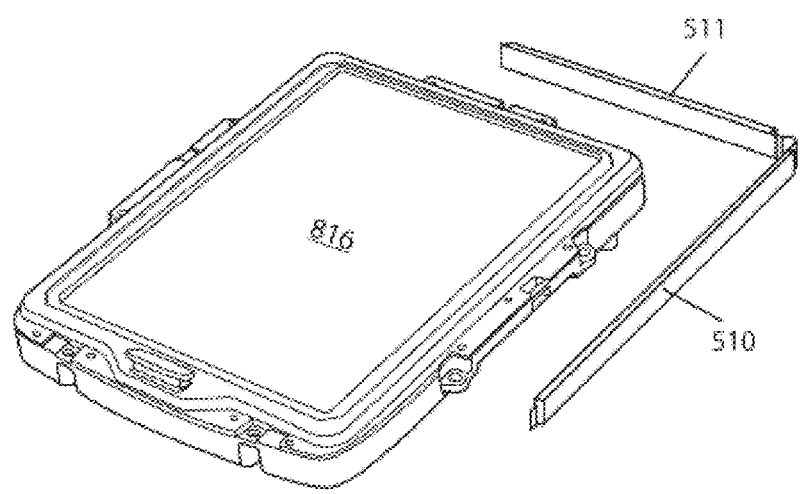
FIG. 86 is a simplified illustration of a touch screen and an L-shaped proximity sensor bar for placement along adjacent edges the screen, in accordance with an embodiment of the present invention.

Reference is made to FIG. 86, which is a simplified illustration showing a touch screen and two proximity sensor bars for placement along adjacent edges thereof, in accordance with an embodiment of the present invention. FIG. 86 shows how proximity sensor bars 510 and 511 are added to screen 816. In some embodiments, screen 816 is an electronic paper display and in other embodiments it is not a display but rather an input surface such as a touch pad with or without icons printed thereon.

Figure 87:
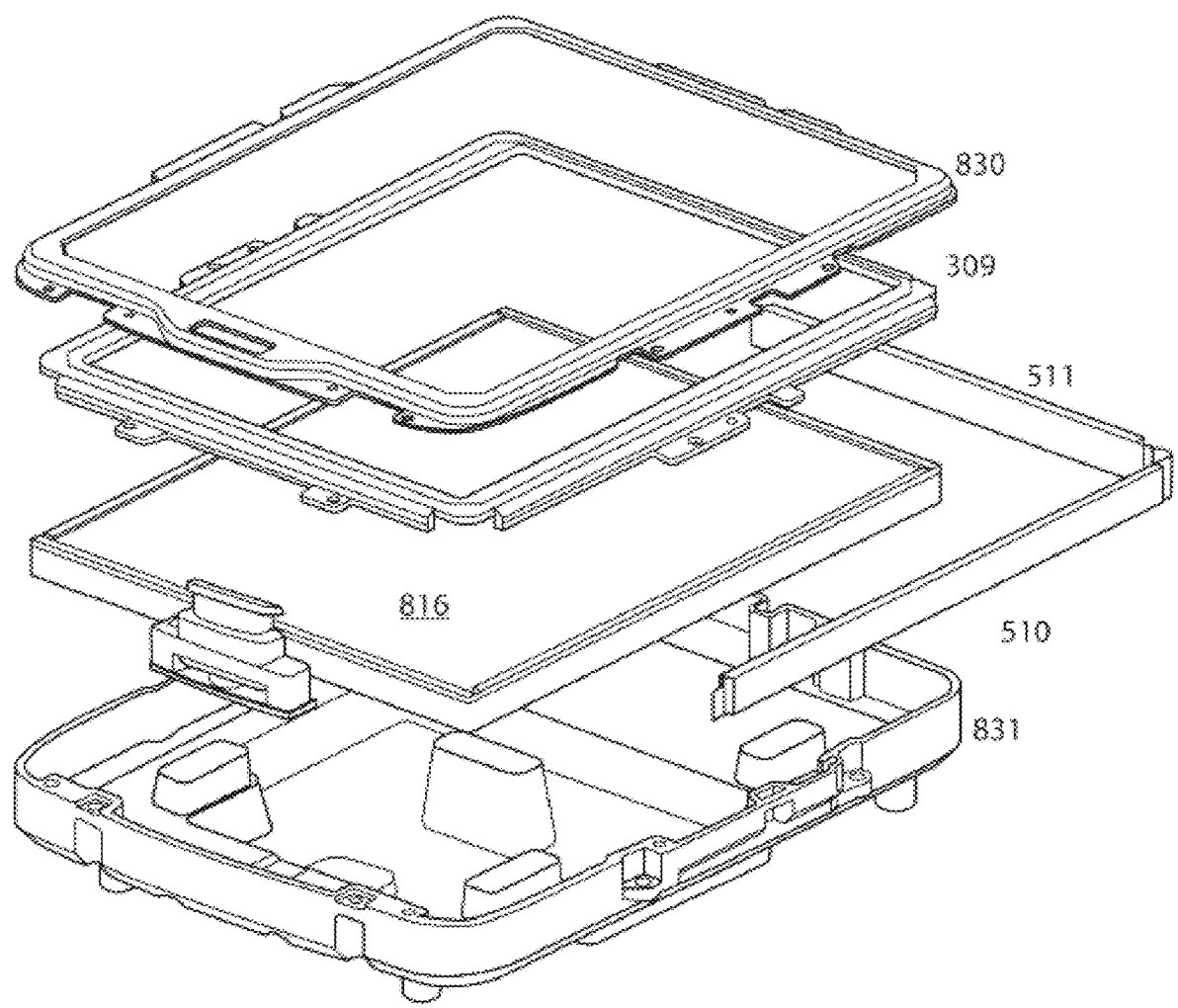
FIG. 87 is an exploded view of a touch screen assembly featuring an L-shaped proximity sensor bar along adjacent edges of the screen, in accordance with an embodiment of the present invention.

Reference is made to FIG. 87, which is an exploded view of a touch screen assembly featuring two proximity sensor bars 510 and 511 along adjacent edges of the screen, in accordance with an embodiment of the present invention. FIG. 87 shows top cover 830 and bottom cover 831, display screen 816, proximity senor bars 510 and 511 and light guide 309. Light guide 309 directs light beams from proximity senor bars 510 and 511 over and across the exposed upper surface of display screen 816 and similarly directs reflections of those beams by objects touching the display screen back onto proximity senor bars 510 and 511. In some embodiments, one shared processor synchronizes activations of the emitters and detectors of both proximity senor bars 510 and 511.

Figure 88:
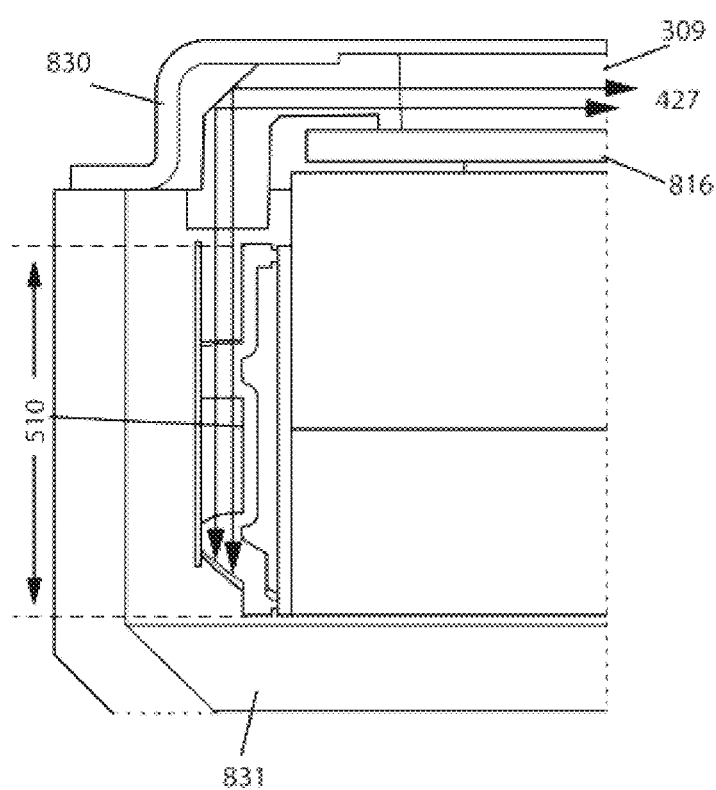
FIG. 88 is a cutaway view of the touch screen assembly of FIG. 87, showing paths of projected and reflected light beams into and out of one of the proximity sensor bars, in accordance with an embodiment of the present invention.

Reference is made to FIG. 88, which is a cutaway view of the touch screen assembly of FIG. 87, showing paths of projected and reflected light beams into and out of one of the proximity sensor bars, in accordance with an embodiment of the present invention. FIG. 88 shows the paths of light beams 427 from proximity senor bar 510 through light guide 309 over and across the exposed upper surface of display screen 816.

Figure 89:
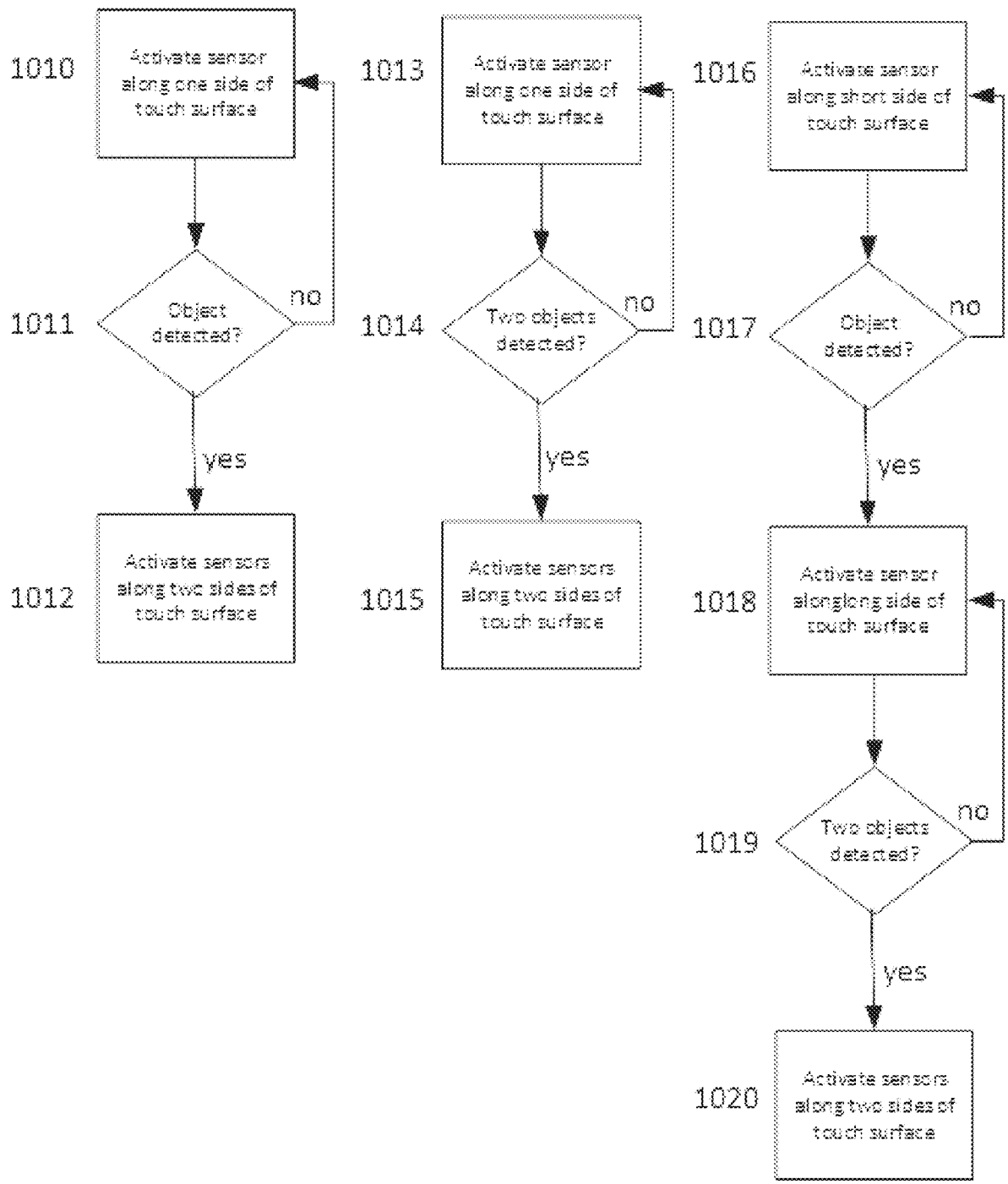
FIG. 89 shows three simplified flowcharts of methods of activating two proximity sensor bars along different edges of a touch surface, in accordance with an embodiment of the present invention.

Reference is made to FIG. 89, which shows three simplified flow charts of methods of activating two proximity sensor bars along different edges of a touch surface, in accordance with an embodiment of the present invention. FIG. 89 shows flowcharts of alternative activation schemes for proximity senor bars 510 and 511. Steps 1010-1012 describe a first scheme whereby only one of proximity senor bars 510 and 511 is activated until an object is detected, at which point both proximity senor bars are activated. Steps 1013-1015 describe a second scheme whereby only one of proximity senor bars 510 and 511 is activated until two objects are detected, at which point both proximity senor bars are activated. This second scheme uses less power than the first scheme when only one object is detected. In most cases in which two objects touch the screen the objects aren't aligned along an emitter beam path, so the second scheme waits until multiple objects are detected before activating the second proximity senor bar. Steps 1016-1020 describe a third scheme whereby only the shorter of proximity senor bars 510 and 511 is activated until one object is detected, at which point only the longer proximity senor bar is activated. The shorter proximity senor bar activates fewer components to scan the display area thereby reducing power consumption. However, the longer proximity senor bar has better resolution so it is activated to track the object. When the longer proximity senor bar detects two objects, both proximity senor bars are activated.

Figure 90:
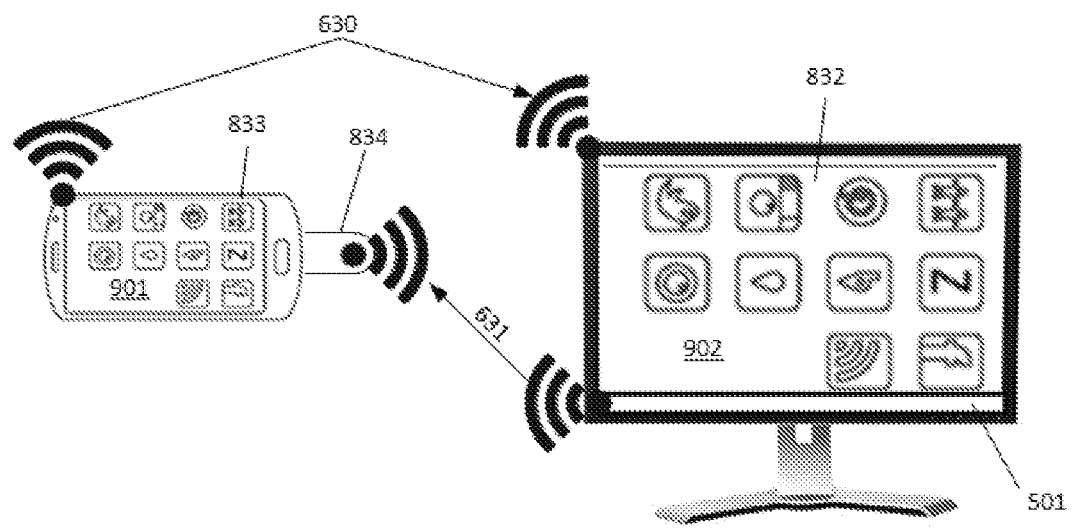
FIG. 90 is an illustration of a wireless input-output system, in accordance with an embodiment of the present invention.

Reference is made to FIG. 90, which is an illustration of a wireless input-output system, in accordance with an embodiment of the present invention. FIG. 90 shows smartphone 833 displaying GUI 901. The GUI is transmitted over a first wireless communication channel 630, e.g., using the Wi-Fi Direct standard used by Miracast-certified devices, to TV 832. Thus, an enlarged GUI 902 on TV 832 includes the same elements as GUI 901.

Figure 91:
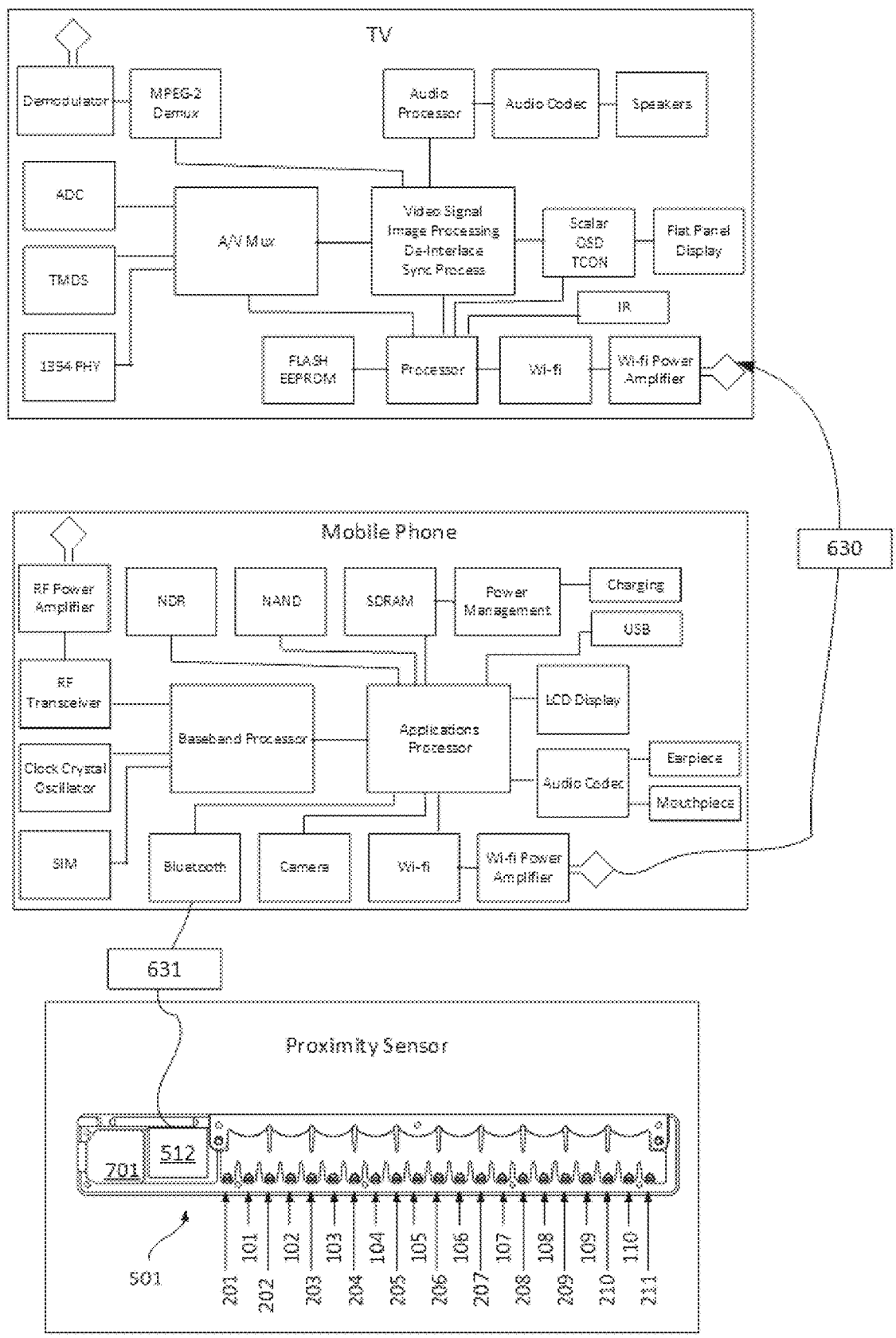
FIG. 91 is a simplified block diagram of a wireless input-output system featuring a mobile phone, a TV and a proximity sensor bar, in accordance with an embodiment of the present invention.

Proximity sensor bar 501 is positioned along the bottom edge of TV 832. This proximity sensor bar has been described hereinabove, inter alia, with reference to FIGS. 10-13. In some embodiments of the invention, proximity sensor bar 501 features a battery mounted in its housing that powers proximity sensor bar 501. The detection plane of this sensor bar is along the surface of TV 832 such that user gestures performed on GUI 902 are detected by proximity sensor bar 501. FIG. 91 shows wireless communications chip 512 mounted in proximity sensor bar 501. Wireless communications chip 512 sends the detected user gestures, and/or the coordinates of objects detected touching TV 832, to dongle 834 plugged into smartphone 833, over a second wireless communication channel 631, e.g., using the Bluetooth® wireless technology standard. BLUETOOTH is a registered trademark of Bluetooth SIG, Inc. Corporation. Dongle 834 transmits the gesture data to the smartphone's operating system. The smartphone's operating system responds to the gestures as if they were performed on smartphone 833. In this way, TV 832 serves as a remote input and output terminal for smartphone 833. In some embodiments of the invention mobile phone 833 includes an embedded communications chip for enabling wireless communication channel 631 and dongle 834 is not used.

Wireless channel 630 is enabled by communications chips in TV 832, or by an adapter that plugs into TV 832, e.g., via High-Definition Multimedia Interface (HDMI) or Universal Serial Bus (USB) ports on the TV. The described system with smartphone 833 and TV 832 is exemplary. In other embodiments of the invention smartphone 833 is replaced by a server, a laptop or a tablet. Similarly, in certain embodiments of the invention TV 832 is replaced by a projector or other display device. For example, when TV 832 is replaced by a projector, proximity sensor bar 501 is placed along an edge of the surface on which GUI 902 is projected to detect user interactions with that GUI.

In certain embodiments of the invention, a second proximity sensor bar is placed along a second edge of GUI 902, either adjacent to or opposite, the edge along which proximity sensor bar 501 is placed, as described hereinabove with reference to FIGS. 84-88. In this case, both proximity sensors use a single, shared wireless communications chip 512 to communicate with smartphone 833.

Reference is made to FIG. 91, which is a simplified block diagram of a wireless input-output system featuring a mobile phone, a TV and a proximity sensor bar, in accordance with an embodiment of the present invention. FIG. 91 shows the components in each of the units in the system of FIG. 90. TV 832 features multiple inputs, including Wi-Fi, and components for audio-visual processing and output. Smartphone 833, labeled "Mobile Phone" in FIG. 91, features an applications processor and a baseband processor, in addition to components that enable Bluetooth and Wi-Fi input and output. Proximity sensor 501 includes emitters 101-110, detectors 201-211, controller 701 for activating the emitters and detectors and extracting object location information from the detector outputs, and communications processor 512 for sending the extracted information to smartphone 833. Video data is streamed from smartphone 833 to TV 832 over Wi-Fi channel 630. Gesture input is detected by proximity sensor 501 and is transmitted to smartphone 833 over Bluetooth channel 631. The applications processor in smartphone 833 controls the video output in response to the detected gestures.

Figure 92:
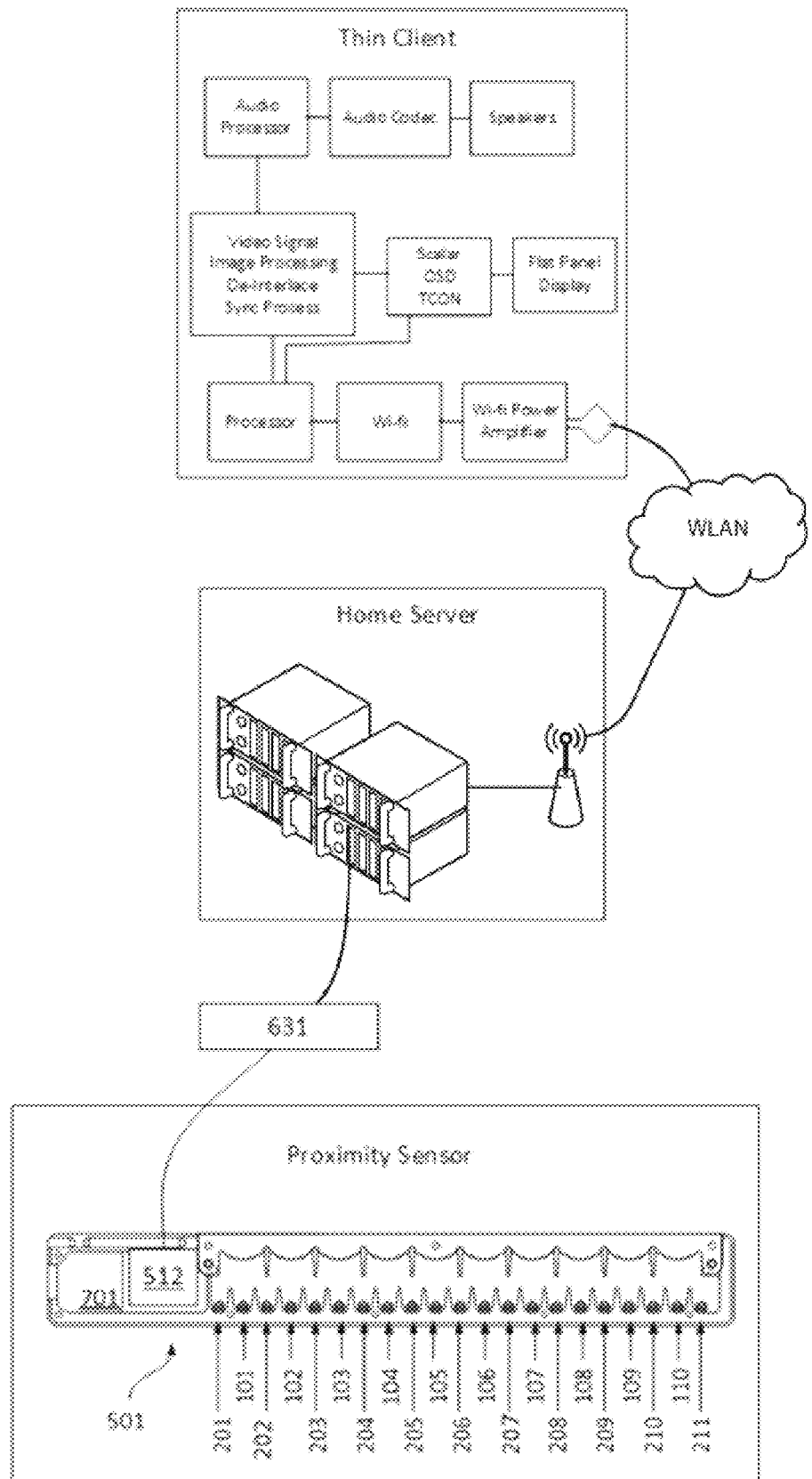
FIG. 92 is a simplified block diagram of a wireless input-output system featuring a server, a thin client and a proximity sensor bar, in accordance with an embodiment of the present invention.

Reference is made to FIG. 92, which is a simplified block diagram of a wireless input-output system featuring a server, a thin client and a proximity sensor bar, in accordance with an embodiment of the present invention. FIG. 92 shows another wireless input-output system in which smartphone 833 is replaced by a home server, and TV 832 is replaced by a thin client. Video and image data, including user interface screens, is streamed from the home server to the thin client over wireless LAN. Gesture input is detected by proximity sensor 501 and is transmitted to the home server over wireless channel 631. The home server controls the video and image output in response to the detected gestures.

Figure 93:
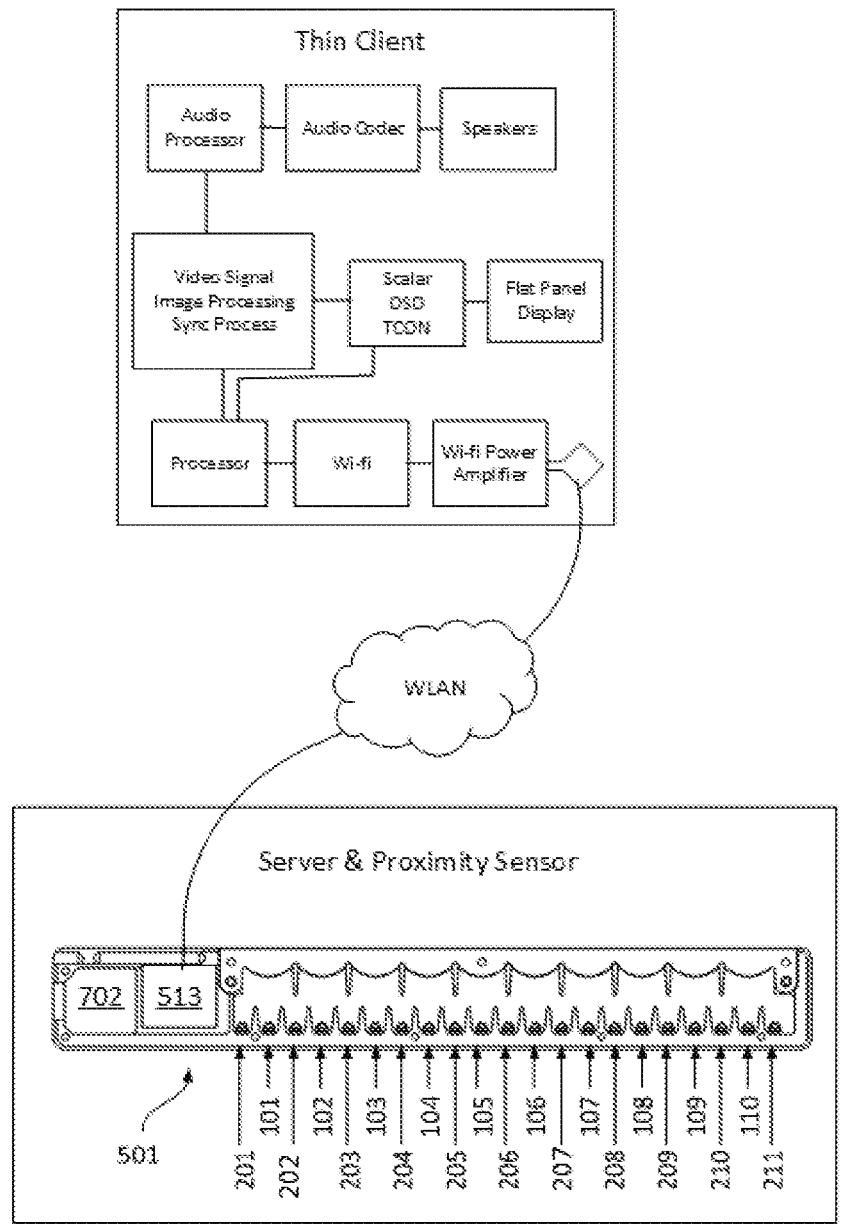
FIG. 93 is a simplified block diagram of a wireless input-output system featuring a thin client and a proximity sensor bar, in accordance with an embodiment of the present invention.

Reference is made to FIG. 93, which is a simplified block diagram of a wireless input-output system featuring a thin client and a proximity sensor bar, in accordance with an embodiment of the present invention. FIG. 93 shows a wireless input-output system similar to that of FIG. 92, except that the server of FIG. 92 is incorporated into the housing of proximity sensor 501. This provides a powerful, versatile unit that runs applications and generates data in response to gestures it detects. This unit streams graphic data to one or more thin clients over wireless LAN. The unit is compact, making it easy to travel with, and it is easy to connect to any display that supports wireless input. The user places the unit adjacent to the display to detect gestures on the display. Alternatively, the user can place the unit anywhere, e.g., in the user's lap, and detect gestures performed in the unit's detection plane to control the output on the display. The proximity sensors in the systems of FIGS. 90-92 can likewise be placed anywhere, e.g., in the user's lap, and detect gestures performed in the proximity sensor's detection plane to control the output on the TV or thin client as well.

Figure 94:
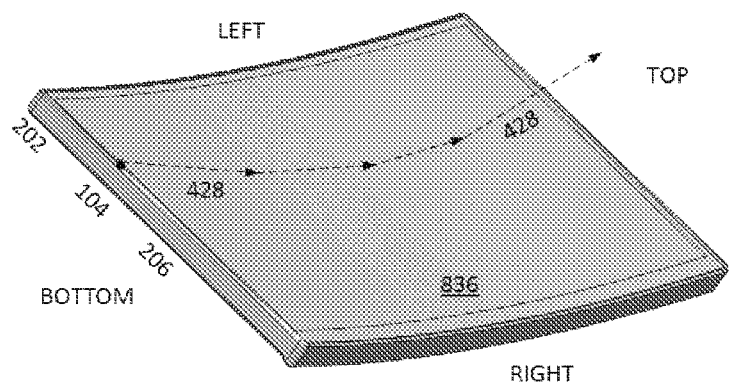
FIGS. 94 and 95 are simplified illustrations of a curved display and proximity sensing light-beams used to detect gestures thereon, in accordance with an embodiment of the present invention.
Figure 95:
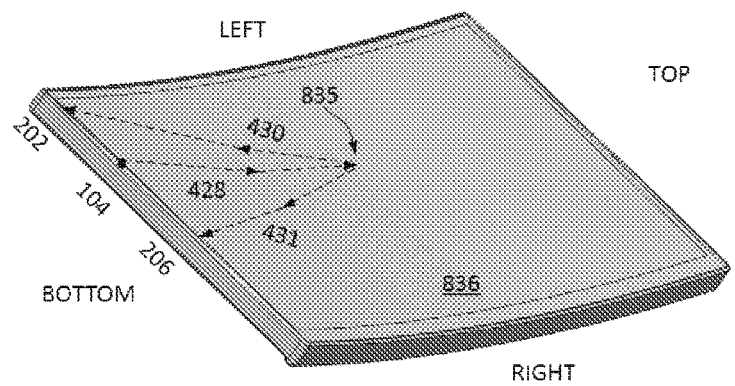

Reference is made to FIGS. 94 and 95, which are simplified illustrations of a curved display and proximity sensing light-beams used to detect gestures thereon, in accordance with an embodiment of the present invention. FIGS. 94 and 95 show a curved reflective surface for use in conjunction with light-based proximity sensor 501 placed along one edge. This feature enables detecting touches on flexible displays even when the displays are not flat. FIGS. 94 and 95 indicate locations of emitter 104 and detectors 202 and 206 in a proximity sensor 501 (not shown) placed along the bottom edge of curved display screen 836. FIG. 94 illustrates the path of light beam 428 emitted by emitter 104. Light beam 428 advances across the surface of display screen 836 in segments that follow the contour of the display screen upper surface such that some of the light paths are incident upon and reflect off of the curved upper surface while crossing the display screen upper surface.

FIG. 95 shows the path of light beam 428 when it encounters a reflective object such as a finger at location 835. Light beam 428 advances across the surface of display screen 836 to location 835 in segments that follow the contour of the display screen upper surface such that some of the light paths are incident upon and reflect off of the curved upper surface while crossing the display screen upper surface. Portions of the light scattered by the object at 835, go back across the surface of display screen 836 to detectors 202 and 206 in segments that follow the contour of the display screen upper surface such that some of the light paths are incident upon and reflect off of the curved upper surface while heading back over the display screen upper surface.

Figure 96:
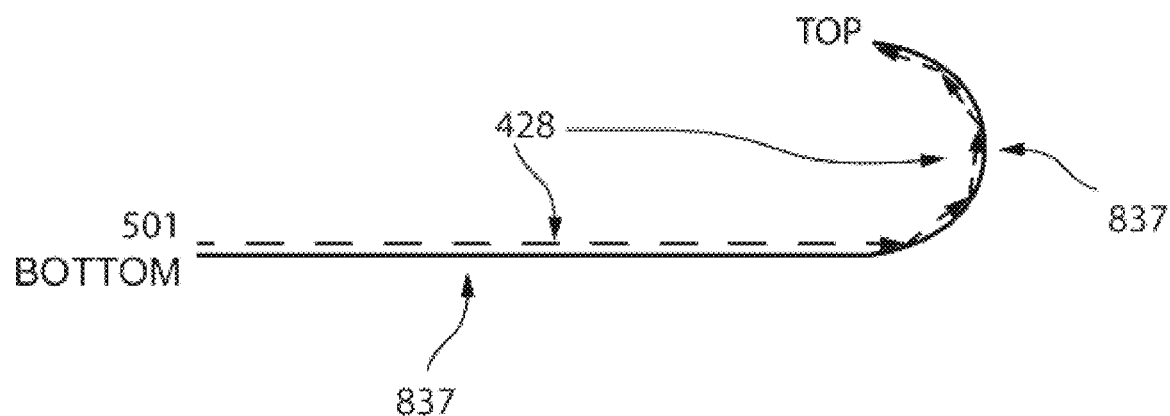
FIGS. 96-98 are simplified illustrations of a flexible display and proximity sensing light-beams used to detect gestures thereon, in accordance with an embodiment of the present invention.
Figure 97:
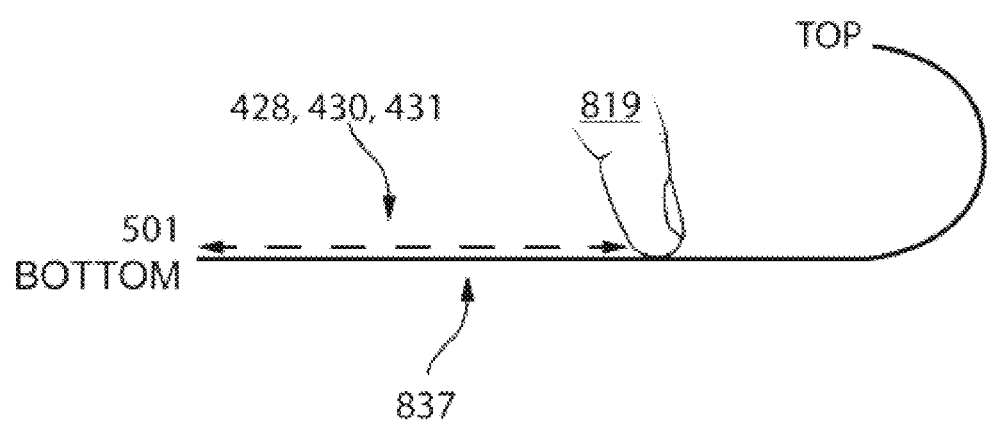
Figure 98:
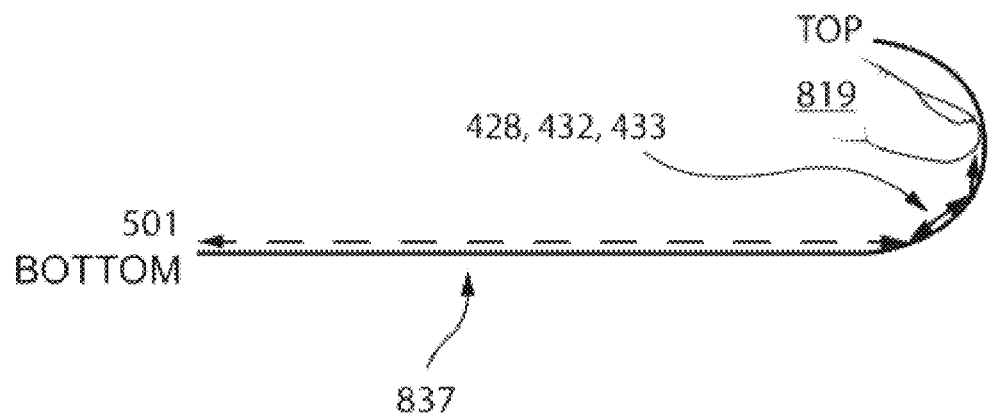

Reference is made to FIGS. 96-98, which are simplified illustrations of a flexible display and proximity sensing light-beams used to detect gestures thereon, in accordance with an embodiment of the present invention. FIGS. 96-98 show a flexible display for use in conjunction with light-based proximity sensor 501 placed along one edge. FIGS. 96-98 indicate locations of proximity sensor 501 placed along the bottom edge of flexible display screen 837. FIG. 96 shows the path of light beam 428 emitted by an emitter in proximity sensor 501. Light beam 428 advances across the curved top portion of the display in segments that follow the contour of the display screen upper surface such that some of the light paths are incident upon and reflect off of the curved upper surface while crossing the display screen upper surface.

FIG. 97 shows the path of light beam 428 when it encounters a reflective object such as finger 819 in the bottom, flat portion of flexible display 837. In this case, the light passes over and across the surface of display 837 without being incident upon and reflected off of the display upper surface.

FIG. 98 shows the path of light beam 428 when it encounters finger 819 in the upper, curved portion of flexible display 837. Light beam 428 advances across the upper, curved portion of flexible display 837 in segments that follow the contour of the display screen upper surface such that some of the light paths are incident upon and reflect off of the curved upper surface while crossing the display screen upper surface. Portions of the light scattered by finger 819, go back across the surface of flexible display 837 to proximity sensor 501 in segments that follow the contour of the display screen upper surface such that some of the light paths are incident upon and reflect off of the curved upper surface while heading back over the display screen upper surface.

Figure 99:
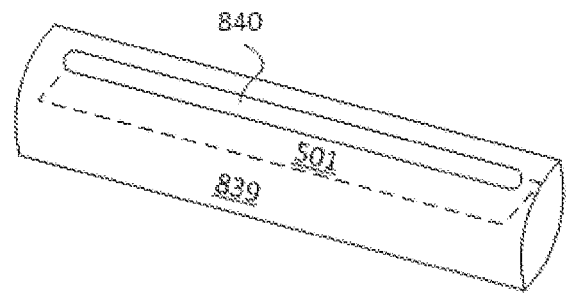
FIGS. 99 and 100 are simplified illustrations of a housing holding a retractable display and a proximity sensor that detects gestures on the retractable display when the display is drawn out of the housing, in accordance with an embodiment of the present invention.
Figure 100:
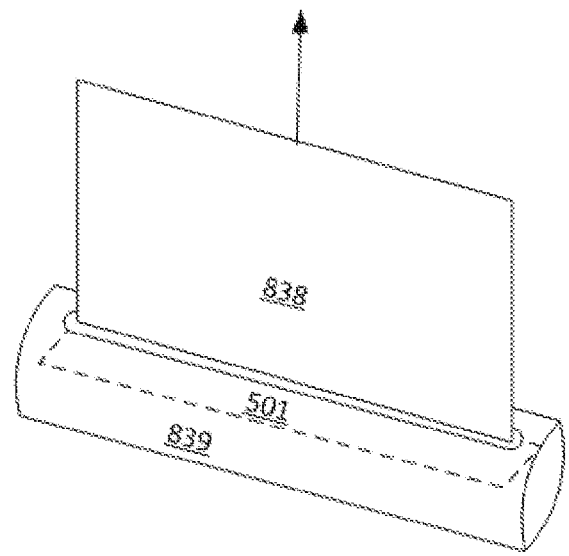

Reference is made to FIGS. 99 and 100, which are simplified illustrations of a housing holding a retractable display and a proximity sensor that detects gestures on the retractable display when the display is drawn out of the housing, in accordance with an embodiment of the present invention. FIGS. 99 and 100 show a retractable display for use in conjunction with light-based proximity sensor 501, in accordance with embodiments of the present invention. FIG. 99 shows housing 839 in which retractable display is stored, slot 840 through which the retractable display is raised and lowered, and proximity sensor 501 mounted inside housing 839. FIG. 100 shows housing 839 with retractable display 838 being raised through slot 840. Proximity sensor 501 is configured to project light beams parallel to the surface of display 838.

Figure 101:
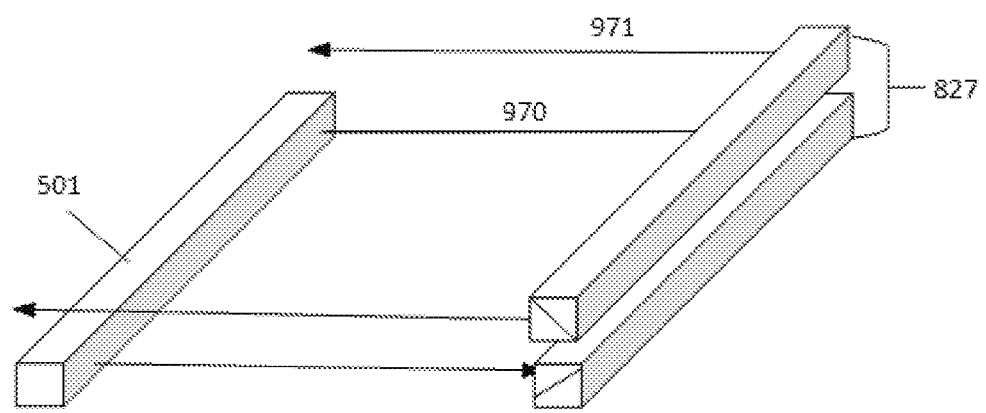
FIG. 101 is a simplified illustration of a first proximity sensing system that detects objects in multiple parallel detection planes, in accordance with an embodiment of the present invention.

Reference is made to FIG. 101, which is a simplified illustration of a first proximity sensing system that detects objects in multiple parallel detection planes, in accordance with an embodiment of the present invention. FIG. 101 shows an optical assembly for detecting locations of objects in multiple parallel spatial planes 970 and 971. The optical assembly includes reflectance-based sensor 501 that emits light into detection plane 970 and detects reflections of the emitted light, reflected by an object located in detection plane 970. A light re-director 827, positioned away from sensor 501, re-directs the light emitted by sensor 501 into spatial plane 971, parallel to detection plane 970. Light re-director 827 is illustrated as two mirrors. When the object is located in spatial plane 971, light re-director 827 re-directs light reflected by the object into detection plane 970 of sensor 501.

Figure 102:
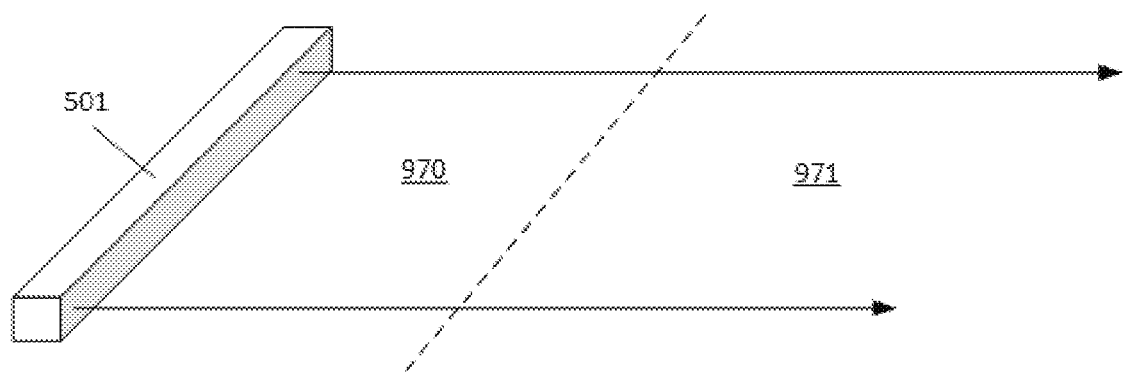
FIGS. 102 and 103 are simplified illustrations of mapping detections in different detection planes in the proximity sensing system of FIG. 101, in accordance with an embodiment of the present invention.
Figure 103:
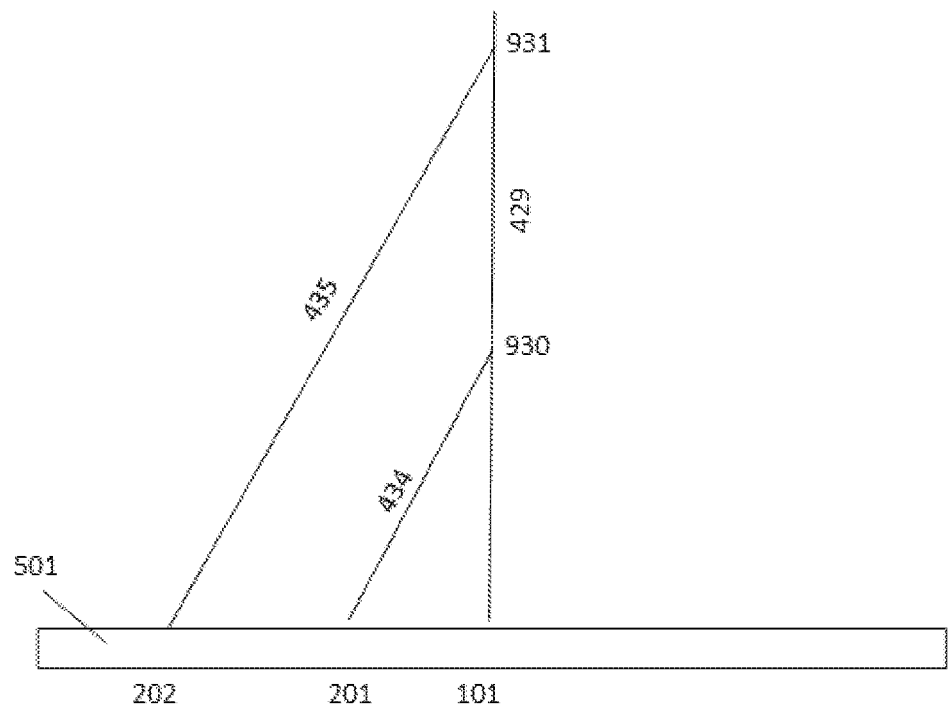

Reference is made to FIGS. 102 and 103, which are simplified illustrations of mapping detections in different detection planes in the proximity sensing system of FIG. 101, in accordance with an embodiment of the present invention. FIG. 102 shows how locations of objects in the different parallel spatial planes 970 and 971 are detected by a processor connected to sensor 501. Spatial plane 971 is mapped as an extension of plane 970. Object coordinates located within this extension, based on the y-coordinate are known to be located in parallel plane 971. Thus, the processor detects one or more virtual locations of the object within detection plane 970 of sensor 501, based on light reflected by the object that is re-directed to detection plane 970 of sensor 501 and detected by sensor 501. The processor transforms the one or more virtual locations of the object within detection plane 970 of sensor 501 to corresponding one or more real locations of the object within one or more spatial planes 971 parallel to detection plane 970 of sensor 501, based on the position of light re-director 827 relative to sensor 501.

FIG. 103 shows two hotspot locations 930 and 931 for emitter-detector pairs 101-201 and 101-202 of sensor 501. Hotspot location 930 is in plane 970 and hotspot location 931 is in plane 971, but, as explained above, both locations are mapped to detection plane 970. Light beam 429 is reflected as beams 434 and 435 by an object at hotspots 930 and 931 and these reflections are maximally detected by detectors 201 and 202, respectively.

In some embodiments of the invention, sensor 501 includes interleaved emitters and detectors as illustrated in FIG. 10. In other embodiments of the invention, sensor 501 is a time-of-flight proximity sensor whose time-of-flight beams are redirected by light re-director 827. In yet other embodiments of the invention, sensor 501 includes two cameras that capture images of objects in parallel plane 971 and identify the object's location by the triangulating the object in the camera images.

Figure 104:
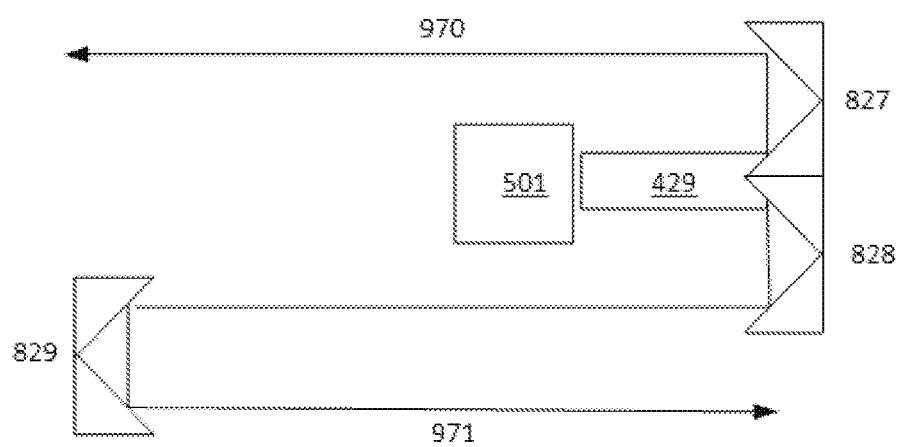
FIG. 104 is a simplified illustration of a second proximity sensing system that detects objects in multiple parallel detection planes, in accordance with an embodiment of the present invention.

Reference is made to FIG. 104, which is a simplified illustration of a second proximity sensing system that detects objects in multiple parallel detection planes, in accordance with an embodiment of the present invention. FIG. 104 shows an embodiment of an optical assembly for detecting locations of objects in multiple parallel spatial planes 970 and 971 in which light re-directors 827 and 828 split light beam 429 from sensor 501. In this embodiment, a first portion of emitted light beam 429 is directed by light re-director 827 to plane 970 above sensor 501, and a second portion of emitted light beam 429 is directed by light re-director 828 beneath sensor 501. In this embodiment, an object reflecting the first portion of light beam 429, above sensor 501, and an object reflecting the second portion of light beam 429, beneath sensor 501, are the same distance from sensor 501 and will generate similar detections. In order to distinguish an object above sensor 501 from an object beneath sensor 501, a third light re-director 829 is provided to further redirect light beneath sensor 501 into plane 971. Thus, objects in plane 971 are further away from sensor 501 and generate different reflection patterns than objects in plane 970.

Figure 105:
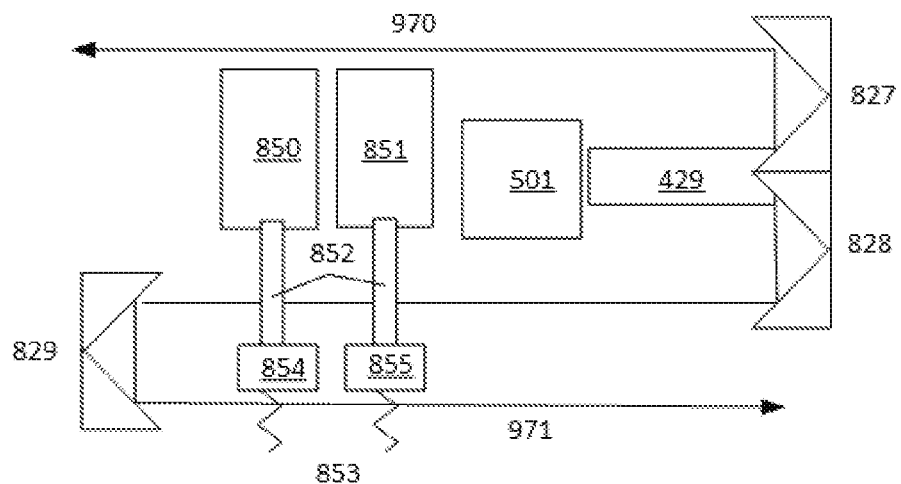
FIGS. 105 and 106 are simplified illustrations of a keyboard using the proximity sensing system of FIG. 104 to detect objects above the keys and also detect depressed keys, in accordance with an embodiment of the present invention.
Figure 106:
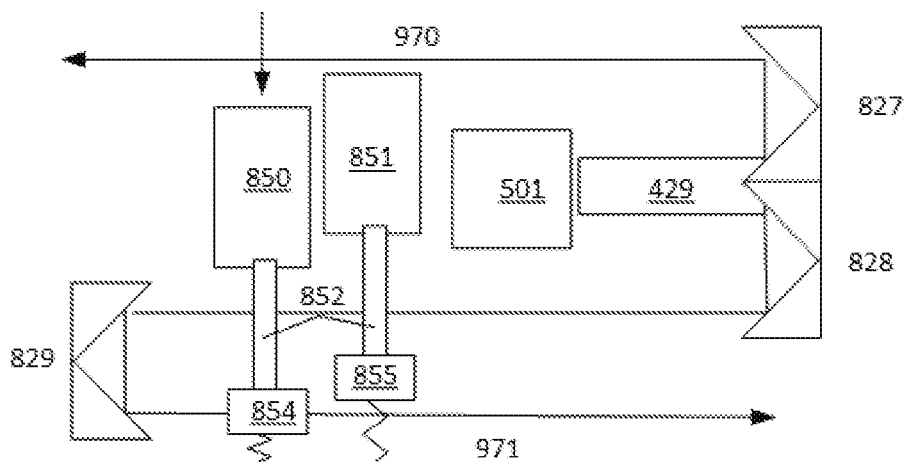

Reference is made to FIGS. 105 and 106, which are simplified illustrations of a keyboard using the proximity sensing system of FIG. 104 to detect objects above the keys and also detect depressed keys, in accordance with an embodiment of the present invention. FIGS. 105 and 106 show a keyboard application that includes keys 850 and 851. Sensor 501 detects movement of objects above keys 850 and 851. This movement is interpreted as trackpad input. Each key features a rod 852 beneath the key connected to a block 854 or 855. Blocks 854 and 855 in their resting position are suspended above plane 971 by springs 853. Sensor 501 detects when key 850 or 851 is depressed as this movement lowers respective block 854 or 855 into detection plane 971. The resolution of object locations above the keys must be finer than that beneath the keys: there are only few discrete locations into which blocks 854 or 855 can be lowered into plane 971, whereas a finger above the keys can move freely within plane 970. In FIG. 105 no keys are depressed, and in FIG. 106 key 850 is depressed.

Figure 107:
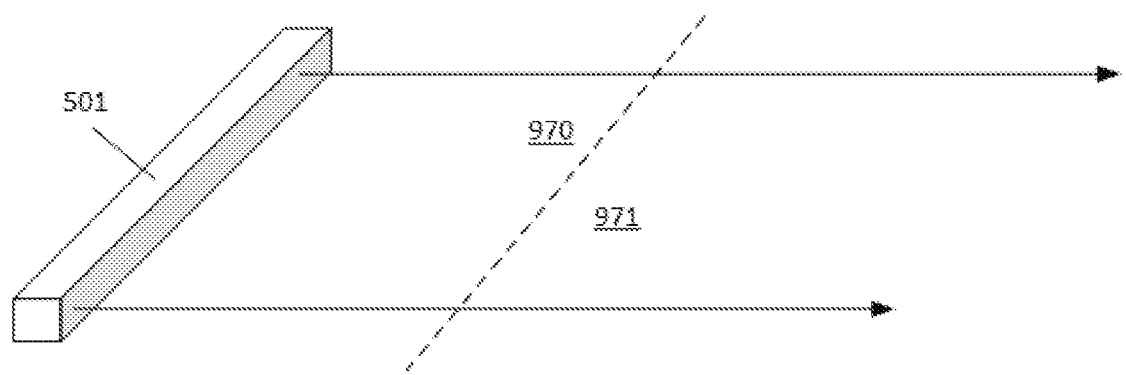
FIGS. 107 and 108 are simplified illustrations of mapping detections above the keys and detections of depressed keys in keyboard of FIGS. 105 and 106, in accordance with an embodiment of the present invention.
Figure 108:
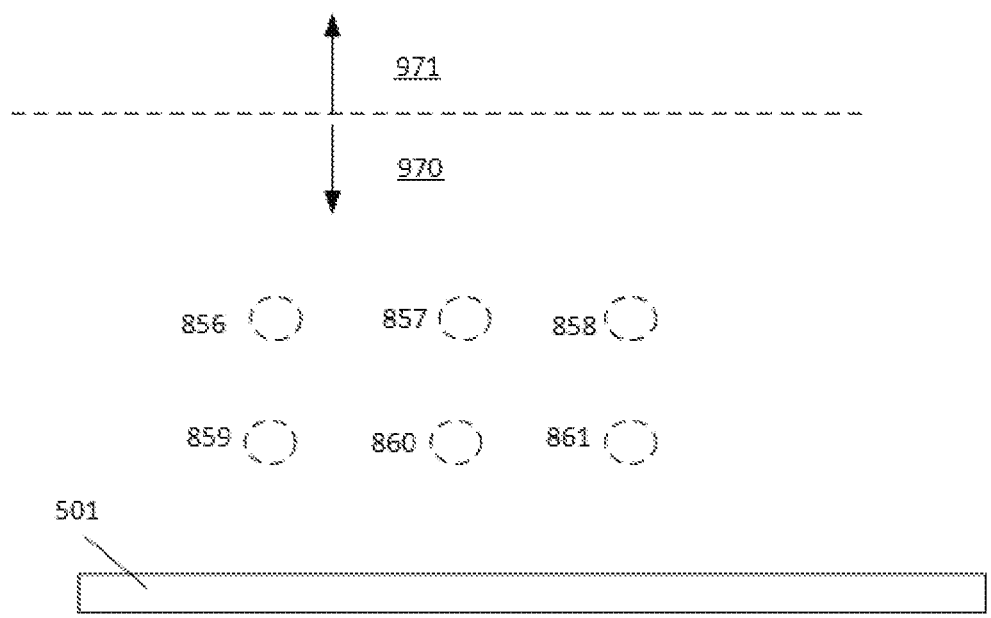

Reference is made to FIGS. 107 and 108, which are simplified illustrations of mapping detections above the keys, and detections of depressed keys, in the keyboard of FIGS. 105 and 106, in accordance with an embodiment of the present invention. FIG. 107 shows how detections in plane 970, above the keys in the keyboard of FIGS. 105 and 106, are detected as nearer sensor 501 than detections of depressed keys in plane 971.

FIG. 108 shows detections in planes 970 and 971 in the keyboard of FIGS. 105 and 106. As illustrated in FIGS. 105 and 106, rods 852 block some of the light underneath the keys, and reflections off these rods will be detected as objects in plane 970. In FIG. 108, these detections are indicated as objects 856-861. Furthermore, as illustrated in FIGS. 105 and 106, rods 852 block some light from reaching plane 971 and block some reflections in plane 971 from reaching sensor 501. These problems are minimized in several ways. First, rods 852 are thin and colored black to minimize the amount of reflection they generate. Second, rods 852 reflect light even in their resting position, creating a baseline amount of detected reflections. Therefore, objects above the keys, in plane 970, are detected by an increase in detected reflections above the baseline. Third, detections of lowered keys in plane 971 do not require high resolution detection to identify which key is being depressed. Thus, even with rods 852 causing some interference, keys lowered into plane 971 are detected and identified.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

The invention claimed is:

1. An optical assembly for detecting locations of objects in any of multiple parallel spatial planes, comprising:
   a reflectance-based sensor that emits light into a detection plane and detects reflections of the emitted light, reflected by an object located in the detection plane;
   a light re-director positioned away from said sensor that re-directs light emitted by said sensor into one or more spatial planes parallel to the detection plane and, when the object is located in the one or more spatial planes, re-directs light reflected by the object into the detection plane; and
   a processor, connected to said sensor, that controls light emitted by said sensor and receives outputs from said sensor, and configured such that when an object passes through one or more of the spatial planes, the processor identifies both (i) the spatial planes through which the object passes, and (ii) the location of the object within the spatial planes through which it passes, based on the received outputs and the position of said light re-director relative to said sensor.

2. The optical assembly of claim 1, wherein said reflectance-based sensor comprises an array of interleaved light emitters and photodiodes.

3. The optical assembly of claim 2, wherein said light emitters are vertical-cavity surface-emitting lasers (VCSELs).

4. The optical assembly of claim 1, wherein said reflectance-based sensor comprises a time-of-flight sensor.

5. The optical assembly of claim 1, wherein said reflectance-based sensor comprises two cameras.

6. The optical assembly of claim 1, wherein said light re-director is a folding mirror.

7. The optical assembly of claim 1, wherein said light re-director is a beam splitter.

8. A computer comprising the optical assembly of claim 1 to receive user input.

9. A computer comprising:
a display that presents a graphical user interface (GUI); and,
the optical assembly of claim 1, wherein object detections in a first plane from the group consisting of the detection plane and the one or more spatial planes parallel to the detection plane, select and deselect elements in the GUI, and an object detection in a second plane from the group consisting of the detection plane and the one or more spatial planes parallel to the detection plane, is interpreted as a key press.

10. A method for detecting locations of objects in any of multiple parallel spatial planes, comprising:
providing an optical assembly comprising:
(a) a reflectance-based sensor that emits light into a detection plane and detects reflections of the emitted light, reflected by an object located in the detection plane; and
(b) a light re-director positioned away from said sensor that re-directs light emitted by said sensor into one or more spatial planes parallel to the detection plane and, when the object is located in the one or more spatial planes, re-directs light reflected by the object into the detection plane;
providing a processor connected to said sensor, that controls light emitted by said sensor and processes light detected by said sensor; and,
identifying, by the processor, when an object passes through one or more of the spatial planes, both (i) the spatial planes through which the object passes, and (ii) the location of the object within the spatial planes through which it passes, comprising:
detecting, by the processor, one or more virtual locations of the object within the detection plane, based on light reflected by the object that is re-directed to the detection plane and detected by the sensor; and
transforming, by the processor, the one or more virtual locations of the object within the detection plane to corresponding one or more real locations of the object within one or more spatial planes parallel to the detection plane, based on the position of the light re-director relative to the sensor.

11. A method for providing input to a computer, comprising:
detecting locations of objects in multiple parallel spatial planes, in accordance with claim 10; and
transmitting the detected locations to a computer as user input.

12. A method for providing input to a computer, comprising:
presenting a graphical user interface (GUI):
detecting locations of objects in multiple parallel spatial planes above the GUI, in accordance with claim 10; and
transmitting the detected locations to a computer as user input, whereby object detections in a first plane from the group consisting of the detection plane and the one or more spatial planes parallel to the detection plane, select and deselect elements in the GUI, and an object detection in a second plane from the group consisting of the detection plane and the one or more spatial planes parallel to the detection plane, is interpreted as a key press.

* * * * *